United States Patent
Spangler et al.

(10) Patent No.: US 12,492,258 B2
(45) Date of Patent: *Dec. 9, 2025

(54) BISPECIFIC BINDING AGENTS

(71) Applicant: The Johns Hopkins University, Baltimore, MD (US)

(72) Inventors: Jamie Spangler, Baltimore, MD (US); Denis Gaston Wirtz, Baltimore, MD (US); Huilin Yang, Baltimore, MD (US); Wentao Wang, Baltimore, MD (US); Michelle Karl, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 946 days.

This patent is subject to a terminal disclaimer.

(21) Appl. No.: 17/614,864

(22) PCT Filed: May 29, 2020

(86) PCT No.: PCT/US2020/035200
§ 371 (c)(1),
(2) Date: Nov. 29, 2021

(87) PCT Pub. No.: WO2020/243479
PCT Pub. Date: Dec. 3, 2020

(65) Prior Publication Data
US 2022/0251223 A1    Aug. 11, 2022

Related U.S. Application Data

(60) Provisional application No. 62/855,665, filed on May 31, 2019.

(51) Int. Cl.
C07K 16/28    (2006.01)

(52) U.S. Cl.
CPC ...... *C07K 16/2866* (2013.01); *C07K 2317/31* (2013.01); *C07K 2317/51* (2013.01)

(58) Field of Classification Search
CPC ............ C07K 16/2866; C07K 2317/31; C07K 2317/51; C07K 2317/24; C07K 2317/35; C07K 2317/526; C07K 2317/55; C07K 2317/622; C07K 2317/73; C07K 2317/76; C07K 2317/92; A61P 35/00; A61P 35/04; A61K 2039/505

See application file for complete search history.

(56) References Cited

U.S. PATENT DOCUMENTS

| | | | |
|---|---|---|---|
| 5,440,021 A | 8/1995 | Chuntharapai et al. | |
| 5,795,965 A | 8/1998 | Tsuchiya et al. | |
| 7,183,076 B2 | 2/2007 | Arathoon et al. | |
| 8,562,991 B2 | 10/2013 | Igawa et al. | |
| 8,945,552 B2 | 2/2015 | Bachner et al. | |
| 9,168,300 B2 | 10/2015 | Gurney et al. | |
| 9,562,109 B2 | 2/2017 | Von Kreudenstein et al. | |
| 9,562,110 B2 | 2/2017 | Zhou et al. | |
| 9,688,758 B2 | 6/2017 | Wranik et al. | |
| 9,856,319 B2 | 1/2018 | Ghayur et al. | |
| 10,138,293 B2 | 11/2018 | Klein et al. | |
| 11,701,384 B2 | 7/2023 | Chen et al. | |
| 2016/0333077 A1 | 11/2016 | Aman et al. | |
| 2022/0251222 A1 | 8/2022 | Spangler et al. | |

FOREIGN PATENT DOCUMENTS

| | | | |
|---|---|---|---|
| JP | 2014534198 | 12/2014 | |
| JP | 2016514463 | 5/2016 | |
| WO | WO 2013/005958 | 4/2013 | |
| WO | WO 2013/055958 | 4/2013 | |
| WO | WO-2013055958 A1 * | 4/2013 | ............... C07K 1/36 |
| WO | WO 2014084607 | 6/2014 | |
| WO | WO 2018072025 | 4/2018 | |
| WO | WO 2018191746 A1 | 10/2018 | |

OTHER PUBLICATIONS

Xu et al. "Production of bispecific antibodies in "knobs-into-holes" using a cell-free expression system." mAbs 2015. 7:1, 231-242. (Year: 2015).*

Yusakul et al. "Effect of linker length between variable domains of single chain variable fragment antibody against daidzin on its reactivity." Biosci., Biotechnol., Biochem. 2016, 80;7:1306-1312. (Year: 2016).*

Brinkmann et al., "The making of bispecific antibodies," MABS, Jan. 2017, 9(2):182-212.

Extended European Search Report in European Application No. 20814936.9, dated Nov. 14, 2022, 7 pages.

Extended European Search Report in European Application No. 20815014.4, dated Nov. 14, 2022, 10 pages.

jhu.technologypublisher.com [online], "Engineered Bispecific Antibodies for Targeted Inhibition of Tumor Metastasis," Jan. 23, 2019, retrieved from URL<https://jhu.technologypublisher.com/techcase/C15681>, 3 pages.

Tan, "Bispecific Antibodies Targeting of IL-6 and IL-8 Paracrine Signaling Pathway as A Method to Inhibit Tumor Cell Migration," May 10, 2019, retrieved from URL<https://jscholarship.library.jhu.edu/handle/1774.2/61740>, 4 pages.

Anders et al., "Biology, metastatic patterns, and treatment of patients with triple-negative breast cancer," Clinical Breast Cancer, Jun. 2009, 9(Suppl. 2):S73-81.

(Continued)

*Primary Examiner* — Misook Yu
*Assistant Examiner* — Grace H Lunde
(74) *Attorney, Agent, or Firm* — Fish & Richardson P.C.

(57) ABSTRACT

Provided herein are novel bispecific binding agents and methods of constructing and expressing the same. The methods of constructing the bispecific binding agent generally describes a combination of a knobs-in-holes assembly strategy and a single-chain Fab expression approach to generate a modular bispecific binding platform.

14 Claims, 6 Drawing Sheets

Specification includes a Sequence Listing.

(56) References Cited

OTHER PUBLICATIONS

Atwell et al., "Stable heterodimers from remodeling the domain interface of a homodimer using a phage display library," Journal of Molecular Biology, Jul. 1997, 270(1):26-35.
Boder et al., "Yeast surface display for screening combinatorial polypeptide libraries," Nature Biotechnology, Jun. 1997, 15(6):553-557.
Carter, "Bispecific human IgG by design," Journal of Immunological Methods, Feb. 2001, 248(1-2):7-15.
Chuntharapai et al., "Monoclonal antibodies detect different distribution patterns of IL-8 receptor A and IL-8 receptor B on human peripheral blood leukocytes," Journal of Immunology, Dec. 1994, 153(12):5682-5688.
Cochran, "Engineered proteins pull double duty," Science Translational Medicine, Feb. 2010, 2(17):17ps5, 5 pages.
Costello et al., "New biomarkers and targets in pancreatic cancer and their application to treatment," Nature Reviews Gastroenterology & Hepatology, Aug. 2012, 9(8):435-444.
Culshaw et al., "What can the periodontal community learn from the pathophysiology of rheumatoid arthritis?," J. Clin Preiodontol, Mar. 2011, 38(Suppl. 11):106-113.
De Laurentiis et al., "Treatment of triple negative breast cancer (TNBC): current options and future perspectives," Cancer Treatment Reviews, Nov. 2010, 36(Suppl. 3):S80-S86.
Fan et al., "Bispecific antibodies and their applications," Journal of Hematology & Oncology, Dec. 2015. 8:130, 14 pages.
Finkelman et al., "Anticytokine antibodies as carrier proteins. Prolongation of in vivo effects of exogenous cytokines by injection of cytokine-anti-cytokine antibody complexes," Journal of Immunology, 1993, 151(3):1235-1244.
Fraley et al., "A distinctive role for focal adhesion proteins in three-dimensional cell motility," Nature Cell Biology, Jun. 2010, 12(6):598-604.
Frohman et al., "Rapid production of full-length cDNAs from rare transcripts: amplification using a single gene-specific oligonucleotide primer," Proc Natl Acad Sci USA, Dec. 1988, 85(23):8998-9002.
Fu et al., "Blocking Interleukin-6 and Interleukin-8 Signaling Inhibits Cell Viability, Colony-forming Activity, and Cell Migration in Human Triple-negative Breast Cancer and Pancreatic Cancer Cells." Anticancer Research, Nov. 2018, 38(11):6271-6279.
Giri et al., "The Arp2/3 complex mediates multigeneration dendritic protrusions for efficient 3-dimensional cancer cell migration," FASEB Journal, Oct. 2013, 27(10):4089-4099.
Gotwals et al., "Prospects for combining targeted and conventional cancer therapy with immunotherapy," Nature Reviews Cancer, May 2017, 17(5):286-301.
Igawa et al., "Antibody recycling by engineered pH-dependent antigen binding improves the duration of antigen neutralization," Nat. Biotechnol, Nov. 2010, 28(11):1203-7.
International Preliminary Report in Patentability in Appln. No. PCT/US2020/035200, dated Nov. 16, 2021, 7 pages.
International Search Report and Written Opinion in International Appln. No. PCT/US2020/035200, dated Aug. 27, 2020, 7 pages.
Jayatilaka et al., "Synergistic IL-6 and IL-8 paracrine signalling pathway infers a strategy to inhibit tumour cell migration," Nature Communications, May 2017, 8:15584, 12 pages.
Karagiannis et al., "Neoadjuvant chemotherapy induces breast cancer metastasis through a TMEM-mediated mechanism," Science Translational Medicine, Jul. 2017, 9(397):eaan0026, 19 pages.
Koerber et al., "An improved single-chain Fab platform for efficient display and recombinant expression," Journal of Molecular Biology, Jan. 2015, 427(2):576-586.
Kontermann, "Recombinant bispecific antibodies for cancer therapy," Acta Pharmacol Sin., Jan. 2005, 26(1):1-9.
Krah et al., "Engineering bispecific antibodies with defined chain pairing," New Biotechnology, Oct. 2017, 39(Pt B):167-173.
Krishnamurthy et al., "Bispecific antibodies for cancer therapy: A review," Pharmacology & Therapeutics, May 2018, 185:122-134.

Li et al., "Macrophage-Secreted TNFα and TGFβ1 Influence Migration Speed and Persistence of Cancer Cells in 3D Tissue Culture via Independent Pathways," Cancer Research, Jan. 2017, 77(2):279-290.
Liedtke et al., "Response to neoadjuvant therapy and long-term survival in patients with triple-negative breast cancer," Journal of Clinical Oncology, Mar. 2008, 26(8):1275-1281.
Martin et al., "Does the mobilization of circulating tumour cells during cancer therapy cause metastasis?," Nature Reviews Clinical Oncology, Jan. 2017, 14(1):32-44.
Merchant et al., "An efficient route to human bispecific IgG," Nature Biotechnology, Jul. 1998, 16(7):677-681.
Nakashima et al., "Remission in patients with active rheumatoid arthritis by tocilizumab treatment in routine clinical practice: results from 3 years of prospectively registered data," Modern Rheumatology, Mar. 2014, 24(2):258-264.
Obenauf et al., "Therapy-induced tumour secretomes promote resistance and tumour progression," Nature, Apr. 2015, 520(7547):368-372.
Orcutt et al., "A modular IgG-scFv bispecific antibody topology," Protein Engineering Design & Selection, Apr. 2010, 23(4):221-228.
Paudel et al., "The effect of varying the peptide linker length in a single chain variable fragment antibody against wogonin glucuronide," J. of Biotechnology, 2017, 251, (2017), pp. 47-52, vol.
Ridgway et al., "'Knobs-into-holes' engineering of antibody CH3 domains for heavy chain heterodimerization," Protein Engineering, Jul. 1996, 9(7):617-621.
Schott et al., "Phase Ib Pilot Study to Evaluate Reparixin in Combination with Weekly Paclitaxel in Patients with HER-2-Negative Metastatic Breast Cancer," Clinical Cancer Research, Sep. 2017, 23(18):5358-5365.
Singh et al., "Targeting IL-8 signalling to inhibit breast cancer stem cell activity," Expert Opinion on Therapeutic Targets, Nov. 2013, 17(11):1235-1241.
Spangler et al., "Triepitopic antibody fusions inhibit cetuximab-resistant BRAF and KRAS mutant tumors via EGFR signal repression," Journal of Molecular Biology, Sep. 2012, 422(4):532-544.
Stathis et al., "Advanced pancreatic carcinoma: current treatment and future challenges," Nature Reviews Clinical Oncology, Mar. 2010, 7(3):163-172.
Steeg, "Targeting metastasis," Nature Reviews Cancer, Apr. 2016, 16(4):201-218.
Weiner, "Building better monoclonal antibody-based therapeutics," Nature Reviews Cancer, Jun. 2015, 15(6):361-370.
Wranik et al., "LUZ-Y, a novel platform for the mammalian cell production of full-length IgG-bispecific antibodies," Journal of Biological Chemistry, Dec. 2012, 287(52):43331-43339.
Wu et al., "Three-dimensional cell migration does not follow a random walk," Proc Natl Acad Sci USA, Mar. 2014, 111(11):3949-3954.
Xie et al., "A new format of bispecific antibody: highly efficient heterodimerization, expression and tumor cell lysis," Journal of Immunological Methods, Jan. 2005, 296(1-2):95-101.
Yachida et al., "Distant metastasis occurs late during the genetic evolution of pancreatic cancer," Nature, Oct. 2010, 467(7319):1114-7.
Yang et al., "Bispecific Antibodies as a Development Platform for New Concepts and Treatment Strategies," International Journal of Molecular Sciences, Dec. 2016, 18(1):48, 21 pages.
Almagro et al., "Progress and challenges in the design and clinical development of antibodies for cancer therapy," Frontiers in immunology, Jan. 4, 2018, 8:1751.
Brown et al., "Tolerance of single, but not multiple, amino acid replacements in antibody Vh Cdr 2: a means of minimizing B cell wastage from somatic hypermutation?" J Immunol, May 1, 1996, 156(9):3285-91.
Chiu et al., "Antibody structure and function: the basis for engineering therapeutics," Antibodies, Dec. 3, 2019, 8(4):55.
David et al., "The IL-8/IL-8R axis: a double agent in tumor immune resistance," Vaccines, Jun. 24, 2016, 4(3):22, 1-15.
IMGT.org [online], "Correspondence between the IMGT unique numbering for C-Domain, the IMGT exon numbering, the Eu and Kabat numberings: Human IGHG," Jun. 8, 2016, Retrieved on Aug.

(56) References Cited

OTHER PUBLICATIONS 9, 2017, Retrieved from URL <http://www.imgt.org/IMGTScientific-Chart/Numbering/Hu_IGHGnber.html>, 4 pages.

Kim et al., "Anti-proliferative action of IL-6R-targeted antibody tocilizumab for non-small cell lung cancer cells," Oncology letters, 2015, 9(5):2283-8.

Marvin et al., "Redesigning an antibody fragment for faster association with its antigen," Biochemistry, Jun. 17, 2003, 42(23):7077-83.

Raimondo et al., "Profile of sarilumab and its potential in the treatment of rheumatoid arthritis," Drug Design, Development and Therapy, May 24, 2017, 1593-603.

Rudikoff et al, "Single amino acid substitution altering antigen-binding specificity," Proceedings of the National Academy of Sciences, Mar. 1982,79(6):1979-83.

* cited by examiner

SEQUENCE LISTING

<160> NUMBER OF SEQ ID NOS: 27

<210> SEQ ID NO 1
<211> LENGTH: 4
<212> TYPE: PRT
<213> ORGANISM: Artificial
<220> FEATURE:
<223> OTHER INFORMATION: Exemplary Linker

<400> SEQUENCE: 1

Gly Gly Gly Ser
1

<210> SEQ ID NO 2
<211> LENGTH: 5
<212> TYPE: PRT
<213> ORGANISM: Artificial
<220> FEATURE:
<223> OTHER INFORMATION: Exemplary Linker

<400> SEQUENCE: 2

Gly Gly Gly Gly Ser
1               5

<210> SEQ ID NO 3
<211> LENGTH: 4
<212> TYPE: PRT
<213> ORGANISM: Artificial
<220> FEATURE:
<223> OTHER INFORMATION: Exemplary Linker

<400> SEQUENCE: 3

Gly Gly Ser Gly
1

<210> SEQ ID NO 4
<211> LENGTH: 14
<212> TYPE: PRT
<213> ORGANISM: Artificial
<220> FEATURE:
<223> OTHER INFORMATION: Exemplary Linker

<400> SEQUENCE: 4

Gly Ser Ala Ala Ala Gly Gly Ser Gly Gly Ser Gly Gly Ser
1               5                   10

<210> SEQ ID NO 5
<211> LENGTH: 8
<212> TYPE: PRT
<213> ORGANISM: Artificial
<220> FEATURE:
<223> OTHER INFORMATION: Exemplary Linker

<400> SEQUENCE: 5

Gly Gly Gly Ser Gly Gly Gly Ser
1               5

<210> SEQ ID NO 6
<211> LENGTH: 330
<212> TYPE: PRT
<213> ORGANISM: Homo sapiens

<400> SEQUENCE: 6

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr

```
            20                  25                  30
Phe Pro Glu Pro Val Thr Val Ser Trp Asn Ser Gly Ala Leu Thr Ser
        35                  40                  45
Gly Val His Thr Phe Pro Ala Val Leu Gln Ser Ser Gly Leu Tyr Ser
    50                  55                  60
Leu Ser Ser Val Val Thr Val Pro Ser Ser Ser Leu Gly Thr Gln Thr
65                  70                  75                  80
Tyr Ile Cys Asn Val Asn His Lys Pro Ser Asn Thr Lys Val Asp Lys
                85                  90                  95
Lys Val Glu Pro Lys Ser Cys Asp Lys Thr His Thr Cys Pro Pro Cys
            100                 105                 110
Pro Ala Pro Glu Leu Leu Gly Gly Pro Ser Val Phe Leu Phe Pro Pro
        115                 120                 125
Lys Pro Lys Asp Thr Leu Met Ile Ser Arg Thr Pro Glu Val Thr Cys
    130                 135                 140
Val Val Val Asp Val Ser His Glu Asp Pro Glu Val Lys Phe Asn Trp
145                 150                 155                 160
Tyr Val Asp Gly Val Glu Val His Asn Ala Lys Thr Lys Pro Arg Glu
                165                 170                 175
Glu Gln Tyr Asn Ser Thr Tyr Arg Val Val Ser Val Leu Thr Val Leu
            180                 185                 190
His Gln Asp Trp Leu Asn Gly Lys Glu Tyr Lys Cys Lys Val Ser Asn
        195                 200                 205
Lys Ala Leu Pro Ala Pro Ile Glu Lys Thr Ile Ser Lys Ala Lys Gly
    210                 215                 220
Gln Pro Arg Glu Pro Gln Val Tyr Thr Leu Pro Pro Ser Arg Glu Glu
225                 230                 235                 240
Met Thr Lys Asn Gln Val Ser Leu Thr Cys Leu Val Lys Gly Phe Tyr
                245                 250                 255
Pro Ser Asp Ile Ala Val Glu Trp Glu Ser Asn Gly Gln Pro Glu Asn
            260                 265                 270
Asn Tyr Lys Thr Thr Pro Pro Val Leu Asp Ser Asp Gly Ser Phe Phe
        275                 280                 285
Leu Tyr Ser Lys Leu Thr Val Asp Lys Ser Arg Trp Gln Gln Gly Asn
    290                 295                 300
Val Phe Ser Cys Ser Val Met His Glu Gly Leu His Asn His Tyr Thr
305                 310                 315                 320
Gln Lys Ser Leu Ser Leu Ser Pro Gly Lys
                325                 330

<210> SEQ ID NO 7
<211> LENGTH: 330
<212> TYPE: PRT
<213> ORGANISM: Homo sapiens

<400> SEQUENCE: 7

Ala Ser Thr Lys Gly Pro Ser Val Phe Pro Leu Ala Pro Ser Ser Lys
1               5                   10                  15
Ser Thr Ser Gly Gly Thr Ala Ala Leu Gly Cys Leu Val Lys Asp Tyr
            20                  25                  30
Phe Pro Glu Pro Val Thr Val Ser Trp Asn Ser Gly Ala Leu Thr Ser
        35                  40                  45
Gly Val His Thr Phe Pro Ala Val Leu Gln Ser Ser Gly Leu Tyr Ser
    50                  55                  60
```

```
Leu Ser Ser Val Val Thr Val Pro Ser Ser Ser Leu Gly Thr Gln Thr
 65                  70                  75                  80

Tyr Ile Cys Asn Val Asn His Lys Pro Ser Asn Thr Lys Val Asp Lys
                 85                  90                  95

Lys Val Glu Pro Lys Ser Cys Asp Lys Thr His Thr Cys Pro Pro Cys
             100                 105                 110

Pro Ala Pro Glu Leu Leu Gly Gly Pro Ser Val Phe Leu Phe Pro Pro
         115                 120                 125

Lys Pro Lys Asp Thr Leu Met Ile Ser Arg Thr Pro Glu Val Thr Cys
     130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Ser Cys Ala Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Val Ser Lys Leu Thr Val Asp Lys Ser Arg Trp Gln Gln Gly Asn
    290                 295                 300

Val Phe Ser Cys Ser Val Met His Glu Gly Leu His Asn His Tyr Thr
305                 310                 315                 320

Gln Lys Ser Leu Ser Leu Ser Pro Gly Lys
                325                 330

<210> SEQ ID NO 8
<211> LENGTH: 330
<212> TYPE: PRT
<213> ORGANISM: Homo sapiens

<400> SEQUENCE: 8

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
             20                  25                  30

Phe Pro Glu Pro Val Thr Val Ser Trp Asn Ser Gly Ala Leu Thr Ser
         35                  40                  45

Gly Val His Thr Phe Pro Ala Val Leu Gln Ser Ser Gly Leu Tyr Ser
     50                  55                  60

Leu Ser Ser Val Val Thr Val Pro Ser Ser Ser Leu Gly Thr Gln Thr
 65                  70                  75                  80

Tyr Ile Cys Asn Val Asn His Lys Pro Ser Asn Thr Lys Val Asp Lys
                 85                  90                  95

Lys Val Glu Pro Lys Ser Cys Asp Lys Thr His Thr Cys Pro Pro Cys
             100                 105                 110
```

Pro Ala Pro Glu Leu Leu Gly Gly Pro Ser Val Phe Leu Phe Pro Pro
                115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
                180                 185                 190

His Gln Asp Trp Leu Asn Gly Lys Glu Tyr Lys Cys Lys Val Ser Asn
                195                 200                 205

Lys Ala Leu Pro Ala Pro Ile Glu Lys Thr Ile Ser Lys Ala Lys Gly
            210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Trp Cys Leu Val Lys Gly Phe Tyr
                    245                 250                 255

Pro Ser Asp Ile Ala Val Glu Trp Glu Ser Asn Gly Gln Pro Glu Asn
                260                 265                 270

Asn Tyr Lys Thr Thr Pro Pro Val Leu Asp Ser Asp Gly Ser Phe Phe
                275                 280                 285

Leu Tyr Ser Lys Leu Thr Val Asp Lys Ser Arg Trp Gln Gln Gly Asn
                290                 295                 300

Val Phe Ser Cys Ser Val Met His Glu Gly Leu His Asn His Tyr Thr
305                 310                 315                 320

Gln Lys Ser Leu Ser Leu Ser Pro Gly Lys
                325                 330

<210> SEQ ID NO 9
<211> LENGTH: 726
<212> TYPE: PRT
<213> ORGANISM: Artificial
<220> FEATURE:
<223> OTHER INFORMATION: BS1 Antibody Chain 1 with Tociliuzmab Light and
      Heavy Chains and Human IgG1 CH1, CH2, and CH3 Domains with "Holes"
      Substitutions

<400> SEQUENCE: 9

Met Arg Val Pro Ala Gln Leu Leu Gly Leu Leu Leu Leu Trp Leu Pro
1               5                   10                  15

Gly Ala Arg Cys Ala Gly Ser Asp Ile Gln Met Thr Gln Ser Pro Ser
                20                  25                  30

Ser Leu Ser Ala Ser Val Gly Asp Arg Val Thr Ile Thr Cys Arg Ala
            35                  40                  45

Ser Gln Asp Ile Ser Ser Tyr Leu Asn Trp Tyr Gln Gln Lys Pro Gly
        50                  55                  60

Lys Ala Pro Lys Leu Leu Ile Tyr Tyr Thr Ser Arg Leu His Ser Gly
65                  70                  75                  80

Val Pro Ser Arg Phe Ser Gly Ser Gly Ser Gly Thr Asp Phe Thr Phe
                85                  90                  95

Thr Ile Ser Ser Leu Gln Pro Glu Asp Ile Ala Thr Tyr Tyr Cys Gln
                100                 105                 110

Gln Gly Asn Thr Leu Pro Tyr Thr Phe Gly Gln Gly Thr Lys Val Glu
                115                 120                 125

-continued

```
Ile Lys Arg Thr Val Ala Ala Pro Ser Val Phe Ile Phe Pro Pro Ser
    130                 135                 140

Asp Glu Gln Leu Lys Ser Gly Thr Ala Ser Val Val Cys Leu Leu Asn
145                 150                 155                 160

Asn Phe Tyr Pro Arg Glu Ala Lys Val Gln Trp Lys Val Asp Asn Ala
                165                 170                 175

Leu Gln Ser Gly Asn Ser Gln Glu Ser Val Thr Glu Gln Asp Ser Lys
            180                 185                 190

Asp Ser Thr Tyr Ser Leu Ser Ser Thr Leu Thr Leu Ser Lys Ala Asp
                195                 200                 205

Tyr Glu Lys His Lys Val Tyr Ala Cys Glu Val Thr His Gln Gly Leu
    210                 215                 220

Ser Ser Pro Val Thr Lys Ser Phe Asn Arg Gly Glu Cys Gly Gly Ser
225                 230                 235                 240

Gly Gly Ser Ser Gly Ser Gly Ser Thr Gly Thr Ser Ser Ser
                245                 250                 255

Gly Thr Gly Thr Ser Ala Gly Thr Thr Gly Thr Ser Ala Ser Thr Ser
            260                 265                 270

Gly Ser Gly Ser Gly Glu Val Gln Leu Gln Glu Ser Gly Pro Gly Leu
        275                 280                 285

Val Arg Pro Ser Gln Thr Leu Ser Leu Thr Cys Thr Val Ser Gly Tyr
    290                 295                 300

Ser Ile Thr Ser Asp His Ala Trp Ser Trp Val Arg Gln Pro Pro Gly
305                 310                 315                 320

Arg Gly Leu Glu Trp Ile Gly Tyr Ile Ser Tyr Ser Gly Ile Thr Thr
                325                 330                 335

Tyr Asn Pro Ser Leu Lys Ser Arg Val Thr Met Leu Arg Asp Thr Ser
            340                 345                 350

Lys Asn Gln Phe Ser Leu Arg Leu Ser Ser Val Thr Ala Ala Asp Thr
        355                 360                 365

Ala Val Tyr Tyr Cys Ala Arg Ser Leu Ala Arg Thr Thr Ala Met Asp
    370                 375                 380

Tyr Trp Gly Gln Gly Ser Leu Val Thr Val Ser Ser Ala Ser Thr Lys
385                 390                 395                 400

Gly Pro Ser Val Phe Pro Leu Ala Pro Ser Ser Lys Ser Thr Ser Gly
                405                 410                 415

Gly Thr Ala Ala Leu Gly Cys Leu Val Lys Asp Tyr Phe Pro Glu Pro
            420                 425                 430

Val Thr Val Ser Trp Asn Ser Gly Ala Leu Thr Ser Gly Val His Thr
        435                 440                 445

Phe Pro Ala Val Leu Gln Ser Ser Gly Leu Tyr Ser Leu Ser Ser Val
    450                 455                 460

Val Thr Val Pro Ser Ser Ser Leu Gly Thr Gln Thr Tyr Ile Cys Asn
465                 470                 475                 480

Val Asn His Lys Pro Ser Asn Thr Lys Val Asp Lys Lys Val Glu Pro
                485                 490                 495

Lys Ser Cys Asp Lys Thr His Thr Cys Pro Pro Cys Pro Ala Pro Glu
            500                 505                 510

Leu Leu Gly Gly Pro Ser Val Phe Leu Phe Pro Pro Lys Pro Lys Asp
        515                 520                 525

Thr Leu Met Ile Ser Arg Thr Pro Glu Val Thr Cys Val Val Val Asp
    530                 535                 540

Val Ser His Glu Asp Pro Glu Val Lys Phe Asn Trp Tyr Val Asp Gly
```

```
                545                 550                 555                 560
          Val Glu Val His Asn Ala Lys Thr Lys Pro Arg Glu Glu Gln Tyr Asn
                              565                 570                 575

Ser Thr Tyr Arg Val Val Ser Val Leu Thr Val Leu His Gln Asp Trp
                              580                 585                 590

Leu Asn Gly Lys Glu Tyr Lys Cys Lys Val Ser Asn Lys Ala Leu Pro
                              595                 600                 605

Ala Pro Ile Glu Lys Thr Ile Ser Lys Ala Lys Gly Gln Pro Arg Glu
                              610                 615                 620

Pro Gln Val Tyr Thr Leu Pro Pro Ser Arg Glu Glu Met Thr Lys Asn
          625                 630                 635                 640

Gln Val Ser Leu Ser Cys Ala Val Lys Gly Phe Tyr Pro Ser Asp Ile
                              645                 650                 655

Ala Val Glu Trp Glu Ser Asn Gly Gln Pro Glu Asn Asn Tyr Lys Thr
                              660                 665                 670

Thr Pro Pro Val Leu Asp Ser Asp Gly Ser Phe Phe Leu Val Ser Lys
                              675                 680                 685

Leu Thr Val Asp Lys Ser Arg Trp Gln Gln Gly Asn Val Phe Ser Cys
                              690                 695                 700

Ser Val Met His Glu Gly Leu His Asn His Tyr Thr Gln Lys Ser Leu
          705                 710                 715                 720

Ser Leu Ser Pro Gly Lys
                              725

<210> SEQ ID NO 10
          <211> LENGTH: 2178
          <212> TYPE: DNA
          <213> ORGANISM: Artificial
          <220> FEATURE:
          <223> OTHER INFORMATION: Nucleic Acid Sequence Encoding BS1 Antibody
                Chain 1 with Tocilizumab Light and Heavy Chains and Human IgG1
                CH1, CH2, and CH3 Domains with "Holes" Substitutions

<400> SEQUENCE: 10
atgagggtcc ccgctcagct cctggggctc ctgctgctct ggctcccagg tgcacgatgt      60
gccggatccg acatccagat gacccagagc cccagcagcc tgagcgccag cgtgggcgac     120
cgcgtgacca tcacctgccg cgccagccag gacatcagca gctacctgaa ctggtaccag     180
cagaagcccg gcaaggcccc caagctgctg atctactaca ccagccgcct gcacagcggc     240
gtgcccagcc gcttcagcgg cagcggcagc ggcaccgact tcaccttcac catcagcagc     300
ctgcagcccg aggacatcgc cacctactac tgccagcagg caacaccct gcctacacc      360 ttcggccagg gcaccaaggt ggagatcaag cgtacggtgg ctgcaccatc tgtcttcatc     420
ttcccgccat ctgatgagca gttgaaatct ggaactgcct ctgttgtgtg cctgctgaat     480
aacttctatc ccagagaggc caaagtacag tggaaggtgg ataacgccct ccaatcgggt     540
aactcccagg agagtgtcac agagcaggac agcaaggaca gcacctacag cctcagcagc     600
accctgacgc tgagcaaagc agactacgag aaacacaaag tctacgcctg cgaagtcacc     660
catcagggcc tgagctcgcc cgtcacaaag agcttcaaca ggggtgagtg cggtggttct     720
gggggatcta gcgatcgggg tctgggtcg actggtacct cgtcaagcgg acgggtact      780 agtgctggta ctacgggcac ttcagctagc acctctggct cggggtccgg cgaggtgcag     840
ctgcaggaga gcggcccccgg cctggtgcgc ccagccaga ccctgagcct gacctgcacc     900
gtgagcggct acagcatcac cagcgaccac gcctggagct gggtgcgcca gccacctggt     960
```

```
cgcggactgg agtggatcgg ctacatcagc tacagcggca tcaccaccta caaccccagc    1020
ctgaagagcc gcgtgaccat gctgcgcgac accagcaaga accagttcag cctgcgcctg    1080
agcagcgtga ccgccgccga caccgccgtg tactactgcg cccgcagcct ggcccgcacc    1140
accgccatgg actactgggg ccagggcagc ctggtgaccg tgagcagcgc tagcaccaag    1200
ggcccatcgg tcttccccct ggcaccctcc tccaagagca cctctggggg cacagcggcc    1260
ctgggctgcc tggtcaagga ctacttcccc gaaccggtga cggtgtcgtg gaactcaggc    1320
gccctgacca gcggcgtgca caccttcccg gctgtcctac agtcctcagg actctactcc    1380
ctcagcagcg tggtgaccgt gccctccagc agcttgggca cccagaccta catctgcaac    1440
gtgaatcaca agcccagcaa caccaaggtg gacaagaaag ttgagcccaa atcttgtgac    1500
aaaactcaca catgcccacc gtgcccagca cctgaactcc tggggggacc gtcagtcttc    1560
ctcttccccc caaaacccaa ggacaccctc atgatctccc ggacccctga ggtcacatgc    1620
gtggtggtgg acgtgagcca cgaagaccct gaggtcaagt tcaactggta cgtggacggc    1680
gtggaggtgc ataatgccaa gacaaagccg cgggaggagc agtacaacag cacgtaccgt    1740
gtggtcagcg tcctcaccgt cctgcaccag gactggctga atggcaagga gtacaagtgc    1800
aaggtctcca acaaagccct cccagccccc atcgagaaaa ccatctccaa agccaaaggg    1860
cagccccgag aaccacaggt gtacaccctg cccccatccc gggaggagat gaccaagaac    1920
caggtcagcc tgtcctgcgc tgtcaaaggc ttctatccca gcgacatcgc cgtggagtgg    1980
gagagcaatg ggcagccgga gaacaactac aagaccacgc ctcccgtgct ggactccgac    2040
ggctccttct tcctcgtgag caagctcacc gtggacaaga gcaggtggca gcaggggaac    2100
gtcttctcat gctccgtgat gcatgagggt ctgcacaacc actacacgca gaagagcctc    2160
tccctgtctc cgggtaaa                                                   2178
```

<210> SEQ ID NO 11
<211> LENGTH: 723
<212> TYPE: PRT
<213> ORGANISM: Artificial
<220> FEATURE:
<223> OTHER INFORMATION: BS1 Antibody Chain 2 with 10H2 Light and Heavy
      Chains and Human IgG1 CH1, CH2, and CH3 Domains with "Knobs"
      Substitutions

<400> SEQUENCE: 11

```
Met Arg Val Pro Ala Gln Leu Leu Gly Leu Leu Leu Leu Trp Leu Pro
1               5                   10                  15

Gly Ala Arg Cys Ala Gly Ser Gln Ala Val Val Thr Gln Glu Ser Ala
            20                  25                  30

Leu Thr Thr Ser Pro Gly Glu Thr Val Thr Leu Thr Cys Arg Ser Ser
        35                  40                  45

Thr Gly Ala Val Thr Thr Ser Asn Tyr Ala Asn Trp Val Gln Glu Lys
    50                  55                  60

Pro Asp His Leu Phe Thr Gly Leu Ile Gly Gly Thr Asn Asn Arg Pro
65                  70                  75                  80

Pro Gly Val Pro Ala Arg Phe Ser Gly Ser Leu Ile Gly Asp Lys Ala
                85                  90                  95

Ala Leu Thr Ile Thr Gly Ala Gln Ile Glu Asp Glu Ala Ile Tyr Phe
            100                 105                 110

Cys Ala Leu Trp Tyr Ser Asn His Leu Val Phe Gly Gly Gly Thr Lys
        115                 120                 125

Leu Thr Val Leu Arg Thr Val Ala Ala Pro Ser Val Phe Ile Phe Pro
```

```
                  130                 135                 140
Pro Ser Asp Glu Gln Leu Lys Ser Gly Thr Ala Ser Val Val Cys Leu
145                 150                 155                 160

Leu Asn Asn Phe Tyr Pro Arg Glu Ala Lys Val Gln Trp Lys Val Asp
                165                 170                 175

Asn Ala Leu Gln Ser Gly Asn Ser Gln Glu Ser Val Thr Glu Gln Asp
                180                 185                 190

Ser Lys Asp Ser Thr Tyr Ser Leu Ser Ser Thr Leu Thr Leu Ser Lys
                195                 200                 205

Ala Asp Tyr Glu Lys His Lys Val Tyr Ala Cys Glu Val Thr His Gln
        210                 215                 220

Gly Leu Ser Ser Pro Val Thr Lys Ser Phe Asn Arg Gly Glu Cys Gly
225                 230                 235                 240

Gly Ser Gly Gly Ser Gly Ser Gly Ser Gly Thr Ser
                245                 250                 255

Ser Ser Gly Thr Gly Thr Ser Ala Gly Thr Thr Gly Thr Ser Ala Ser
                260                 265                 270

Thr Ser Gly Ser Gly Ser Gly Glu Val Gln Leu Val Glu Thr Gly Gly
        275                 280                 285

Arg Leu Val Gln Pro Lys Gly Ser Leu Lys Leu Ser Cys Ala Val Ser
        290                 295                 300

Gly Ile Thr Phe Lys Thr Asn Ala Met Asn Trp Val Arg Gln Ala Pro
305                 310                 315                 320

Gly Lys Gly Leu Glu Trp Val Ala Arg Ile Arg Thr Lys Ser Tyr Asn
                325                 330                 335

Tyr Ala Thr Tyr Tyr Ala Asp Ser Val Lys Asp Arg Phe Thr Ile Ser
                340                 345                 350

Arg Asp Asp Ser Gln Ser Ile Leu Tyr Leu Gln Met Asn Asn Leu Lys
        355                 360                 365

Thr Glu Asp Thr Ala Met Tyr His Cys Val Arg Glu Gly Arg Trp Gly
        370                 375                 380

Gln Gly Thr Leu Val Thr Val Ser Ala Ala Ser Thr Lys Gly Pro Ser
385                 390                 395                 400

Val Phe Pro Leu Ala Pro Ser Ser Lys Ser Thr Ser Gly Gly Thr Ala
                405                 410                 415

Ala Leu Gly Cys Leu Val Lys Asp Tyr Phe Pro Glu Pro Val Thr Val
                420                 425                 430

Ser Trp Asn Ser Gly Ala Leu Thr Ser Gly Val His Thr Phe Pro Ala
        435                 440                 445

Val Leu Gln Ser Ser Gly Leu Tyr Ser Leu Ser Ser Val Val Thr Val
        450                 455                 460

Pro Ser Ser Ser Leu Gly Thr Gln Thr Tyr Ile Cys Asn Val Asn His
465                 470                 475                 480

Lys Pro Ser Asn Thr Lys Val Asp Lys Lys Val Glu Pro Lys Ser Cys
                485                 490                 495

Asp Lys Thr His Thr Cys Pro Pro Cys Pro Ala Pro Glu Leu Leu Gly
                500                 505                 510

Gly Pro Ser Val Phe Leu Phe Pro Pro Lys Pro Lys Asp Thr Leu Met
        515                 520                 525

Ile Ser Arg Thr Pro Glu Val Thr Cys Val Val Val Asp Val Ser His
        530                 535                 540

Glu Asp Pro Glu Val Lys Phe Asn Trp Tyr Val Asp Gly Val Glu Val
545                 550                 555                 560
```

```
His Asn Ala Lys Thr Lys Pro Arg Glu Glu Gln Tyr Asn Ser Thr Tyr
            565                 570                 575
Arg Val Val Ser Val Leu Thr Val Leu His Gln Asp Trp Leu Asn Gly
        580                 585                 590
Lys Glu Tyr Lys Cys Lys Val Ser Asn Lys Ala Leu Pro Ala Pro Ile
    595                 600                 605
Glu Lys Thr Ile Ser Lys Ala Lys Gly Gln Pro Arg Glu Pro Gln Val
610                 615                 620
Tyr Thr Leu Pro Pro Ser Arg Glu Glu Met Thr Lys Asn Gln Val Ser
625                 630                 635                 640
Leu Trp Cys Leu Val Lys Gly Phe Tyr Pro Ser Asp Ile Ala Val Glu
                645                 650                 655
Trp Glu Ser Asn Gly Gln Pro Glu Asn Asn Tyr Lys Thr Thr Pro Pro
            660                 665                 670
Val Leu Asp Ser Asp Gly Ser Phe Phe Leu Tyr Ser Lys Leu Thr Val
        675                 680                 685
Asp Lys Ser Arg Trp Gln Gln Gly Asn Val Phe Ser Cys Ser Val Met
    690                 695                 700
His Glu Gly Leu His Asn His Tyr Thr Gln Lys Ser Leu Ser Leu Ser
705                 710                 715                 720
Pro Gly Lys
```

<210> SEQ ID NO 12
<211> LENGTH: 2169
<212> TYPE: DNA
<213> ORGANISM: Artificial
<220> FEATURE:
<223> OTHER INFORMATION: Nucleic Acid Sequence Encoding BS1 Antibody
      Chain 2 with 10H2 Light and Heavy Chains and Human IgG1 CH1, CH2,
      and CH3 Domains with "Knobs" Substitution <400> SEQUENCE: 12

```
atgagggtcc ccgctcagct cctggggctc ctgctgctct ggctcccagg tgcacgatgt      60
gccggatccc aggctgttgt gactcaggaa tctgcactca ccacatcacc tggtgaaaca     120
gtcacactca cttgtcgctc aagtactggg gctgttacaa ctagtaacta tgccaactgg     180
gtccaagaaa aaccagatca tttattcact ggtctaatag gtggtaccaa caaccgacct     240
ccaggtgttc ctgccagatt ctcaggctcc ctgattggag acaaggctgc cctcaccatc     300
acaggggcac agattgagga tgaggcaata tatttctgtg ctctatggta cagcaaccat     360
ttggtgttcg gtggaggaac caaactgact gtcctacgta cggtggctgc accatctgtc     420
ttcatcttcc cgccatctga tgagcagttg aaatctggaa ctgcctctgt tgtgtgcctg     480
ctgaataact tctatcccag agaggccaaa gtacagtgga aggtggataa cgccctccaa     540
tcgggtaact cccaggagag tgtcacagag caggacagca aggacagcac ctacagcctc     600
agcagcaccc tgacgctgag caaagcagac tacgagaaac acaaagtcta cgcctgcgaa     660
gtcacccatc agggcctgag ctcgcccgtc acaaagagct tcaacagggg tgagtgcggt     720
ggttctgggg gatctagcgg atcggggtct gggtcgactg gtacctcgtc aagcgggacg     780
ggtactagtg ctggtactac gggcacttca gctagcacct ctggctcggg gtccggcgag     840
gtgcagcttg ttgaaactgg tggagattg gtgcagccta agggtcatt gaaactctca     900
tgtgcagtct ctggaatcac cttcaagacc aatgccatga actgggtccg ccaggctcca     960
ggaaagggtt tggaatgggt tgctcgcata agaactaaaa gttataatta tgcaacatat    1020
```

```
tatgccgatt cagtgaaaga caggttcacc atctccagag atgattcaca aagcattctc    1080
tatctgcaaa tgaacaattt gaaaactgag acacagcca tgtatcactg tgtgagagag    1140
ggccgctggg gccaagggac tctggtcact gtctctgcag ctagcaccaa gggcccatcg    1200 gtcttcccc tggcaccctc ctccaagagc acctctgggg gcacagcggc cctgggctgc    1260
ctggtcaagg actacttccc cgaaccggtg acggtgtcgt ggaactcagg cgccctgacc    1320
agcggcgtgc acaccttccc ggctgtccta cagtcctcag gactctactc cctcagcagc    1380
gtggtgaccg tgccctccag cagcttgggc acccagacct acatctgcaa cgtgaatcac    1440
aagcccagca acaccaaggt ggacaagaaa gttgagccca atcttgtga caaaactcac    1500 acatgcccac cgtgcccagc acctgaactc ctggggggac cgtcagtctt cctcttcccc    1560
ccaaaaccca aggacaccct catgatctcc cggacccctg aggtcacatg cgtggtggtg    1620
gacgtgagcc acgaagaccc tgaggtcaag ttcaactggt acgtggacgg cgtggaggtg    1680
cataatgcca agacaaagcc gcgggaggag cagtacaaca gcacgtaccg tgtggtcagc    1740
gtcctcaccg tcctgcacca ggactggctg aatggcaagg agtacaagtg caaggtctcc    1800
aacaaagccc tcccagcccc catcgagaaa accatctcca aagccaaagg gcagccccga    1860
gaaccacagg tgtacaccct gcccccatcc cgggaggaga tgaccaagaa ccaggtcagc    1920
ctgtggtgcc tggtcaaagg cttctatccc agcgacatcg ccgtggagtg ggagagcaat    1980
gggcagccgg agaacaacta caagaccacg cctcccgtgc tggactccga cggctccttc    2040
ttcctctaca gcaagctcac cgtggacaag agcaggtggc agcaggggaa cgtcttctca    2100
tgctccgtga tgcatgaggg tctgcacaac cactacacgc agaagagcct ctccctgtct    2160
ccgggtaaa                                                           2169
```

<210> SEQ ID NO 13
<211> LENGTH: 40
<212> TYPE: PRT
<213> ORGANISM: Artificial
<220> FEATURE:
<223> OTHER INFORMATION: Exemplary Linker

<400> SEQUENCE: 13

Gly Gly Ser Gly Gly Ser Ser Gly Ser Gly Ser Gly Ser Thr Gly Thr
1               5                   10                  15

Ser Ser Ser Gly Thr Gly Thr Ser Ala Gly Thr Thr Gly Thr Ser Ala
            20                  25                  30

Ser Thr Ser Gly Ser Gly Ser Gly
        35                  40

<210> SEQ ID NO 14
<211> LENGTH: 467
<212> TYPE: PRT
<213> ORGANISM: Artificial
<220> FEATURE:
<223> OTHER INFORMATION: BS2 10H2 Heavy Chain

<400> SEQUENCE: 14

Met Arg Val Pro Ala Gln Leu Leu Gly Leu Leu Leu Leu Trp Leu Pro
1               5                   10                  15

Gly Ala Arg Cys Ala Gly Ser Glu Val Gln Leu Val Glu Thr Gly Gly
            20                  25                  30

Arg Leu Val Gln Pro Lys Gly Ser Leu Lys Leu Ser Cys Ala Val Ser
        35                  40                  45

Gly Ile Thr Phe Lys Thr Asn Ala Met Asn Trp Val Arg Gln Ala Pro

```
              50                  55                  60
    Gly Lys Gly Leu Glu Trp Val Ala Arg Ile Arg Thr Lys Ser Tyr Asn
    65                  70                  75                  80

Tyr Ala Thr Tyr Tyr Ala Asp Ser Val Lys Asp Arg Phe Thr Ile Ser
                        85                  90                  95

Arg Asp Asp Ser Gln Ser Ile Leu Tyr Leu Gln Met Asn Asn Leu Lys
                    100                 105                 110

Thr Glu Asp Thr Ala Met Tyr His Cys Val Arg Glu Gly Arg Trp Gly
                115                 120                 125

Gln Gly Thr Leu Val Thr Val Ser Ala Ala Ser Thr Lys Gly Pro Ser
            130                 135                 140

Val Phe Pro Leu Ala Pro Ser Ser Lys Ser Thr Ser Gly Gly Thr Ala
    145                 150                 155                 160

Ala Leu Gly Cys Leu Val Lys Asp Tyr Phe Pro Glu Pro Val Thr Val
                        165                 170                 175

Ser Trp Asn Ser Gly Ala Leu Thr Ser Gly Val His Thr Phe Pro Ala
                    180                 185                 190

Val Leu Gln Ser Ser Gly Leu Tyr Ser Leu Ser Ser Val Val Thr Val
                195                 200                 205

Pro Ser Ser Ser Leu Gly Thr Gln Thr Tyr Ile Cys Asn Val Asn His
            210                 215                 220

Lys Pro Ser Asn Thr Lys Val Asp Lys Val Glu Pro Lys Ser Cys
    225                 230                 235                 240

Asp Lys Thr His Thr Cys Pro Pro Cys Pro Ala Pro Glu Leu Leu Gly
                        245                 250                 255

Gly Pro Ser Val Phe Leu Phe Pro Pro Lys Pro Lys Asp Thr Leu Met
                    260                 265                 270

Ile Ser Arg Thr Pro Glu Val Thr Cys Val Val Val Asp Val Ser His
                275                 280                 285

Glu Asp Pro Glu Val Lys Phe Asn Trp Tyr Val Asp Gly Val Glu Val
            290                 295                 300

His Asn Ala Lys Thr Lys Pro Arg Glu Glu Gln Tyr Asn Ser Thr Tyr
    305                 310                 315                 320

Arg Val Val Ser Val Leu Thr Val Leu His Gln Asp Trp Leu Asn Gly
                        325                 330                 335

Lys Glu Tyr Lys Cys Lys Val Ser Asn Lys Ala Leu Pro Ala Pro Ile
                    340                 345                 350

Glu Lys Thr Ile Ser Lys Ala Lys Gly Gln Pro Arg Glu Pro Gln Val
                355                 360                 365

Tyr Thr Leu Pro Pro Ser Arg Glu Glu Met Thr Lys Asn Gln Val Ser
            370                 375                 380

Leu Thr Cys Leu Val Lys Gly Phe Tyr Pro Ser Asp Ile Ala Val Glu
    385                 390                 395                 400

Trp Glu Ser Asn Gly Gln Pro Glu Asn Asn Tyr Lys Thr Thr Pro Pro
                        405                 410                 415

Val Leu Asp Ser Asp Gly Ser Phe Phe Leu Tyr Ser Lys Leu Thr Val
                    420                 425                 430

Asp Lys Ser Arg Trp Gln Gln Gly Asn Val Phe Ser Cys Ser Val Met
                435                 440                 445

His Glu Gly Leu His Asn His Tyr Thr Gln Lys Ser Leu Ser Leu Ser
            450                 455                 460

Pro Gly Lys
    465
```

<210> SEQ ID NO 15
<211> LENGTH: 490
<212> TYPE: PRT
<213> ORGANISM: Artificial
<220> FEATURE:
<223> OTHER INFORMATION: BS2 10H2+Tocilizumab scFv Light Chain

<400> SEQUENCE: 15

Met Arg Val Pro Ala Gln Leu Leu Gly Leu Leu Leu Trp Leu Pro
1               5                   10                  15

Gly Ala Arg Cys Ala Gly Ser Gln Ala Val Val Thr Gln Glu Ser Ala
            20                  25                  30

Leu Thr Thr Ser Pro Gly Glu Thr Val Thr Leu Thr Cys Arg Ser Ser
                35                  40                  45

Thr Gly Ala Val Thr Thr Ser Asn Tyr Ala Asn Trp Val Gln Glu Lys
        50                  55                  60

Pro Asp His Leu Phe Thr Gly Leu Ile Gly Gly Thr Asn Asn Arg Pro
65                  70                  75                  80

Pro Gly Val Pro Ala Arg Phe Ser Gly Ser Leu Ile Gly Asp Lys Ala
                85                  90                  95

Ala Leu Thr Ile Thr Gly Ala Gln Ile Glu Asp Glu Ala Ile Tyr Phe
            100                 105                 110

Cys Ala Leu Trp Tyr Ser Asn His Leu Val Phe Gly Gly Thr Lys
            115                 120                 125

Leu Thr Val Leu Arg Thr Val Ala Ala Pro Ser Val Phe Ile Phe Pro
        130                 135                 140

Pro Ser Asp Glu Gln Leu Lys Ser Gly Thr Ala Ser Val Val Cys Leu
145                 150                 155                 160

Leu Asn Asn Phe Tyr Pro Arg Glu Ala Lys Val Gln Trp Lys Val Asp
                165                 170                 175

Asn Ala Leu Gln Ser Gly Asn Ser Gln Glu Ser Val Thr Glu Gln Asp
            180                 185                 190

Ser Lys Asp Ser Thr Tyr Ser Leu Ser Ser Thr Leu Thr Leu Ser Lys
        195                 200                 205

Ala Asp Tyr Glu Lys His Lys Val Tyr Ala Cys Glu Val Thr His Gln
    210                 215                 220

Gly Leu Ser Ser Pro Val Thr Lys Ser Phe Asn Arg Gly Glu Cys Gly
225                 230                 235                 240

Gly Gly Gly Ser Gly Gly Gly Ser Glu Val Gln Leu Gln Glu Ser
                245                 250                 255

Gly Pro Gly Leu Val Arg Pro Ser Gln Thr Leu Ser Leu Thr Cys Thr
            260                 265                 270

Val Ser Gly Tyr Ser Ile Thr Ser Asp His Ala Trp Ser Trp Val Arg
        275                 280                 285

Gln Pro Pro Gly Arg Gly Leu Glu Trp Ile Gly Tyr Ile Ser Tyr Ser
    290                 295                 300

Gly Ile Thr Thr Tyr Asn Pro Ser Leu Lys Ser Arg Val Thr Met Leu
305                 310                 315                 320

Arg Asp Thr Ser Lys Asn Gln Phe Ser Leu Arg Leu Ser Ser Val Thr
                325                 330                 335

Ala Ala Asp Thr Ala Val Tyr Tyr Cys Ala Arg Ser Leu Ala Arg Thr
            340                 345                 350

Thr Ala Met Asp Tyr Trp Gly Gln Gly Ser Leu Val Thr Val Ser Ser
        355                 360                 365

```
Gly Gly Gly Gly Ser Gly Gly Gly Ser Gly Gly Gly Ser Asp
        370                 375                 380

Ile Gln Met Thr Gln Ser Pro Ser Ser Leu Ser Ala Ser Val Gly Asp
385                 390                 395                 400

Arg Val Thr Ile Thr Cys Arg Ala Ser Gln Asp Ile Ser Ser Tyr Leu
                405                 410                 415

Asn Trp Tyr Gln Gln Lys Pro Gly Lys Ala Pro Lys Leu Leu Ile Tyr
            420                 425                 430

Tyr Thr Ser Arg Leu His Ser Gly Val Pro Ser Arg Phe Ser Gly Ser
        435                 440                 445

Gly Ser Gly Thr Asp Phe Thr Phe Thr Ile Ser Ser Leu Gln Pro Glu
        450                 455                 460

Asp Ile Ala Thr Tyr Tyr Cys Gln Gln Gly Asn Thr Leu Pro Tyr Thr
465                 470                 475                 480

Phe Gly Gln Gly Thr Lys Val Glu Ile Lys
                485                 490

<210> SEQ ID NO 16
<211> LENGTH: 6
<212> TYPE: PRT
<213> ORGANISM: Artificial
<220> FEATURE:
<223> OTHER INFORMATION: Tocilizumab Heavy Chain Variable Region CDR1

<400> SEQUENCE: 16

Ser Asp His Ala Trp Ser
1               5

<210> SEQ ID NO 17
<211> LENGTH: 16
<212> TYPE: PRT
<213> ORGANISM: Artificial
<220> FEATURE:
<223> OTHER INFORMATION: Tocilizumab Heavy Chain Variable Region CDR2

<400> SEQUENCE: 17

Tyr Ile Ser Tyr Ser Gly Ile Thr Thr Tyr Asn Pro Ser Leu Lys Ser
1               5                   10                  15

<210> SEQ ID NO 18
<211> LENGTH: 10
<212> TYPE: PRT
<213> ORGANISM: Artificial
<220> FEATURE:
<223> OTHER INFORMATION: Tocilizumab Heavy Chain Variable Region CDR3

<400> SEQUENCE: 18

Ser Leu Ala Arg Thr Thr Ala Met Asp Tyr
1               5                   10

<210> SEQ ID NO 19
<211> LENGTH: 11
<212> TYPE: PRT
<213> ORGANISM: Artificial
<220> FEATURE:
<223> OTHER INFORMATION: Tocilizumab Light Chain Variable Region CDR1

<400> SEQUENCE: 19

Arg Ala Ser Gln Asp Ile Ser Ser Tyr Leu Asn
1               5                   10

<210> SEQ ID NO 20
```

```
<211> LENGTH: 7
<212> TYPE: PRT
<213> ORGANISM: Artificial
<220> FEATURE:
<223> OTHER INFORMATION: Tocilizumab Light Chain Variable Region CDR2

<400> SEQUENCE: 20

Tyr Thr Ser Arg Leu His Ser
1               5

<210> SEQ ID NO 21
<211> LENGTH: 9
<212> TYPE: PRT
<213> ORGANISM: Artificial
<220> FEATURE:
<223> OTHER INFORMATION: Tocilizumab Light Chain Variable Region CDR3

<400> SEQUENCE: 21

Gln Gln Gly Asn Thr Leu Pro Tyr Thr
1               5

<210> SEQ ID NO 22
<211> LENGTH: 8
<212> TYPE: PRT
<213> ORGANISM: Artificial
<220> FEATURE:
<223> OTHER INFORMATION: 10H2 Heavy Chain Variable Region CDR1

<400> SEQUENCE: 22

Gly Ile Thr Phe Lys Thr Asn Ala
1               5

<210> SEQ ID NO 23
<211> LENGTH: 10
<212> TYPE: PRT
<213> ORGANISM: Artificial
<220> FEATURE:
<223> OTHER INFORMATION: 10H2 Heavy Chain Variable Region CDR2

<400> SEQUENCE: 23

Ile Arg Thr Lys Ser Tyr Asn Tyr Ala Thr
1               5                   10

<210> SEQ ID NO 24
<211> LENGTH: 5
<212> TYPE: PRT
<213> ORGANISM: Artificial
<220> FEATURE:
<223> OTHER INFORMATION: 10H2 Heavy Chain Variable Region CDR3

<400> SEQUENCE: 24

Val Arg Glu Gly Arg
1               5

<210> SEQ ID NO 25
<211> LENGTH: 9
<212> TYPE: PRT
<213> ORGANISM: Artificial
<220> FEATURE:
<223> OTHER INFORMATION: 10H2 Light Chain Variable Region CDR1

<400> SEQUENCE: 25

Thr Gly Ala Val Thr Thr Ser Asn Tyr
1               5

<210> SEQ ID NO 26
<211> LENGTH: 3
```

```
<212> TYPE: PRT
<213> ORGANISM: Artificial
<220> FEATURE:
<223> OTHER INFORMATION: 10H2 Light Chain Variable Region CDR2

<400> SEQUENCE: 26

Gly Thr Asn
1

<210> SEQ ID NO 27
<211> LENGTH: 9
<212> TYPE: PRT
<213> ORGANISM: Artificial
<220> FEATURE:
<223> OTHER INFORMATION: 10H2 Light Chain Variable Region CDR3

<400> SEQUENCE: 27

Ala Leu Trp Tyr Ser Asn His Leu Val
1               5
```

BISPECIFIC BINDING AGENTS

CROSS-REFERENCE TO RELATED APPLICATIONS

This application is a National Stage application under 35 U.S.C. § 371 of International Application No. PCT/US2020/035200 having an International Filing Date of May 29, 2020, which claims priority to U.S. Provisional Patent Application 62/855,665 filed on May 31, 2019. The contents of these applications are incorporated herein by reference in their entireties.

SEQUENCE LISTING

This application contains a Sequence Listing that has been submitted electronically as an ASCII text file named "SEQ.txt." The ASCII text file, created on Nov. 19, 2021, is 40,039 bytes in size. The material in the ASCII text file is hereby incorporated by reference in its entirety.

TECHNICAL FIELD

Monoclonal antibodies can be used in immunotherapy and disease treatment and are a cornerstone of the pharmaceutical market. Monoclonal antibodies can possess high affinity, pinpoint specificity, stability, extended in vivo-half life, and multi-tiered mechanisms of action. However, monoclonal antibodies are not without limitations, such as, acquired resistance or side effects. Immunotherapy and disease treatment with more than one monoclonal antibody also requires dosing ratio optimization. Thus, there is a need for improved antibody methods for immunotherapy and disease treatment.

BACKGROUND

Metastasis is the spread of cancer from a primary site to a distal site through the circulatory or lymphatic systems. Conventional development of anti-cancer therapeutics assumes that drugs that target tumor growth will also target metastasis, or that interrupting metastasis is not necessary in the face of overwhelming growth inhibition.

As a result, metastasis has largely not been targeted specifically and separately from tumor growth in cancer drug development.

Monoclonal antibodies can be used in immunotherapy and disease treatment and are a cornerstone of the pharmaceutical market. Monoclonal antibodies can possess high affinity, pinpoint specificity, stability, extended in vivo-half life, and multi-tiered mechanisms of action. However, monoclonal antibodies are not without limitations, such as, acquired resistance or side effects. Immunotherapy and disease treatment with more than one monoclonal antibody also requires dosing ratio optimization.

Thus, there is a need for improved antibody methods for immunotherapy and disease treatment.

SUMMARY

Provided herein is a novel bispecific binding agent that combines a knobs-in-holes dimerization strategy and a single-chain Fab expression approach to generate a bispecific binding agent with specificity for: IL-6Rα and IL-8R. Bispecific binding agents provided herein can be used in the treatment of cancer (alone or in combination with other therapeutics), particularly in the inhibition of metastasis. Bispecific binding agents provided herein can also be used in any of a variety of in vitro systems and assays.

Bispecific binding agents simultaneously engage two different targets with increased affinity, avidity, potency, and selectivity over monoclonal antibodies. Provided herein are novel bispecific binding agents that bind IL-6Rα and IL-8R, which bispecific binding agents combine a knobs-in-holes approach with a single-chain Fab having a flexible linker, resulting in a novel bispecific agent format (FIG. 1D). In some embodiments, bispecific binding agents provided herein include a knobs-in-holes format in which amino acid substitutions are introduced into the third heavy chain constant domains of the antibody heavy chains. Such a knobs-in-holes approach can enforce proper heterodimerization over homodimerization of the antibody heavy chains. In some embodiments, bispecific binding agents provided herein include a single-chain Fab format that results the C-terminus of the light chain constant domain (CL) to the N-terminus of the variable heavy (VH) chain with a flexible linker. The single-chain Fab construction enforces proper variable heavy and variable light chain pairing. Combination of a knobs-in-holes approach with a single-chain Fab format results in a novel bispecific format that exhibits improved characteristics over conventional antibody-derivative formats.

In some embodiments, provided herein are bispecific binding agents that include: first polypeptide comprising a first antibody heavy chain or portion thereof, a linker, and a first antibody light chain or portion thereof, wherein the first linker connects the first antibody heavy chain or portion thereof and the first antibody light chain or portion thereof, and wherein the first antibody heavy chain or portion thereof and the first antibody light chain or portion thereof form a first binding site specific for IL-6Rα; a second polypeptide comprising a second polypeptide antibody heavy chain or portion thereof, a second linker, and a second polypeptide antibody light chain or portion thereof, wherein the second linker connects the second antibody heavy chain or portion thereof and the second antibody light chain or portion thereof, and wherein the second antibody heavy chain or portion thereof and the second antibody light chain or portion thereof form a second binding site specific for IL-8R, wherein the first antibody heavy chain or portion thereof comprises one or more amino acid substitutions, the second antibody heavy chain or portion thereof comprises one or more amino acid substitutions, or both, such that the first polypeptide antibody heavy chain or portion thereof and the second polypeptide antibody heavy chain or portion thereof preferentially associate with each other to form the bispecific binding agent.

In some embodiments of bispecific binding agents provided herein, the first antibody heavy chain or portion thereof comprises a CH1 domain or portion thereof, a CH2 domain or portion thereof, a CH3 domain or portion thereof, and a VH domain or portion thereof. In some embodiments, the second antibody heavy chain or portion thereof, comprises a CH1 domain or portion thereof, a CH2 domain or portion thereof, a CH3 domain or portion thereof, and a VH domain or portion thereof. In some embodiments, the first polypeptide and the second polypeptide preferentially associate with each other as compared to a corresponding first polypeptide comprising an antibody heavy chain that lacks the one or more amino acid substitutions, a corresponding second polypeptide comprising a second antibody heavy chain that lacks the one or more amino acid substitutions, or both. In some embodiments, the first antibody light chain comprises a CL domain or portion thereof and a VL domain or portion thereof. In some embodiments, the second antibody light chain comprises a CL domain or portion thereof and a VL domain or portion thereof. In some embodiments, the first polypeptide linker connects a CL domain of the first antibody light chain to a VH domain of the first antibody heavy chain. In some embodiments, the second polypeptide linker connects a CL domain of the second antibody light chain to a VH domain of the second antibody heavy chain. In some embodiments, the first polypeptide linker comprises a polypeptide having at least 80% sequence identity to SEQ ID NO: 13. In some embodiments, the second polypeptide linker comprises a polypeptide having at least 80% sequence identity to SEQ ID NO: 13. In some embodiments, the one or more amino acid substitutions in the first antibody heavy chain or portion thereof comprises an amino acid substitution at a one or more of positions 645, 647, and 686 of SEQ ID NO: 9. In some embodiments, the one or more amino acid substitutions in the second antibody heavy chain or portion thereof comprises an amino acid substitution at a one or more of positions 642 of SEQ ID NO: 11.

In some embodiments of bispecific binding agents provided herein, the first antibody heavy chain or portion thereof comprises a VH domain comprising: a heavy chain CDR1 domain comprising SEQ ID NO: 16, a heavy chain CDR2 domain comprising SEQ ID NO: 17, and a heavy chain CDR3 domain comprising SEQ ID NO: 18; and the first antibody light chain or portion thereof comprises a VL domain comprising: a light chain CDR1 domain comprising SEQ ID NO: 19, a light chain CDR2 domain comprising SEQ ID NO: 20, and a light chain CDR3 domain comprising SEQ ID NO: 21.

In some embodiments of bispecific binding agents provided herein, the second antibody heavy chain or portion thereof comprises a VH domain comprising: a heavy chain CDR1 domain comprising SEQ ID NO: 22, a heavy chain CDR2 domain comprising SEQ ID NO: 23, and a heavy chain CDR3 domain comprising SEQ ID NO: 24; and the second antibody light chain or portion thereof comprises a VL domain comprising: a light chain CDR1 domain comprising SEQ ID NO: 25, a light chain CDR2 domain comprising SEQ ID NO: 26, and a light chain CDR3 domain comprising SEQ ID NO: 27.

In some embodiments of bispecific binding agents provided herein, the first antibody heavy chain or portion thereof comprises a VH domain comprising: a heavy chain CDR1 domain comprising SEQ ID NO: 16, a heavy chain CDR2 domain comprising SEQ ID NO: 17, and a heavy chain CDR3 domain comprising SEQ ID NO: 18; the first antibody light chain or portion thereof comprises a VL domain comprising: a light chain CDR1 domain comprising SEQ ID NO: 19, a light chain CDR2 domain comprising SEQ ID NO: 20, and a light chain CDR3 domain comprising SEQ ID NO: 21; the second antibody heavy chain or portion thereof comprises a VH domain comprising: a heavy chain CDR1 domain comprising SEQ ID NO: 22, a heavy chain CDR2 domain comprising SEQ ID NO: 23, and a heavy chain CDR3 domain comprising SEQ ID NO: 24; and the second antibody light chain or portion thereof comprises a VL domain comprising: a light chain CDR1 domain comprising SEQ ID NO: 25, a light chain CDR2 domain comprising SEQ ID NO: 26, and a light chain CDR3 domain comprising SEQ ID NO: 27.

In some embodiments of bispecific binding agents provided herein, the first binding site comprises: the VH domain comprising residues 278-396 of SEQ ID NO: 9, and the VL domain comprising residues 24-130 of SEQ ID NO: 9. In some embodiments of bispecific binding agents provided herein, the second binding site comprises: the VH domain comprising residues 280-393 of SEQ ID NO: 11, and the VL domain comprising residues 24-132 of SEQ ID NO: 11.

In some embodiments, provided herein are pharmaceutical compositions that include any of the bispecific binding agents provided herein.

In some embodiments, provided herein are methods of treating a disease in a subject in need thereof that include administering a therapeutically effective amount any of the bispecific binding agents provided herein or any of the pharmaceutical compositions that include any of the bispecific binding agents provided herein. In some embodiments, the disease is cancer. In some embodiments, the method inhibits metastatic cell migration of the cancer. In some embodiments, the cancer is a breast cancer. In some embodiments, the cancer is a triple negative breast cancer. In some embodiments, the cancer is a pancreatic cancer. In some embodiments, the cancer is a pancreatic ductal adenocarcinoma.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used.

Other features and advantages of the invention will be apparent from the following Detailed Description, and from the claims. It should be understood, however, that the Detailed Description and the specific examples, while indicating certain embodiments of the invention, are given by way of illustration only, since various changes and modifications within the spirit and scope of the invention will become apparent to those skilled in the art from this detailed description. All publications mentioned herein, including patents, patent application publications, and scientific papers, are incorporated by reference in their entirety.

DETAILED DESCRIPTION

Figure 1A:
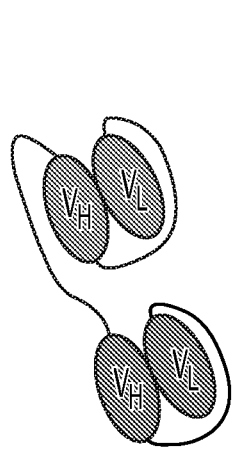
FIG. 1. Exemplary bispecific binding agent format combining a knobs-in-holes assembly strategy and a single-chain Fab expression approach. A) Schematic of a tandem scFv. B) Schematic of scFv-IgG fusion (BS2 format). C) Schematic of scFv-Fc fusion showing the knobs-in-holes approach. D) Schematic of bispecific binding agent provided herein.

Metastasis is the spread of cancer from a primary site to a distal site through the circulatory or lymphatic systems and is responsible for 90% of cancer related deaths (Weinberg R A. The biology of cancer. Second edition. New York: Garland Science, Taylor & Francis Group; 2014). Conventional development of anti-cancer therapeutics assumes that drugs that target tumor growth will also target metastasis, or that interrupting metastasis is not necessary in the face of overwhelming growth inhibition.

As a result, the process of metastasis has typically not been targeted specifically and separately from tumor growth in cancer drug development, and many therapies currently used in the clinic can actually induce metastasis (Steeg P S. Targeting metastasis. Nat Rev Cancer. 2016 April; 16(4): 201-218. PMID: 27009393; Karagiannis G S, Pastoriza J M, Wang Y, Harney A S, Entenberg D, Pignatelli J, Sharma V P, Xue E A, Cheng E, D'Alfonso T M, Jones J G, Anampa J, Rohan T E, Sparano J A, Condeelis J S, Oktay M H. Neoadjuvant chemotherapy induces breast cancer metastasis through a TMEM-mediated mechanism. Sci Transl Med. 2017 05; 9 (397). PMCID: PMC5592784; Obenauf A C, Zou Y, Ji A L, Vanharanta S, Shu W, Shi H, Kong X, Bosenberg M C, Wiesner T, Rosen N, Lo R S, Massagué J. Therapy-induced tumour secretomes promote resistance and tumour progression. Nature. 2015 Apr. 16; 520(7547):368-372. PMCID: PMC4507807; Martin O A, Anderson R L, Narayan K, MacManus M P. Does the mobilization of circulating tumour cells during cancer therapy cause metastasis? Nat Rev Clin Oncol. 2017 January; 14(1):32-44. PMID: 27550857).

Targeting cancer metastasis depends on the elucidation of metastatic mechanisms. A synergistic paracrine signaling pathway between the interleukin-6 cytokine (IL-6) and the interleukin-8 chemokine (IL-8) is unique to tumorigenic, metastatic cells (Jayatilaka H, Tyle P, Chen J J, Kwak M, Ju J, Kim H J, Lee J S H, Wu P-H, Gilkes D M, Fan R, Wirtz D. Synergistic IL-6 and IL-8 paracrine signalling pathway infers a strategy to inhibit tumour cell migration. Nat Commun. 2017 26; 8:15584. PMCID: PMC5458548). The mechanism underlying this pathway couples tumor cell proliferation and migration, two key drivers of metastasis, via local tumor cell density (number of cells/unit volume). As tumor cells proliferate and local cell density increases, both IL-6 and IL-8 expression is enhanced, causing an increase in tumor cell migration (i.e., cell density-dependent migration).

Pharmacological inhibition of this synergistic pathway through targeted blockade of the IL-6 and IL-8 receptors (IL-6Rα and IL-8R), using a combination of the anti-IL-6 receptor antibody drug tocilizumab (currently used to treat rheumatoid arthritis) (Nakashima Y, Kondo M, Fukuda T, Harada H, Horiuchi T, Ishinishi T, Jojima H, Kuroda K, Miyahara H, Maekawa M, Nishizaka H, Nagamine R, Nakashima H, Otsuka T, Shono E, Suematsu E, Shimauchi T, Tsuru T, Wada K, Yoshizawa S, Yoshizawa S, Iwamoto Y. Remission in patients with active rheumatoid arthritis by tocilizumab treatment in routine clinical practice: results from 3 years of prospectively registered data. Mod Rheumatol. 2014 March; 24(2):258-264. PMID: 24593201) and the anti-IL-8 receptor small molecule drug reparixin (currently in phase II clinical trials against breast cancer), (Goldstein L J, Perez R P, Yardley D A, Han L K, Reuben J M, McCanna S, Butler B, Ruffini P A, Chang J C. Abstract CT057: A single-arm, preoperative, pilot study to evaluate the safety and biological effects of orally administered reparixin in early breast cancer patients who are candidates for surgery. Cancer Res. 2016 Jul. 15; 76 (14 Supplement): CT057-CT057; Schott A F, Goldstein L J, Cristofanilli M, Ruffini P A, McCanna S, Reuben J M, Perez R P, Kato G, Wicha M. Phase Ib Pilot Study to Evaluate Reparixin in Combination with Weekly Paclitaxel in Patients with HER-2-Negative Metastatic Breast Cancer. Clin Cancer Res Off J Am Assoc Cancer Res. 2017 Sep. 15; 23(18):5358-5365. PMCID: PMC5600824) significantly decreases cell motility in 3D models of migration (Jayatilaka H, Tyle P, Chen J J, Kwak M, Ju J, Kim H J, Lee J S H, Wu P-H, Gilkes D M, Fan R, Wirtz D. Synergistic IL-6 and IL-8 paracrine signalling pathway infers a strategy to inhibit tumour cell migration. Nat Commun. 2017 26; 8:15584. PMCID: PMC5458548). Furthermore, pre-clinical testing in mouse models revealed that combination treatment with tocilizumab and reparixin markedly suppresses metastasis to the lungs, liver, and lymph nodes. However, translation of a combination therapy regimen is complicated by the need for dosing ratio optimization and increased regulatory hurdles. Moreover, small molecule drugs such as reparixin face significant clinical challenges in terms of specificity.

Provided herein is a modular and compact bispecific binding agent that allows for the engagement of two different target proteins: IL-6Rα (e.g., human IL-6Rα extracellular domain (ECD)) and IL-8R (e.g., human IL-8RB ECD). The bispecific binding agent can engage IL-6Rα through a first binding site. The first binding site can include a first antigen-binding domain. The bispecific binding agent can engage IL-8R through a second binding site. The second binding site can include a second antigen-binding domain. In some embodiments, a bispecific binding agent provided herein can closely approximate the binding properties of a conventional monoclonal antibody.

In some embodiments, the bispecific binding agent combines a knobs-in-holes assembly strategy that facilitates heterodimerization over homodimerization. In some embodiments, the knobs-in-holes assembly strategy includes complementary substitutions into the heavy chain constant domain of one or both of a first polypeptide or portion thereof of the bispecific binding agent that binds IL-6Rα (e.g., human IL-6Rα ECD) and a second polypeptide or portion thereof of the bispecific binding agent that binds IL-8R (e.g., human IL-8R ECD, e.g., IL-8RA or IL-8RB). In some embodiments, such amino acid substitutions result in one or more cavities or "holes" in the first polypeptide and one or more "knobs" or protuberances in the second polypeptide, such that the first polypeptide or portion thereof and second polypeptide or portion thereof preferentially associate with each other rather than a corresponding first polypeptide or portion thereof or second polypeptide or portion thereof, or both, without the amino acid substitutions (FIG. 1D). In some embodiments the amino acid substitutions are in the $C_H3$ domain of the first polypeptide or portion thereof. In some embodiments the amino acid substitutions are in the $C_H3$ domain of the second polypeptide or portion thereof. This assembly strategy has been shown to achieve >95% purity of the heterodimer (Merchant A M, Zhu Z, Yuan J Q, Goddard A, Adams C W, Presta L G, Carter P. An efficient route to human bispecific IgG. Nat Biotechnol. 1998 July; 16(7):677). In some embodiments, bispecific binding agents provided herein include a single-chain Fab design, wherein the C-terminus of the $C_L$ domain or portion thereof (e.g., of an anti-IL-6Rα antibody, or of an anti-IL-8R antibody) is connected to the N-terminus of the $V_H$ domain or portion thereof (e.g., of an anti-IL-6Rα antibody, or of an anti-IL-8R antibody) using a long, flexible linker (Koerber J T, Hornsby M J, Wells J A. An improved single-chain Fab platform for efficient display and recombinant expression. J Mol Biol. 2015 Jan. 30; 427(2):576-586. PMCID: PMC4297586). In some embodiments, the first polypeptide or portion thereof comprises a linker from the C-terminus of the first polypeptide $C_L$ domain or portion thereof connected to the $V_H$ domain of the first polypeptide or portion thereof. In some embodiments, the second polypeptide or portion thereof comprises a linker from the C-terminus of the second polypeptide CL domain or portion thereof connected to the VH domain of the second polypeptide or portion thereof.

Various non-limiting embodiments of bispecific binding agents are described herein, and can be used in any combination without limitation. Additional aspects of various components of bispecific binding agents are known in the art.

As used herein, the word "a" before a noun refers to one or more of the particular noun. As used herein, the term "affinity" refers to the strength of the sum total of non-covalent interactions between an antigen-binding site and its binding partner (e.g., an antigen or epitope). Unless indicated otherwise, as used herein, "affinity" refers to intrinsic binding affinity, which reflects a 1:1 interaction between the participating members of an antigen-binding domain and an antigen or epitope. The affinity of a molecule X for its partner Y can be represented by the dissociation equilibrium constant (KD). Affinity can be measured by common methods known in the art, including those described herein. Affinity can be determined, for example, using surface plasmon resonance (SPR) technology (e.g., BIACORE®) or biolayer interferometry (e.g., FORTEBIO®). Additional methods for determining the affinity for an antigen-binding domain and its corresponding antigen or epitope are known in the art.

As used herein, the term "antibody" refers to an intact antibody, or an antigen binding fragment thereof. An antibody may comprise a complete antibody molecule (including polyclonal, monoclonal, chimeric, humanized, or human versions having full length heavy and/or light chains), or comprise an antigen binding fragment thereof. Antibody fragments include, without limitation, F(ab')2, Fab, Fab', Fv, Fc, and Fd fragments, single domain antibodies, monovalent antibodies, single-chain antibodies, maxibodies, minibodies, intrabodies, diabodies, triabodies, tetrabodies, v-NAR and bis-scFv (See e.g., Hollinger and Hudson, 2005, Nature Biotechnology, 23, 9, 1126-1136). Antibody polypeptides are also disclosed in U.S. Pat. No. 6,703,199, including fibronectin polypeptide monobodies. Other antibody polypeptides are disclosed in U.S. Patent Publication 2005/0238646, which are single-chain polypeptides. Monovalent antibody fragments are disclosed in US Patent Publication 20050227324.

Antigen binding fragments derived from an antibody can be obtained, for example, by proteolytic hydrolysis of the antibody, for example, pepsin or papain digestion of whole antibodies according to conventional methods. By way of example, antibody fragments can be produced by enzymatic cleavage of antibodies with pepsin to provide a 5 S fragment termed F(ab')2. This fragment can be further cleaved using a thiol reducing agent to produce 3.5 S Fab' monovalent fragments. Optionally, the cleavage reaction can be performed using a blocking group for the sulfhydryl groups that result from cleavage of disulfide linkages. As an alternative, an enzymatic cleavage using papain produces two monovalent Fab fragments and an Fc fragment directly. These methods are described, for example, by Goldenberg, U.S. Pat. No. 4,331,647, Nisonoff et al., Arch. Biochem. Biophys. 89:230, 1960; Porter, Biochem. J. 73:119, 1959; Edelman et al., in Methods in Enzymology 1:422 (Academic Press 1967); and by Andrews, S. M. and Titus, J. A. in Current Protocols in Immunology (Coligan J. E., et al., eds), John Wiley & Sons, New York (2003), pages 2.8.1-2.8.10 and 2.10A. 1-2.10A.5. Other methods for cleaving antibodies, such as separating heavy chains to form monovalent light-heavy chain fragments (Fd), further cleaving of fragments, or other enzymatic, chemical, or genetic techniques may also be used, so long as the fragments bind to the antigen that is recognized by the intact antibody.

An antibody fragment may also be any synthetic or genetically engineered protein. For example, antibody fragments include, without limitation, isolated fragments that include the light chain variable region, "Fv" fragments that include the variable regions of the heavy and light chains, and recombinant single chain polypeptide molecules in which light and heavy variable regions are connected by a peptide linker (scFv proteins).

Another form of an antibody fragment is a peptide comprising one or more complementarity determining regions (CDRs) of an antibody. CDRs (also termed "minimal recognition units", or "hypervariable region") can be obtained by constructing polynucleotides that encode the CDR of interest. Such polynucleotides are prepared, for example, by using the polymerase chain reaction to synthesize the variable region using mRNA of antibody-producing cells as a template (see, for example, Larrick et al., Methods: A Companion to Methods in Enzymology 2:106, 1991; Courtenay-Luck, "Genetic Manipulation of Monoclonal Antibodies," in Monoclonal Antibodies: Production, Engineering and Clinical Application, Ritter et al. (eds.), page 166 (Cambridge University Press 1995); and Ward et al., "Genetic Manipulation and Expression of Antibodies," in Monoclonal Antibodies: Principles and Applications, Birch et al., (eds.), page 137 (Wiley-Liss, Inc. 1995)).

As used herein, the term "antigen" refers generally to a binding partner specifically recognized by an extracellular antigen-binding domain described herein. Exemplary antigens include different classes of molecules, such as, but not limited to, polypeptides and peptide fragments thereof, small molecules, lipids, carbohydrates, and nucleic acids. Non-limiting examples of antigen or antigens that can be specifically bound by any of the extracellular antigen-binding domains are described herein. Additional examples of antigen or antigens that can be specifically bound by any of the extracellular antigen-binding domains are known in the art.

As used herein, the term "antigen-binding domain" refers to one or more protein domain(s) (e.g., formed from amino acids from a single polypeptide or formed from amino acids from two or more polypeptides (e.g., the same or different polypeptides)) that is capable of specifically binding to one or more different antigen(s) (e.g., an identifying antigen and/or a control antigen). In some embodiments, an antigen-binding domain can bind to an antigen or epitope with specificity and affinity similar to that of naturally-occurring antibodies. In some embodiments, the antigen-binding domain can be an antibody or a fragment thereof. In some embodiments, an antigen-binding domain can include an alternative scaffold. Non-limiting examples of antigen-binding domains are described herein. Additional examples of antigen-binding domains are known in the art. In some embodiments, an antigen-binding domain can bind to a single antigen (e.g., an identifying antigen or a control antigen). In some embodiments, an antigen-binding domain can bind to two or more antigens (e.g., an identifying antigen and a control antigen).

As used herein, the term "bispecific antibody" refers to an antibody derivative that has, in the same antibody molecule, variable regions that recognize two different epitopes. A bispecific antibody may be an antibody that recognizes two different antigens, or an antibody that recognizes two different epitopes on a same antigen.

In some embodiments of bispecific binding agents provided herein, the first binding site, the second binding site, or both, can be or can be derived from: an antibody, a VHH-scAb, a VHH-Fab, a Dual scFab, a F(ab')2, a diabody, a crossMab, a DAF (two-in-one), a DAF (four-in-one), a DutaMab, a DT-IgG, a knobs-in-holes common light chain, a knobs-in-holes assembly, a charge pair, a Fab-arm exchange, a SEEDbody, a LUZ-Y, a Fcab, a Kk-body, an orthogonal Fab, a DVD-IgG, a IgG(H)-scFv, a scFv-(H)IgG, IgG(L)-scFv, scFv-(L)IgG, IgG(L,H)-Fv, IgG(H)-V, V(H)-IgG, IgG(L)-V, V(L)-IgG, KIH IgG-scFab, 2 scFv-IgG, IgG-2 scFv, scFv4-Ig, Zybody, DVI-IgG, Diabody-CH3, a triple body, a miniantibody, a minibody, a TriBi minibody, scFv-$C_H$3 KIH, Fab-scFv, a F(ab')2-scFv2, a scFv-KIH, a Fab-scFv-Fc, a tetravalent HCAb, a scDiabody-Fc, a Diabody-Fc, a tandem scFv-Fc, an Intrabody, a dock and lock, a ImmTAC, an IgG-IgG conjugate, a Cov-X-Body, and a scFv1-PEG-scFv2. The previous examples are meant to be illustrative rather than limiting.

As used herein, the term "connect" means to fuse, join, couple, attach, combine, interconnect or any other similar word generally describing the physical adjoining of one or more polypeptide domain to each other via a linker.

As used herein, the term "epitope" refers to a portion of an antigen that is specifically bound by an antigen-binding domain through a set of physical interactions between: (i) all monomers (e.g. individual amino acid residues, sugar side chains, and post-translationally modified amino acid residues) on the portion of the antigen-binding domain that specifically binds the antigen, and (ii) all monomers (e.g. individual amino acid residues, sugar side chains, post-translationally modified amino acid residues) on the portion of the antigen that is specifically bound by the antigen-binding domain. Epitopes can include, without limitation, surface-accessible amino acid residues, sugar side chains, phosphorylated amino acid residues, methylated amino acid residues, and/or acetylated amino acid residues and may have specific three-dimensional structural characteristics, as well as specific charge characteristics. Conformational and non-conformational epitopes are distinguished in that the binding to the former, but not the latter, may be lost in the presence of denaturing solvents. In some embodiments, an epitope is defined by a linear amino acid sequence of at least about 3 to 6 amino acids, or about 10 to 15 amino acids. In some embodiments, an epitope refers to a portion of a full-length protein or a portion thereof that is defined by a three-dimensional structure (e.g., protein folding). In some embodiments, an epitope is defined by a discontinuous amino acid sequence that is brought together via protein folding. In some embodiments, an epitope is defined by a discontinuous amino acid sequence that is brought together by quaternary structure (e.g., a cleft formed by the interaction of two different polypeptide chains). The amino acid sequences between the residues that define the epitope may not be critical to three-dimensional structure of the epitope. A conformational epitope may be determined and screened using assays that compare binding of antigen-binding protein construct to a denatured version of the antigen, such that a linear epitope is generated. An epitope may include amino acid residues that are directly involved in the binding, and other amino acid residues, which are not directly involved in the binding. Methods for identifying an epitope to which an antigen-binding domain specifically binds are known in the art, e.g., structure-based analysis (e.g. X-ray crystallography, NMR, and/or electron microscopy) (e.g. on the antigen and/or the antigen-antigen-binding domain complex) and/or mutagenesis-based analysis (e.g. alanine scanning mutagenesis, glycine scanning mutagenesis, and homology scanning mutagenesis) wherein mutants are measured in a binding assay with a binding partner, many of which are known in the art.

The term "paratope" refers to a portion of an antigen-binding domain that specifically binds to an antigen through a set of physical interactions between: (i) all monomers (e.g. individual amino acid residues, sugar side chains, post-translationally modified amino acid residues) on the portion of the antigen-binding domain that specifically binds the antigen, and (ii) all monomers (e.g. individual amino acid residues, sugar side chains, post-translationally modified amino acid residues) on the portion of the antigen that is specifically bound by the antigen-binding domain. Paratopes can include, without limitation, surface-accessible amino acid residues and may have specific three-dimensional structural characteristics, as well as specific charge characteristics. In some embodiments, a paratope refers to a portion of a full-length antigen-binding domain or a portion thereof that is defined by a three-dimensional structure (e.g., protein folding). In some embodiments, a paratope is defined by a discontinuous amino acid sequence that is brought together via protein folding. In some embodiments, a paratope is defined by a discontinuous amino acid sequence that is brought together by quaternary structure (e.g., a cleft formed by the interaction of two different polypeptide chains). In some embodiments, the amino acid sequences between the residues that define the paratope are not critical to three-dimensional structure of the paratope. A paratope may, e.g., comprise amino acid residues that are directly involved in the binding, and other amino acid residues, which are not directly involved in the binding. Methods for identifying a paratope to which an antigen-binding domain specifically binds are known in the art, e.g., structure-based analysis (e.g., X-ray crystallography, NMR, and/or electron microscopy) (e.g. on the antigen-binding domain, and/or the antigen-binding domain-antigen complex), and/or mutagenesis-based analysis (e.g., alanine scanning mutagenesis, glycine scanning mutagenesis, and homology scanning mutagenesis) wherein mutants are measured in a binding assay with a binding partner, many of which are known in the art. As used herein, the term "IL-8R" refers to an isotype of an interleukin 8 receptor, e.g., IL-8RA or IL-8RB.

As used herein, the term "knobs-in-holes" generally refers to an antibody assembly strategy. In a non-limiting way, complementary sets of mutations can be introduced into the $C_H3$ domain that can enforce heterodimerization over homodimerization. For example, an exemplary set of substitutions commonly used, include, in a non-limiting way, a "knob" created via a T366W substitution in the $C_H3$ domain, and "holes" created via substitutions T366S, L368A, and Y407V in the corresponding $C_H3$ domain. (See, for example, Ridgway et al., *Protein Eng*. (1996); Merchant et al., An efficient route to human bispecific IgG, *Nat Biotechnol*. 16:677-81 (1998); Koerber J T, Hornsby M J, Wells J A. An improved single-chain Fab platform for efficient display and recombinant expression. J Mol Biol. 2015 Jan. 30; 427(2):576-586. PMCID: PMC4297586; Carter P. Bispecific human IgG by design. J Immunol Methods 2001; 248:7-15; PMID: 11223065; Atwell S, Ridgway J B, Wells J A, Carter P. Stable heterodimers from remodeling the domain interface of a homodimer using a phage display library. J Mol Biol 1997; 270:26-35; PMID: 9231898; Ridgway J B, Presta L G, Carter P. "Knobs-into-holes" engineering of antibody CH3 domains for heavy chain heterodimerization. Protein Eng 1996; 9:617-21; PMID: 8844834). Generally, in a knobs-in-holes assembly approach, the interface between a pair of antibody molecules can be engineered to maximize the percentage of heterodimers (e.g., heterodimers that are recovered from recombinant cell culture). In some embodiments, the interface comprises at least a part of the $C_H3$ domain of an antibody constant domain. In some embodiments, one or more amino acid substitutions in the first antibody (e.g., tyrosine or tryptophan) generate knobs or "protuberances." Compensatory "cavities" (holes) are generated on the interface of the second antibody by one or more amino acid substitutions (e.g., alanine, serine, or valine). Such a strategy provides a mechanism for increasing the yield of the heterodimer over other unwanted end-products such as homodimers. The use of knobs-in-holes as a method of producing bispecific antibodies and/or one-armed antibodies and/or immunoadhesins is well known in the art. See U.S. Pat. No. 5,731,168 granted 24 Mar. 1998 assigned to Genentech, PCT Pub. No. WO2009089004 published 16 Jul. 20, 2009 and assigned to Amgen, and US Pat. Pub. No. 20090182127 published 16 Jul. 2009 and assigned to Novo Nordisk A/S. See also Marvin and Zhu, Acta Pharmacologica Sincia (2005) 26(6): 649-658 and Kontermann (2005) Acta Pharacol. Sin., 26:1-9. Other heterodimerization formats are known and can include heterodimerization variants such as pI variants, charge pairs (a subset of steric variants e.g., knobs-in-holes), isosteric variants, and SEED body ("strand-exchange 8 CA 02902739 2015-08-26 WO 2014/145806 PCT/US2014/030634 engineered domain"; see Klein et al., mAbs 4:6 653-663 (2012) and Davis et al, Protein Eng Des Sel 2010 23:195-202) which rely on the fact that the $C_H3$ domains of human IgG and IgA do not bind to each other.

As used herein, the term "protuberance" refers to at least one amino acid which projects from the interface of a first polypeptide and is therefore positionable in a compensatory cavity in an adjacent interface (i.e. the interface of a second polypeptide) so as to stabilize the heterodimer, and thereby favor heterodimer formation over homodimer formation, for example. The protuberance(s) may exist in the original interface or may be introduced synthetically (e.g., by mutating nucleic acid encoding the interface). Import residues for the formation of a protuberance(s) are generally naturally occurring amino acid residues and can be selected from arginine (R), phenylalanine (F), tyrosine (Y) and tryptophan (W). See, e.g., PCT 2016/144824.

As used herein, the term "cavity" generally refers to at least one amino acid which is recessed from the interface of a second polypeptide and therefore accommodates a corresponding protuberance on an adjacent interface of a first polypeptide. The cavity may exist in the original interface or may be introduced synthetically (e.g., by mutating nucleic acid encoding the interface). Import residues for the formation of a cavity are usually naturally occurring amino acid residues and can be selected from alanine (A), serine (S), threonine (T) and valine (V). See, e.g., PCT 2016/144824.

As used herein, the term "linker" or "polypeptide linker" refers to an amino acid sequence that separates multiple domains in a single protein. Linkers can generally be classified into three groups: flexible, rigid and cleavable. Chen, X., et al., 2013, Adv. Drug Deliv. Rev., 65, 1357-1369. Linkers can be natural or synthetic. Flexible linkers are typically rich in glycine residues. Klein et al., Protein Engineering, Design & Selection Vol. 27, No. 10, pp. 325-330, 2014; Priyanka et al., Protein Sci., 2013 February; 22(2): 153-167. In some embodiments, a bispecific binding agent includes a synthetic linker. A synthetic linker can have a length of from about 10 amino acids to about 200 amino acids, e.g., from 10 to 25 amino acids, from 25 to 50 amino acids, from 50 to 75 amino acids, from 75 to 100 amino acids, from 100 to 125 amino acids, from 125 to 150 amino acids, from 150 to 175 amino acids, or from 175 to 200 amino acids. A synthetic linker can have a length of from 10 to 30 amino acids, e.g., 10, 11, 12, 13, 14, 15, 16, 17, 18, 19, 20, 21, 22, 23, 24, 25, 26, 27, 28, 29, or 30 amino acids. A synthetic linker can have a length of from 30 to 50 amino acids, e.g., from 30 to 35 amino acids, from 35 to 40 amino acids, from 40 to 45 amino acids, or from 45 to 50 amino acids. In some embodiments, the linker is a flexible linker. In some embodiments, the linker is rich in glycine (Gly or G) residues. In some embodiments, the linker is rich in serine (Ser or S) residues. In some embodiments, the linker is rich in glycine and serine residues. In some embodiments, the linker has one or more glycine-serine residue pairs (GS), e.g., 1, 2, 3, 4, 5, 6, 7, 8, 9, or 10 or more GS pairs. In some embodiments, the linker has one or more Gly-Gly-Gly-Ser (GGGS, SEQ ID NO: 1) sequences, e.g., 1, 2, 3, 4, 5, 6, 7, 8, 9, or 10 or more GGGS sequences. In some embodiments, the linker has one or more Gly-Gly-Gly-Gly-Ser (GGGGS, SEQ ID NO: 2) sequences, e.g., 1, 2, 3, 4, 5, 6, 7, 8, 9, or 10 or more GGGGS sequences. In some embodiments, the linker has one or more Gly-Gly-Ser-Gly (GGSG, SEQ ID NO: 3) sequences, e.g., 1, 2, 3, 4, 5, 6, 7, 8, 9, or 10 or more GGSG sequences. In some embodiments, the linker is or comprises GSAAAGGSGGSGGS (SEQ ID NO: 4). In some embodiments, the linker is or comprises GGGSGGGS (SEQ ID NO: 5). In some embodiments, the linker is or comprises GSGGSSGSGSGSTGTSSSGTGTSAGTTGTSAST-SGSGSG (SEQ ID NO: 13).

The terms "polypeptide," "peptide," and "protein,", used interchangeably herein, refer to a polymeric form of amino acids of any length, which can include genetically coded and non-genetically coded amino acids, chemically or biochemically modified or derivatized amino acids, and polypeptides having modified peptide backbones. The term includes fusion proteins, including, but not limited to, fusion proteins with a heterologous amino acid sequence, fusion proteins with heterologous and homologous leader sequences, with or without N-terminal methionine residues, immunologically tagged proteins, and the like.

As used herein, a "portion" of a polypeptide or protein refers at least 10 amino acids of the reference sequence, e.g., 10 to 200, 25 to 300, 50 to 400, 100 to 500, 200 to 600, 300 to 700, 400 to 800, 500 to 900, or 600 to 1000 or more amino acids of the reference sequence. In some embodiments, the portion of a polypeptide or protein is functional.

As used herein "single-chain Fab fragment," "single-chain Fab segment," or "single-chain Fab," generally refers to a polypeptide comprising a $V_H$ domain or portion thereof, a $C_H1$ domain or portion thereof, a $V_L$ domain or portion thereof, a $C_L$ domain or portion thereof, and a linker. Single-chain Fab can also refer to an expression technique, wherein the domains of the antibody can be combined in different ways and optionally with linker sequences and other domains and or alterations, e.g. substitutions, to produce an antibody. In some embodiments, single-chain Fab fragments have a sequence from the N-terminus to the C-terminus comprising, a $V_H$ domain or portion thereof, a linker, a $V_L$ domain or portion thereof. $C_L$ domain or portion thereof a $V_H$ domain or portion thereof, a $C_H1$ domain or portion thereof, a $C_H2$ domain or portion thereof, and a $C_H3$ domain or portion thereof.

As used herein, "single-chain variable fragment-IgG fusion" (scFv-IgG) generally refers to bispecific antibody format that tethers a scFv of distinct specificity e.g. a second antibody, to a full IgG antibody thus creating a bispecific antibody.

I. Bispecific Binding Agents

Bispecific antibodies, which can simultaneously engage two different binding sites, demonstrate great potential to overcome the limitations of monoclonal antibodies via dual specificity. (Yang F, Wen W, Qin W. Bispecific Antibodies as a Development Platform for New Concepts and Treatment Strategies. Int J Mol Sci. 2016 Dec. 28; 18 (1). PMCID: PMC5297683; Garber K. Bispecific antibodies rise again. Nat Rev Drug Discov. 2014 November; 13(11):799-801). Bispecific antibodies can also increase the affinity, avidity, potency, and selectivity of protein-based therapies while reducing risk of drug resistance by concurrently blocking two different pathways to create a robust, multi-pronged treatment strategy (Cochran J R. Engineered proteins pull double duty. Sci Transl Med. 2010 Feb. 3; 2(17):17ps5. PMID: 20371477; Fan G, Wang Z, Hao M, Li J.

Bispecific antibodies and their applications. J Hematol Oncol J Hematol Oncol. 2015 Dec. 21; 8:130. PMCID: PMC4687327; Kontermann R E. Recombinant bispecific antibodies for cancer therapy. Acta Pharmacol Sin. 2005 January; 26(1):1-9. PMID: 15659107). Furthermore, their well-defined stoichiometry and unimolecular construction eliminates the need for dosing ratio optimization, which can facilitate clinical development (Kontermann R E. Recombinant bispecific antibodies for cancer therapy. Acta Pharmacol Sin. 2005 January; 26(1):1-9. PMID: 15659107). Bispecific antibodies can also engage a single target at multiple binding sites (i.e. epitopes).

Figure 1B:
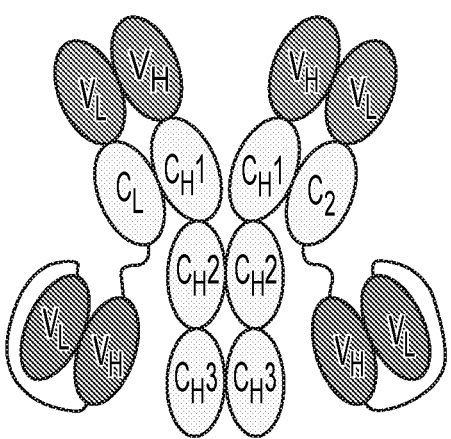
Figure 1C:
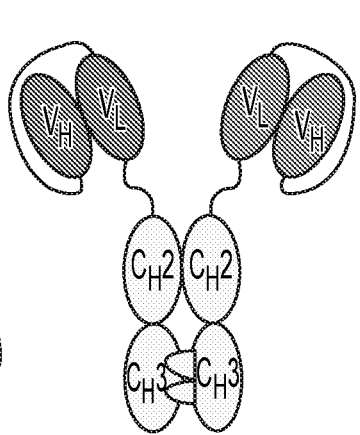
Figure 1D:
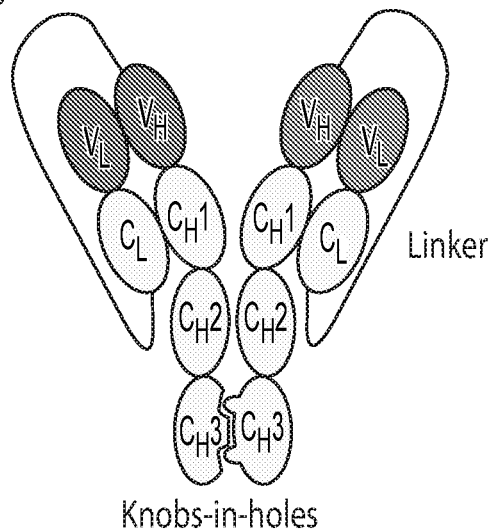

A wide range of bispecific antibody formats have been explored which broadly fall into the categories of non-Fc-fused (FIG. 1A) and Fc-fused constructs (FIGS. 1B and 1C). Inclusion of the Fc region significantly increases the construct's serum half-life through neonatal Fc receptor (FcRN recycling) (Kontermann R E. Recombinant bispecific antibodies for cancer therapy. Acta Pharmacol Sin. 2005 January; 26(1):1-9. PMID: 15659107). Within the class of Fc-fused constructs, bispecific antibodies may contain a full IgG heavy chain and light chain (FIG. 1B), or just an Fc region (FIG. 1C). Development of an assembly strategy known as a "knobs-in-holes," enabled the creation of (scFV)-Fc fusions (FIG. 1C).

While the knobs-in-holes assembly strategy results in >95% heterodimerization (Merchant A M, Zhu Z, Yuan J Q, Goddard A, Adams C W, Presta L G, Carter P. An efficient route to human bispecific IgG. Nat Biotechnol. 1998 July; 16(7):677), mispairing of the $V_H$ domain or portion thereof, and the $V_L$ domain or portion thereof between the two specific antibodies still occurs in the conventional IgG format since the first antibody heavy chain or portion thereof and the first antibody light chain or portion thereof and the second antibody heavy chain or portion thereof and the second antibody light chain or portion thereof are secreted separately in recombinant expression schemes and assembled in vitro.

In certain embodiments, provided herein are knob-in-holes assembly strategies that are combined with single-chain Fab expression approaches to ensure proper variable domain pairing (e.g., proper variable domain pairing of an anti-IL-6Rα antibody, or an anti-IL-8R antibody). The single-chain Fab expression approach can connect the C-terminus of the light chain constant domain $C_L$ to the N-terminus of the variable heavy chain $V_H$ using a long flexible linker (Koerber J T, Hornsby M J, Wells J A. An improved single-chain Fab platform for efficient display and recombinant expression. J Mol Biol. 2015 Jan. 30; 427(2):576-586. PMCID: PMC4297586). The generic format of bispecific binding agents provided herein is shown in FIG. 1D.

In one exemplary embodiment, a bispecific binding agent (e.g., a bispecific binding agent that binds IL-6Rα and IL-8R) includes: 1) a first polypeptide having in the N-terminal to C-terminal direction: a first antibody $V_L$ domain or portion thereof, a first antibody $C_L$ domain or portion thereof, a first linker, a first antibody $V_H$ domain or portion thereof, a first antibody $C_H1$ domain or portion thereof, a first antibody $C_H2$ domain or portion thereof, and a first antibody $C_H3$ domain portion thereof, and 2) a second polypeptide having in the N-terminal to C-terminal direction, a second antibody $V_L$ domain or portion thereof, a second antibody $C_L$ domain or portion thereof, a second linker, a second antibody VH domain or portion thereof, a second antibody $C_H1$ domain or portion thereof, a second antibody $C_H2$ domain or portion thereof, a the second antibody $C_H3$ domain, wherein the first antibody $C_H3$ domain or portion thereof, comprises one or more amino acid substitutions, the second antibody $C_H3$ domain or portion thereof comprises one or more amino acid substitutions, or both, such that the first polypeptide antibody heavy chain or portion thereof, and the second polypeptide antibody heavy chain or portion thereof, preferentially associate with each other to form the bispecific binding agent.

In some embodiments, a bispecific binding agent provided herein (e.g., a bispecific binding agent that binds IL-6Rα and IL-8R) includes at least two polypeptides, wherein each of the two polypeptides includes an antibody heavy chain constant domain, and wherein one or both of the antibody heavy chain constant domains includes one of more amino acid substitutions such that the two polypeptides bind to each other with an increased affinity as compared to two polypeptides that include corresponding antibody heavy chain constant domains that lack the one or more amino acid substitutions. In some embodiments, the one or more amino acid substitutions in the antibody heavy chain constant domain(s) are present in a $C_H3$ domain(s).

In some embodiments, the one or more amino acid substitutions in the first antibody heavy chain constant domain include substitutions at one or more of amino acid positions in the $CH_3$ domain (e.g., amino acid positions 249, 251, and 290 of SEQ ID NO: 6, corresponding to amino acid positions 366, 368, and 407 of Ridgway et al. and Merchant et al.). In some embodiments, the one or more amino acid substitutions in the first antibody heavy chain constant domain include substitutions at each of amino acid positions in the $CH_3$ domain (e.g., amino acid positions 249, 251, and 290 of SEQ ID NO: 6, corresponding to amino acid positions 366, 368, and 407 of Ridgway et al. and Merchant et al.). In some embodiments, the one or more amino acid substitutions in the first antibody heavy chain constant domain include one or more of a T249S substitution, an L251A substitution, and a Y290V substitution in the $CH_3$ domain (e.g., a T249S substitution, an L251A substitution, and/or a Y290V substitution at amino acid positions 249, 251, and 290 of SEQ ID NO: 6, corresponding to amino acid positions 366, 368, and 407 of Ridgway et al. and Merchant et al.). In some embodiments, the one or more amino acid substitutions in the first antibody heavy chain constant domain include substitutions at each of a T249S substitution, an L251A substitution, and a Y290V substitution in the $CH_3$ domain (e.g., a T249S substitution, an L251A substitution, and a Y290V substitution at amino acid positions 249, 251, and 290 of SEQ ID NO: 6, corresponding to amino acid positions 366, 368, and 407 of Ridgway et al. and Merchant et al.). In some embodiments, the first antibody heavy chain constant region includes the amino acid sequence of SEQ ID NO: 7.

In some embodiments, the one or more amino acid substitutions in the second antibody heavy chain constant domain include a substitution in the $CH_3$ domain (e.g., amino acid position 249 of SEQ ID NO: 6, corresponding to amino acid positions 366 of Ridgway et al. and Merchant et al.). In some embodiments, the one or more amino acid substitutions in the second antibody heavy chain constant domain include a T249W substitution in the $CH_3$ domain (e.g., a T249W substitution at amino acid position 249 of SEQ ID NO: 6, corresponding to amino acid position 366 of Ridgway et al. and Merchant et al.). In some embodiments, the second antibody heavy chain constant region includes the amino acid sequence of SEQ ID NO: 8.

In some embodiments, a bispecific binding agent provide herein (e.g., a bispecific binding agent that binds IL-6Rα and IL-8R) includes an antibody heavy chain constant domain that is an IgG1, IgG2, IgG3, or IgG4 heavy chain constant domain. In some embodiments, an antibody heavy chain constant domain is an IgG1 heavy chain constant domain. In some embodiments, an antibody heavy chain constant domain is an IgG4 heavy chain constant domain. In some embodiments, a bispecific binding agent provide herein includes an IgG1 antibody heavy chain constant domain and an IgG4 antibody heavy chain constant domain. See, e.g., Spiess et al., J Biol Chem. 2013 Sep. 13; 288(37): 26583-93, incorporated by reference herein in its entirety).

In some embodiments, a bispecific binding agent provide herein (e.g., a bispecific binding agent that binds IL-6Rα and IL-8R) includes one or more modifications (e.g., amino acid substitutions as compared to a wild type sequence) in one or more domains (e.g., modifications in one or more $CH_2$ domains). In some embodiments, such modifications may serve to enhance expression, modify glycosylation, or both. Those of ordinary skill in the art will be aware of suitable modifications and will be able to employ such modifications in the context of bispecific binding agents provide herein.

In some embodiments, a bispecific binding agent provided herein (e.g., a bispecific binding agent that binds IL-6Rα and IL-8R) includes at least two polypeptides, wherein each of the two polypeptides includes an antibody heavy chain and an antibody light chain that are connected by a linker (e.g., any of the variety of "linkers" or "polypeptide linkers" described herein). In some embodiments, the two polypeptides include a linker having the same sequence. In some embodiments, the two polypeptides include a linker having a different sequence. In some embodiments, a linker can be about 10 to about 100 amino acids in length. For example a linker can be about 5, 10, 15, 20, 25, 30, 35, 40, 45, 50, 55, 60, 65, 70, 75, 80, 85, 90, 95, 100 or more amino acids in length, or any number of amino acids in between. In some embodiments, a linker includes the amino acid sequence (SEQ ID NO: 13)
GGSGGSSGSGSGSTGTSSSGTGTSAGTTGTSASTSGSGSG.

In some embodiments, a bispecific binding agent provided herein (e.g., a bispecific binding agent that binds IL-6Rα and IL-8R) includes a first polypeptide having a first $V_H$ domain present or portion thereof and a first $V_L$ domain or portion thereof, wherein the first $V_H$ domain or portion thereof and the first VL domain or portion thereof form a first antigen binding site. In some embodiments, a bispecific binding agent provided herein includes a second polypeptide having a second VH domain present or portion thereof and a second VL domain or portion thereof, wherein the second VH domain or portion thereof and the second VL domain or portion thereof form a second antigen binding site. In some embodiments, a bispecific binding agent provided herein binds a first target (e.g., IL-6Rα, e.g., via a first antigen binding site) and a second target (e.g., IL-8R, e.g., via a second antigen binding site).

In some embodiments, bispecific binding agents provided herein (e.g., a bispecific binding agent that binds IL-6Rα and IL-8R) bind one of their cognate antigens via antigen-specific variable regions and/or CDRs with an affinity and/or specificity that approximates the affinity and/or specificity of a monoclonal antibody that has corresponding antigen-specific variable regions and/or CDRs. For example, a bispecific binding agent provided herein can bind one of its cognate antigens (e.g., IL-6Rα and/or IL-8R) via antigen-specific variable regions and/or CDRs with an affinity that is at least 50%, at least 55%, at least 60%, at least 65%, at least 70%, at least 75%, at least 80%, at least 85%, at least 90%, at least 95%, or at least 100% of the affinity of a monoclonal antibody having corresponding antigen-specific variable regions and/or CDRs. In some embodiments, a bispecific binding agent provided herein can bind one of its cognate antigens (e.g., IL-6Rα and/or IL-8R) via antigen-specific variable regions and/or CDRs with an affinity that is greater than the affinity of a monoclonal antibody having corresponding antigen-specific variable regions and/or CDRs. In some embodiments, a bispecific binding agent provided herein can bind one of its cognate antigens (e.g., IL-6Rα and/or IL-8R) via antigen-specific variable regions and/or CDRs with a specificity that is at least 50%, at least 55%, at least 60%, at least 65%, at least 70%, at least 75%, at least 80%, at least 85%, at least 90%, at least 95%, or at least 100% of the specificity of a monoclonal antibody having corresponding antigen-specific variable regions and/or CDRs. In some embodiments, a bispecific binding agent provided herein can bind one of its cognate antigens (e.g., IL-6Rα and/or IL-8R) via antigen-specific variable regions and/or CDRs with a specificity that is greater than the specificity of a monoclonal antibody having corresponding antigen-specific variable regions and/or CDRs. In some embodiments, a bispecific binding agent provided herein can bind one of its cognate antigens (e.g., IL-6Rα and/or IL-8R) via antigen-specific variable regions and/or CDRs with both an affinity and a specificity that is at least 50%, at least 55%, at least 60%, at least 65%, at least 70%, at least 75%, at least 80%, at least 85%, at least 90%, at least 95%, or at least 100% of the affinity and specificity of a monoclonal antibody having corresponding antigen-specific variable regions and/or CDRs. In some embodiments, a bispecific binding agent provided herein can bind one of its cognate antigens (e.g., IL-6Rα and/or IL-8R) via antigen-specific variable regions and/or CDRs with both an affinity and a specificity that is greater than the affinity and specificity of a monoclonal antibody having corresponding antigen-specific variable regions and/or CDRs.

Therapeutic Uses

In some embodiments, bispecific binding agents provided herein (e.g., e.g., bispecific binding agents that bind IL-6Rα and IL-8R) are used in the prevention, treatment, and/or amelioration of one or more diseases or conditions in a subject (e.g., a human subject). In some embodiments, bispecific binding agents provided herein provide improved pharmacological effects and outcomes as compared to two separate agents, each having one of the two binding specificities of the bispecific binding agent.

For example, administration of a bispecific binding agent provided herein to a subject can result in greater clinical effectiveness (e.g., improved prevention, treatment, and/or amelioration of a disease or condition in a subject) as compared to administration (e.g., simultaneous or sequential administration) of two separate agents, each having one of the two binding specificities of the bispecific binding agent. In some embodiments, administration of a bispecific binding agent provided herein to a subject can result in fewer side effects (e.g., as a result of off-target binding) as compared to administration (e.g., simultaneous or sequential administration) of two separate agents, each having one of the two binding specificities of the bispecific binding agent. As will be appreciated in the art, mixed-agent dosing presents certain problems. In some embodiments, a dosing regimen (e.g., dosing amount, dosing frequency, and/or length of dosing) of a bispecific binding agent provided is easier to optimize as compared to a dosing regimen that includes of two separate agents, each having one of the two binding specificities of the bispecific binding agent.

In some embodiments, bispecific binding agents provided herein target antigens that are targeted by known, conventional bispecific therapeutics (e.g., bispecific antibodies, BiTEs, etc.). In some embodiments, bispecific binding agents provided herein are easier to produce than known, conventional bispecific therapeutics (see, e.g., the Examples provided herein). In some embodiments, bispecific binding agents provided herein are at least as or more effective than known, conventional bispecific therapeutics. In some embodiments, bispecific binding agents provided herein result in fewer adverse side effects effective than known, conventional bispecific therapeutics. In some embodiments, the dosing regimen of bispecific binding agents provided herein is easier to optimize than the dosing regimen of known, conventional bispecific therapeutics. In some embodiments, bispecific binding agents provided include the antigen binding domains of emicizumab. In some embodiments, bispecific binding agents provided include the CDRs of emicizumab.

In some embodiments, bispecific binding agents provided herein (e.g., bispecific binding agents that binds IL-6Rα and IL-8R) are used in the treatment of cancer in a subject (e.g., a human subject). For example, bispecific binding agents provided herein e.g., a bispecific binding agent that binds IL-6Rα and IL-8R can be used to inhibit or prevent metastasis of a primary tumor in a subject. In some embodiments, a bispecific binding agent provided herein (e.g., a bispecific binding agent that binds IL-6Rα and IL-8R) is used in the treatment of cancer in a subject (e.g., a human subject) in combination with one or more "therapeutic interventions". In some embodiments, a bispecific binding agent provided herein (e.g., a bispecific binding agent that binds IL-6Rα and IL-8R) is administered to a subject (e.g., a human subject) simultaneously with the administration of one or more therapeutic interventions. In some embodiments, a bispecific binding agent provided herein (e.g., a bispecific binding agent that binds IL-6Rα and IL-8R) is not administered to a subject (e.g., a human subject) simultaneously with the administration of one or more therapeutic interventions. For example, a bispecific binding agent and a therapeutic intervention can be administered sequentially (e.g., there can be a period of time between administration of the bispecific binding agent and administration of the therapeutic intervention such as, without limitation, 1 minute, 5 minutes, 10 minutes, 20 minutes, 30 minutes, 1 hour, 2 hours, 3 hours, 4 hours, 5, hours, 6 hours, 7 hours, 8 hours, 12 hours, 24 hours, 2 days, 3 days, 4 days, 5 days, 6 days, 1 week, 2 weeks, 3 weeks, 4 weeks, 1 month, 2 months, 3 months, or more).

Examples of therapeutic interventions include, without limitation, adjuvant chemotherapy, neoadjuvant chemotherapy, radiation therapy, hormone therapy, cytotoxic therapy, immunotherapy, adoptive T cell therapy (e.g., chimeric antigen receptors and/or T cells having wild-type or modified T cell receptors), targeted therapy such as administration of kinase inhibitors (e.g., kinase inhibitors that target a particular genetic lesion, such as a translocation or mutation), (e.g. a kinase inhibitor, an antibody, a bispecific antibody), signal transduction inhibitors, bispecific antibodies or antibody fragments (e.g., BiTEs), monoclonal antibodies, immune checkpoint inhibitors, surgery (e.g., surgical resection), or any combination of the above. In some embodiments, a therapeutic intervention can reduce the severity of the cancer, reduce a symptom of the cancer, and/or to reduce the number of cancer cells present within the subject.

In some embodiments, a therapeutic intervention can include an immune checkpoint inhibitor. Non-limiting examples of immune checkpoint inhibitors include nivolumab (Opdivo), pembrolizumab (Keytruda), atezolizumab (tecentriq), avelumab (bavencio), durvalumab (imfinzi), ipilimumab (yervoy). See, e.g., Pardoll (2012) Nat. Rev Cancer 12: 252-264; Sun et al. (2017) Eur Rev Med Pharmacol Sci 21(6): 1198-1205; Hamanishi et al. (2015) J. Clin. Oncol. 33(34): 4015-22; Brahmer et al. (2012) N Engl J Med 366(26): 2455-65; Ricciuti et al. (2017) J. Thorac Oncol. 12 (5): e51-e55; Ellis et al. (2017) Clin Lung Cancer pii: S1525-7304 (17)30043-8; Zou and Awad (2017) Ann Oncol 28(4): 685-687; Sorscher (2017) N Engl J Med 376 (10: 996-7; Hui et al. (2017) Ann Oncol 28(4): 874-881; Vansteenkiste et al. (2017) Expert Opin Biol Ther 17(6): 781-789; Hellmann et al. (2017) Lancet Oncol. 18(1): 31-41; Chen (2017) J. Chin Med Assoc 80(1): 7-14.

In some embodiments, a therapeutic intervention is adoptive T cell therapy (e.g., chimeric antigen receptors and/or T cells having wild-type or modified T cell receptors). See, e.g., Rosenberg and Restifo (2015) Science 348(6230): 62-68; Chang and Chen (2017) Trends Mol Med 23(5): 430-450; Yee and Lizee (2016) Cancer J. 23(2): 144-148; Chen et al. (2016) Oncoimmunology 6 (2): e1273302; US 2016/0194404; US 2014/0050788; US 2014/0271635; U.S. Pat. No. 9,233,125; incorporated by reference in their entirety herein.

In some embodiments, a therapeutic intervention is a chemotherapeutic agent. Non-limiting examples of chemotherapeutic agents include: amsacrine, azacitidine, axathioprine, bevacizumab (or an antigen-binding fragment thereof), bleomycin, busulfan, carboplatin, capecitabine, chlorambucil, cisplatin, cyclophosphamide, cytarabine, dacarbazine, daunorubicin, docetaxel, doxifluridine, doxorubicin, epirubicin, erlotinib hydrochlorides, etoposide, fiudarabine, floxuridine, fludarabine, fluorouracil, gemcitabine, hydroxyurea, idarubicin, ifosfamide, irinotecan, lomustine, mechlorethamine, melphalan, mercaptopurine, methotrxate, mitomycin, mitoxantrone, oxaliplatin, paclitaxel, pemetrexed, procarbazine, all-trans retinoic acid, streptozocin, tafluposide, temozolomide, teniposide, tioguanine, topotecan, uramustine, valrubicin, vinblastine, vincristine, vindesine, vinorelbine, and combinations thereof. Additional examples of anti-cancer therapies are known in the art; see, e.g. the guidelines for therapy from the American Society of Clinical Oncology (ASCO), European Society for Medical Oncology (ESMO), or National Comprehensive Cancer Network (NCCN).

In some embodiments, a bispecific binding agent provided herein (e.g., a bispecific binding agent that binds IL-6Rα and IL-8R) and one or more therapeutic interventions (e.g., a chemotherapy or any of the other appropriate therapeutic interventions discloses herein) can be administered to a subject once or multiple times over a period of time ranging from days to weeks (separately or in combination). In some embodiments, a bispecific binding agent provided herein (e.g., a bispecific binding agent that binds IL-6Rα and IL-8R) and one or more therapeutic interventions can be formulated into a pharmaceutically acceptable composition for administration to a subject having cancer (separately or in combination). For example, a therapeutically effective amount of a bispecific binding agent provided herein (e.g., a bispecific binding agent that binds IL-6Rα and IL-8R) and a therapeutic intervention (e.g. a chemotherapeutic or immunotherapeutic agent) can be formulated together with one or more pharmaceutically acceptable carriers (additives) and/or diluents. A pharmaceutical composition can be formulated for administration in solid or liquid form including, without limitation, sterile solutions, suspensions, sustained-release formulations, tablets, capsules, pills, powders, and granules.

Pharmaceutically acceptable carriers, fillers, and vehicles that may be used in a pharmaceutical composition described herein include, without limitation, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol and wool fat.

A pharmaceutical composition containing one or more therapeutic interventions can be designed for oral or parenteral (including subcutaneous, intramuscular, intravenous, and intradermal) administration. When being administered orally, a pharmaceutical composition can be in the form of a pill, tablet, or capsule. Compositions suitable for parenteral administration include aqueous and non-aqueous sterile injection solutions that can contain anti-oxidants, buffers, bacteriostats, and solutes that render the formulation isotonic with the blood of the intended recipient. The formulations can be presented in unit-dose or multi-dose containers, for example, sealed ampules and vials, and may be stored in a freeze dried (lyophilized) condition requiring only the addition of the sterile liquid carrier, for example, water for injections, immediately prior to use. Extemporaneous injection solutions and suspensions may be prepared from sterile powders, granules, and tablets.

In some embodiments, a pharmaceutically acceptable composition including one or more therapeutic interventions can be administered locally or systemically. For example, a composition provided herein can be administered locally by injection into tumors. In some embodiments, a composition provided herein can be administered systemically, orally, or by injection to a subject (e.g., a human).

Effective doses can vary depending on the severity of the cancer, the route of administration, the age and general health condition of the subject, excipient usage, the possibility of co-usage with other therapeutic treatments such as use of other agents, and the judgment of the treating physician.

An effective amount of a composition containing a bispecific binding agent provided herein (e.g., a bispecific binding agent that binds IL-6Rα and IL-8R), optionally in combination with one or more therapeutic interventions, can be any amount that reduces the extent of metastasis (e.g., prevents metastasis) of cancer cells present within the subject without producing significant toxicity to the subject. If a particular subject fails to respond to a particular amount, then the amount of a bispecific binding agent can be increased by, for example, two fold. After receiving this higher amount, the subject can be monitored for both responsiveness to the treatment and toxicity symptoms, and adjustments made accordingly. The effective amount can remain constant or can be adjusted as a sliding scale or variable dose depending on the subject response to treatment. Various factors can influence the actual effective amount used for a particular application. For example, the frequency of administration, duration of treatment, use of multiple treatment agents, route of administration, and severity of the condition (e.g., cancer) may require an increase or decrease in the actual effective amount administered.

The frequency of administration of a bispecific binding agent provided herein (e.g., a bispecific binding agent that binds IL-6Rα and IL-8R) can be any frequency that reduces the extent of metastasis (e.g., prevents metastasis) within the subject without producing significant toxicity to the subject. For example, the frequency of administration of a bispecific binding agent can be from about two to about three times a week to about two to about three times a month. The frequency of administration of a bispecific binding agent can remain constant or can be variable during the duration of treatment. A course of treatment with a composition containing a bispecific binding agent can include rest periods. For example, a composition containing a bispecific binding agent can be administered daily over a two-week period followed by a two week rest period, and such a regimen can be repeated multiple times. As with the effective amount, various factors can influence the actual frequency of administration used for a particular application. For example, the effective amount, duration of treatment, use of multiple treatment agents, route of administration, and severity of the condition (e.g., cancer) may require an increase or decrease in administration frequency.

An effective duration for administering a bispecific binding agent provided herein (e.g., a bispecific binding agent that binds IL-6Rα and IL-8R) can be any duration that reduces the extent of metastasis (e.g., prevents metastasis) within the subject without producing significant toxicity to the subject. In some embodiments, the effective duration can vary from several days to several weeks. In general, the effective duration for reducing or preventing metastasis of cancer cells present within the subject can range in duration from about one week to about four weeks. Multiple factors can influence the actual effective duration used for a particular treatment. For example, an effective duration can vary with the frequency of administration, effective amount, use of multiple treatment agents, route of administration, and severity of the condition being treated.

In some embodiments, a bispecific binding agent provided herein (e.g., a bispecific binding agent that binds IL-6Rα and IL-8R) can reduce the extent of metastasis of cancer cells present in a subject. For example, a bispecific binding agent can reduce the extent of metastasis in a subject by 10%, 20%, 30%, 40%, 50%, 60%, 70%, 80%, 90%, 95%, or more. In some embodiments, a bispecific binding agent can reduce the extent of metastasis in a subject such that no metastatic cancer cells are observable. In some embodiments, a bispecific binding agent can reduce the number of observable tumors present in a subject.

In some embodiments, a bispecific binding agent provided herein (e.g., a bispecific binding agent that binds IL-6Rα and IL-8R) is used to treat one or more of the following cancer types: acute lymphoblastic leukemia (ALL), acute myeloid leukemia (AML), adrenal cancer, adrenocortical carcinoma, AIDS-related cancers, AIDS-related lymphoma, amyotrophic lateral sclerosis or ALS, anal cancer, appendix cancer, astrocytoma, astrocytoma, childhood cerebellar or cerebral, atypical teratoid/rhabdoid tumor, basal cell carcinoma, bile duct cancer, bile duct cancer, extrahepatic (see cholangiocarcinoma), bladder cancer, bone cancer, bone tumor, osteosarcoma/malignant fibrous histiocytoma, brain cancer, brain stem glioma, brain tumor, brain tumor, cerebellar astrocytoma, brain tumor, cerebral astrocytoma/malignant glioma, brain tumor, ependymoma, brain tumor, medulloblastoma, brain tumor, supratentorial primitive neuroectodermal tumors, brain tumor, visual pathway and hypothalamic glioma, brainstem glioma, breast cancer, bronchial adenomas/carcinoids, bronchial tumor, bronchioles lung cell carcinoma, Burkitt lymphoma, cancer in adolescents, carcinoid tumor, carcinoid tumor, childhood, carcinoid tumor, gastrointestinal, carcinoma of unknown primary, cardiac tumors, central nervous system lymphoma, primary, cerebellar astrocytoma, childhood, cerebral astrocytoma/malignant glioma, childhood, cervical cancer, childhood cancers, chondrosarcoma, chordoma, chronic lymphocytic leukemia (CLL), chronic myelogenous leukemia (CML), chronic myeloproliferative disorders, chronic myeloproliferative neoplasms, colon cancer, colorectal cancer, colorectal cancer (e.g., metastatic colorectal cancer), craniopharyngioma, cutaneous t-cell lymphoma, desmoplastic small round cell tumor, differentiated thyroid cancer, ductal carcinoma in situ, embryonal tumors, endometrial cancer, ependymoma, epithelioid hemangioendothelioma (EHE), esophageal cancer, esthesioneuroblastoma, Ewing's sarcoma in the Ewing family of tumors, extracranial germ cell tumor, extracranial germ cell tumor, childhood, extragonadal germ cell tumor, extrahepatic bile duct cancer, eye cancer, eye cancer, intraocular melanoma, eye cancer, retinoblastoma, fallopian tube cancer, fibrous histiocytoma of bone, gallbladder cancer, ganglioneuromatosis of the gastroenteric mucosa, gastric (stomach) cancer, gastric (stomach) cancer, gastric carcinoid, gastrointestinal carcinoid tumor, gastrointestinal stromal tumors (GIST), germ cell tumor, germ cell tumor: extracranial, extragonadal, or ovarian, gestational trophoblastic disease, gestational trophoblastic tumor, glioma, glioma of the brain stem, glioma, childhood cerebral astrocytoma, glioma, childhood visual pathway and hypothalamic, hairy cell leukemia, hairy cell tumor, head and neck cancer, heart cancer, hepatocellular (liver) cancer, histiocytosis, Hodgkin's lymphoma, hypopharyngeal cancer, hypothalamic and visual pathway glioma, childhood, inflammatory myofibroblastic tumor, intraocular melanoma, intraocular melanoma, Islet cell carcinoma (endocrine pancreas), islet cell tumors, Kaposi sarcoma, kidney cancer (renal cell cancer), Langerhans cell histiocytosis, laryngeal cancer, leukaemia, acute lymphoblastic (also called acute lymphocytic leukaemia), leukaemia, acute myeloid (also called acute myelogenous leukemia), leukaemia, chronic lymphocytic (also called chronic lymphocytic leukemia), leukemia, leukemia, chronic myelogenous (also called chronic myeloid leukemia), leukemia, hairy cell, lip and oral cavity cancer, liposarcoma, liver cancer (e.g., primary), lung adenocarcinoma, lung cancer, lung cancer (e.g., small cell lung carcinoma or non-small cell lung carcinoma), lymphoma, lymphoma, AIDS-related, lymphoma, Burkitt, lymphoma, cutaneous T-Cell, lymphoma, Hodgkin, lymphoma, primary central nervous system, lymphomas, Non-Hodgkin (an old classification of all lymphomas except Hodgkin's), macroglobulinemia, male breast cancer, malignant fibrous histiocytoma of bone, malignant fibrous histiocytoma of bone/osteosarcoma, medullary thyroid cancer, medulloblastoma, childhood, melanoma, melanoma, intraocular (eye), melanoma, intraocular (eye), Merkel cell cancer, Merkel cell carcinoma, mesothelioma, mesothelioma, adult malignant, mesothelioma, childhood, metastatic squamous neck cancer, metastatic squamous neck cancer with occult primary, midline tract carcinoma, mouth cancer, multiple endocrine neoplasia syndrome, childhood, multiple endocrine neoplasia syndromes, multiple endocrine neoplasia type 2A or 2B (MEN2A or MEN2B, respectively), multiple myeloma, multiple myeloma/plasma cell neoplasm, mycosis fungoides, myelodysplastic syndromes, myelodysplastic/myeloproliferative diseases, myelodysplastic/myeloproliferative neoplasms, myelogenous leukemia, myelogenous leukemia, chronic, myeloid leukemia, myeloid leukemia, adult acute, myeloid leukemia, childhood acute, myeloma, multiple (cancer of the bone-marrow), myeloproliferative disorders, chronic, myeloproliferative neoplasms, myxoma, nasal cavity and paranasal sinus cancer, nasopharyngeal cancer, nasopharyngeal carcinoma, neuroblastoma, oligodendroglioma, oral cancer, oral cavity cancer, oropharyngeal cancer, osteocarcinoma, osteosarcoma, osteosarcoma/malignant fibrous histiocytoma of bone, ovarian cancer, ovarian epithelial cancer (surface epithelial-stromal tumor), ovarian germ cell tumor, ovarian low malignant potential tumor, pancreatic cancer, pancreatic cancer, islet cell, pancreatic neuroendocrine tumors, papillary renal cell carcinoma, papillary thyroid cancer, papillomatosis, paraganglioma, paranasal sinus and nasal cavity cancer, parathyroid cancer, parathyroid hyperplasia, penile cancer, pharyngeal cancer, pheochromocytoma, Phyllodes breast tumors, pineal astrocytoma, pineal germinoma, pineoblastoma and supratentorial primitive neuroectodermal tumors, childhood, pituitary adenoma, pituitary cancer, plasma cell neoplasia/multiple myeloma, plasma cell neoplasm, pleuropulmonary blastoma, pregnancy and breast cancer, primary central nervous system lymphoma, primary peritoneal cancer, prostate cancer, rectal cancer, recurrent thyroid cancer, refractory differentiated thyroid cancer, renal cell cancer, renal cell carcinoma (kidney cancer), renal pelvis and ureter, transitional cell cancer, retinoblastoma, rhabdomyosarcoma, rhabdomyosarcoma, childhood, salivary gland cancer, sarcoma, sarcoma, Ewing family of tumors, Sarcoma, Kaposi, Sezary syndrome, skin cancer, skin cancer (melanoma), skin cancer (non-melanoma), skin carcinoma, Merkel cell, small intestine cancer, soft tissue sarcoma, squamous cell carcinoma, squamous cell carcinoma—see skin cancer (non-melanoma), squamous neck cancer, squamous neck cancer with occult primary, metastatic, stomach cancer, supratentorial primitive neuroectodermal tumor, childhood, T-cell lymphoma, T-cell lymphoma, cutaneous, testicular cancer, throat cancer, thymoma and thymic carcinoma, Thymoma, childhood, thyroid cancer, thyroid cancer, childhood, transitional cell cancer of the renal pelvis and ureter, trophoblastic tumor, gestational, unknown primary carcinoma, unknown primary site, cancer of, childhood, unknown primary site, carcinoma of, adult, ureter and renal pelvis, transitional cell cancer, urethral cancer, uterine cancer, uterine cancer, endometrial, uterine sarcoma, vaginal cancer, visual pathway and hypothalamic glioma, childhood, vulvar cancer, Waldenstrom macroglobulinemia, and Wilms tumor (kidney cancer).

II. Construction and Expression of a Knobs-In-Holes Single Chain Bispecific Binding Agent Vector Construction In certain embodiments, provided herein are methods of constructing and expressing a bispecific binding agent (e.g., a bispecific binding agent that binds IL-6Rα and IL-8R) comprising a first polynucleotide sequence comprising a first segment that encodes a first antibody heavy chain or portion thereof, a second segment that encodes a first linker, and a third segment that encodes a first antibody light chain or portion thereof, a second polynucleotide sequence comprising a first segment that encodes a second antibody heavy chain or portion thereof, a second segment that encodes a second linker, and a third segment that encodes a second antibody light chain or portion thereof, generating a first polypeptide from the first polynucleotide sequence wherein the first polypeptide comprises the first antibody heavy chain or portion thereof, the first linker, and the first antibody light chain or portion thereof, generating a second polypeptide from the second polynucleotide sequence, wherein the second polypeptide comprises the second antibody heavy chain or portion thereof, the second linker, and the second antibody light chain or portion thereof, wherein the first antibody heavy chain or portion thereof, the second antibody heavy chain or portion thereof, or both, comprises one or more amino acid substitutions (e.g., as compared to a wild type antibody heavy chain) such that the first antibody heavy chain or portion thereof and the second antibody heavy chain or portion thereof preferentially associate with each other to form the bispecific binding agent.

In some embodiments, the first polypeptide is generated by providing an expression vector comprising the first polynucleotide sequence operably linked to a promoter, and expressing the first polypeptide from the first polynucleotide sequence. In some embodiments, the second polypeptide is generated by providing an expression vector comprising the second polynucleotide sequence operably linked to a promoter, and expressing the second polypeptide from the second polynucleotide sequence.

In some embodiments of any of the vectors described herein, the nucleic acid encoding any of the bispecific binding agents described herein is operably linked to one or both of a promoter and an enhancer. In some embodiments of any of the vectors described herein, the promoter is an inducible promoter.

Generally, bispecific binding agents provided herein (e.g., bispecific binding agents that binds IL-6Rα and IL-8R) may be produced using techniques from any of the variety of methods known to those skilled in the art. For example, a nucleic acid sequence coding for a first polypeptide of the bispecific binding agent (e.g., a single chain polypeptide having both an antibody light chain and an antibody heavy chain), a second polypeptide of the bispecific binding agent (e.g., a single chain polypeptide having both an antibody light chain and an antibody heavy chain), or both can be inserted into an expression vector according to conventional techniques. In some embodiments, a nucleic acid sequence coding for a first polypeptide of the bispecific binding agent is inserted into a first expression vector. In some embodiments, a nucleic acid sequence coding for a second polypeptide of the bispecific binding agent is inserted into a second expression vector. In some embodiments, a nucleic acid sequence coding for a first polypeptide of the bispecific binding agent and a nucleic acid sequence coding for the a second polypeptide of the bispecific binding agent are inserted into a first expression vector. In some embodiments, a nucleic acid sequence coding for a first polypeptide of the bispecific binding agent, a nucleic acid sequence coding for a second polypeptide of the bispecific binding agent, or both are expressed under control of an expression control region, for example, an enhancer and/or a promoter. In some embodiments, a host cell is transfected with an expression vector(s) having a nucleic acid sequence coding for a first polypeptide of the bispecific binding agent, an expression vector having a nucleic acid sequence coding for the a second polypeptide of the bispecific binding agent, or both. In some embodiments, both the first polypeptide and the second polypeptide of a bispecific binding agent are expressed in the same host cell. In some embodiments, the first polypeptide and the second polypeptide of a bispecific binding agent are expressed in different host cells.

Nucleic Acids, Vector Constructs, and Expression Systems

Nucleic acid (e.g., DNA) sequences coding for any of the polypeptides present in bispecific binding agents provided herein (e.g., bispecific binding agents that bind IL-6Rα and IL-8R) are also within the scope of the present invention as are methods of making the engineered bispecific binding agents. For example, variable regions can be constructed using PCR mutagenesis methods to alter DNA sequences encoding an immunoglobulin chain, e.g., using methods employed to generate humanized immunoglobulins (see e.g., Kanunan, et al, Nucl. Acids Res. 12:5404, 1989; Sato, et al, Cancer Research 53:851-856, 1993; Daugherty, et al, Nucleic Acids Res. 19(9):2471-2476, 1991; and Lewis and Crowe, Gene 101:297-302, 1991). Using these or other suitable methods, variants can also be readily produced. In some embodiments, cloned constant regions can be mutagenized, and sequences encoding variants with the desired specificity can be selected (e.g., a constant region present in a first polypeptide of a bispecific binding agent, a constant region present in a second polypeptide of a bispecific binding agent, or both).

Expression vectors are useful for the purpose of antibody production. Examples of suitable expression vectors include, without limitation, M13 vector, pUC vector, pBR322, pBluescript, pCR-Script, and gWiz. For subcloning and separation of cDNA, for example, pGEM-T, pDI-RECT and pT7 may also be used.

Suitable host cells for cloning or expressing the DNA in the vectors herein include, without limitation, prokaryotic cells, yeast cells, or higher eukaryote cells described herein. Suitable prokaryotes for this purpose include, without limitation, eubacteria, such as Gram-negative or Gram-positive organisms, for example, Enterobacteriaceae such as *Escherichia*, e.g., *E. coli, Enterobacter, Erwinia, Klebsiella, Proteus, Salmonella*, e.g., *Salmonella typhimurium, Serratia*, e.g., *Serratia marcescens*, and *Shigella*, as well as Bacilli such as *B. subtilis* and *B. licheniformis* (e.g., *B. licheniformis* 41 P disclosed in DD 266,710 published Apr. 12, 1989), *Pseudomonas* such as *P. aeruginosa*, and *Streptomyces*. In some embodiments, host cell is *E. coli* 294 (ATCC 31,446). Other strains such as *E. coli* B, *E. coli* X1776 (ATCC 31,537), and *E. coli* W3110 (ATCC 27,325) are also suitable.

In embodiments in which *E. coli* such as JM109, DH5α, HB101 or XL1-Blue is used as a host, the expression vector includes a promoter that drives efficient expression of a polypeptide (e.g., a polypeptide of a bispecific binding agent) in *E. coli*, for example, lacZ promoter (Ward et al., Nature (1989) 341, 544-546; FASEB J. (1992) 6, 2422-2427, hereby incorporated by reference in its entirety), araB promoter (Better et al., Science (1988) 240, 1041-1043, hereby incorporated by reference in its entirety) or T7 promoter. A vector of this type can also include pGEX-5X-1 (Pharmacia), QIA express system (QIAGEN), pEGFP, and pET (in some cases, the host is a T7 RNA polymerase-expressing BL21).

In some embodiments, eukaryotic microbes such as, without limitation, filamentous fungi or yeast can be used as cloning and/or expression hosts for vectors encoding any of the variety of bispecific binding agents provided herein. *Saccharomyces cerevisiae*, or common baker's yeast, is the most commonly used among lower eukaryotic host microorganisms. However, a number of other genera, species, and strains are commonly available and can be used in methods provided herein, such as, without limitation, *Schizosaccharomyces pombe; Kluyveromyces* hosts such as, e.g., *K. lactis, K. fragilis* (ATCC 12,424), *K. bulgaricus* (ATCC 16,045), *K. wickeramii* (ATCC 24,178), *K. waltii* (ATCC 56,500), *K. drosophilarum* (ATCC 36,906), *K. thermotolerans*, and *K. marxianus; yarrowia* (EP 402,226); *Pichia pastors* (EP 183,070); *Candida; Trichoderma* reesia (EP 244,234); *Neurospora crassa; Schwanniomyces* such as *Schwanniomyces occidentalis*; and filamentous fungi such as, e.g., *Neurospora, Penicillium, Tolypocladium*, and *Aspergillus* hosts such as *A. nidulans* and *A. niger*.

Suitable host cells for the expression of glycosylated proteins (e.g., bispecific binding agents) can be derived from multicellular organisms. Examples of invertebrate cells include plant and insect cells. Numerous baculoviral strains and variants and corresponding permissive insect host cells from hosts such as *Spodoptera frugiperda* (caterpillar), *Aedes aegypti* (mosquito), *Aedes albopictus* (mosquito), *Drosophila melanogaster* (fruitfly), and *Bombyx mori* have been identified. A variety of viral strains for transfection are publicly available, e.g., the L-1 variant of *Autographa californica* NPV and the Bm-5 strain of *Bombyx mori* NPV, and such viruses may be used as the virus herein according to the present disclosure, particularly for transfection of *Spodoptera frugiperda* cells. Plant cell cultures of cotton, corn, potato, soybean, petunia, tomato, tobacco, lemna, and other plant cells can also be utilized as hosts.

In some embodiments, a vector used for polypeptide (e.g., bispecific binding agent) production can be a mammal-derived expression vector (e.g., pcDNA3 (Invitrogen), pEGF-BOS (Nucleic acids, Res., 1990, 18(17), p. 5322, hereby incorporated by reference in its entirety), pEF, pCDM8); insect cell-derived expression vectors (e.g., Bac-to BAC baculovairus expression system (GIBCO BRL), pBacPAK8); vegetable-derived expression vectors (e.g., pMH1, pMH2); animal virus-derived expression vectors (e.g., pHSV, pMV, pAdexLcw), retrovirus-derived expression vectors (e.g., pZIPneo), yeast-derived expression vectors (e.g., Pichia Expression Kit (Invitrogen), pNV11, SP-QO1), *Bacillus subtilis*-derived expression vectors (e.g., pPL608, pKTH50).

For expression in hosts, (e.g., animal cells such as CHO cells, COS cells or NIH3T3 cells), a vector can have a promoter that drives intracellular expression, for example, SV40 promoter (Mulligan et al., Nature (1979) 277, 108, hereby incorporated by reference in its entirety), MMTV-LTR promoter, EF1a promoter (Mizushima et al., Nucleic Acids Res. (1990) 18, 5322, hereby incorporated by reference in its entirety), CAG promoter (Gene (1991) 108, 193, hereby incorporated by reference in its entirety), or CMV promoter. Examples of useful mammalian host cell lines include, without limitation, Chinese hamster ovary cells, including CHOK1 cells (ATCC CCL61), DXB-11, DG-44, and Chinese hamster ovary cells/-DHFR (CHO, Urlaub et al., Proc. Natl. Acad. Sci. USA 77: 4216 (1980)); monkey kidney CV1 line transformed by SV40 (COS-7, ATCC CRL 1651); human embryonic kidney line (293 or 293 cells subcloned for growth in suspension culture, (Graham et al., J. Gen Virol. 36: 59, 1977); baby hamster kidney cells (BHK, ATCC CCL 10); mouse sertoli cells (TM4, Mather, (Biol. Reprod. 23: 243-251, 1980); monkey kidney cells (CV1 ATCC CCL 70); African green monkey kidney cells (VERO-76, ATCC CRL-1587); human cervical carcinoma cells (HELA, ATCC CCL 2); canine kidney cells (MDCK, ATCC CCL 34); buffalo rat liver cells (BRL 3A, ATCC CRL 1442); human lung cells (W138, ATCC CCL 75); human liver cells (Hep G2, HB 8065); mouse mammary tumor (MMT 060562, ATCC CCL51); TRI cells (Mather et al., Annals N.Y Acad. Sci. 383: 44-68 (1982)); MRC 5 cells; FS4 cells; and a human hepatoma line (Hep G2). In certain embodiments, two mammalian expression plasmids (e.g., a gWiz backbone) can be used, wherein encoding each mammalian expression plasmids encodes at least one polypeptide of a bispecfic binding agent. The aforementioned list of cells are illustrative and non-limiting.

In some embodiments, the vector includes a gene for screening of the transformed cells (e.g., drug-resistant gene capable of being differentiated by drug (e.g., neomycin, G418)). The vector having such characteristics includes, for example, pMAM, pDR2, pBK-RSV, pBK-CMV, pOPRSV, pOP13. In an exemplary embodiment, expression vectors can be co-transfected into human embryonic kidney (HEK 293) cells for soluble expression. In some embodiments, host cells are transformed or transfected with any of the above-described expression or cloning vectors for production of a bispecific binding agent and cultured in conventional nutrient media modified as appropriate for inducing promoters, selecting transformants, and/or amplifying the genes encoding the desired sequences. In some embodiments, novel vectors and transfected cell lines with multiple copies of transcription units separated by a selective marker can be used for the expression of antibodies that bind target.

When using recombinant techniques, the bispecific binding agent can be produced intracellularly, in the periplasmic space, or directly secreted into the medium, including from microbial cultures. If the bispecific binding agent is produced intracellularly, as a first step, the particulate debris, either host cells or lysed fragments, can be removed, for example, by centrifugation or ultrafiltration. Better et al. (Science 240:1041-43, 1988; ICSU Short Reports 10:105 (1990); and Proc. Natl. Acad. Sci. USA 90:457-461 (1993) describe a procedure for isolating antibodies which are secreted to the periplasmic space of E. coli. [See also, (Carter et al., Bio/Technology 10:163-167 (1992)].

A bispecific binding agent (e.g., a bispecific binding agent that binds IL-6Rα and IL-8R) prepared from microbial or mammalian cells can be purified using, for example, hydroxylapatite chromatography cation or avian exchange chromatography, and affinity chromatography. The suitability of protein A as an affinity ligand depends on the species and isotype of any immunoglobulin Fc domain that is present in the bispecific binding agent. Protein A can be used to purify bispecific binding agents that are based on human γ1, γ2, or γ4 heavy chains (Lindmark et al., J. Immunol. Meth. 62: 1-13, 1983). Protein G is recommended for all mouse isotypes and for human γ3 (Guss et al., EMBO J. 5:15671575 (1986)). The matrix to which the affinity ligand is attached is most often agarose, but other matrices are available. Mechanically stable matrices such as controlled pore glass or poly(styrenedivinyl)benzene allow for faster flow rates and shorter processing times than can be achieved with agarose. Where the bispecific binding agent comprises a $C_H3$ domain, the Bakerbond ABX™ resin (J. T. Baker, Phillipsburg, N.J.) is useful for purification. Other techniques for protein purification such as fractionation on an ion-exchange column, ethanol precipitation, Reverse Phase HPLC, chromatography on silica, chromatography on heparin SEPHAROSE® chromatography on an anion or cation exchange resin (such as a polyaspartic acid column), chromatofocusing, SDS-PAGE, and ammonium sulfate precipitation are also available depending on the bispecific binding agent to be recovered.

The vector may include a signal sequence for polypeptide secretion. For example, pelB signal sequence (Lei, S. P. et al., Bacteriol. (1987) 169, 4397, hereby incorporated by reference in its entirety) may be used for production in periplasm of E. coli. The introduction of the vector into a host cell may be effected, for example, according to a calcium chloride method or an electroporation method. Other suitable methods to introduce an expression vector into a host cell are well known in the art. Nucleic acid sequences can be validated by sequencing. Sequencing is carried out using standard techniques (see, e.g., Sambrook et al. (1989) Molecular Cloning: A Laboratory Guide, Vols 1-3, Cold Spring Harbor Press, and Sanger, F. et al. (1977) Proc. Natl. Acad. Sci. USA 74: 5463-5467, which is incorporated herein by reference) and sequencing methods are well known to a person of ordinary skill in the art.

EXAMPLES

The invention is further described in the following examples, which do not limit the scope of the invention described in the claims.

Example 1: Methods for Generating Novel Bispecific Binding Agents

Plasmid Construction

To validate the bispecific binding agent provided herein, the heavy and light antibody chains of a first binding agent, the anti-IL-6Rα antibody tocilizumab (see, e.g., (U.S. Pat. No. 8,562,991), were cloned into an expression vector with the amino acid sequence shown in SEQ ID NO: 9 (the nucleotide sequence encoding SEQ ID NO: 9 is shown in SEQ ID NO: 10). The heavy and light antibody chains of a second binding agent, the anti-IL-8RB antibody 10H2 (see, e.g., Chuntharapai A, Lee J, Hébert C A, Kim K J. Monoclonal antibodies detect different distribution patterns of IL-8 receptor A and IL-8 receptor B on human peripheral blood leukocytes. J Immunol. 1994 Dec. 15; 153(12):5682-5688. PMID: 7527448) were determined via RACE, performed by Genscript (2 Frohman M A, Dush M K, Martin G R. Rapid production of full-length cDNAs from rare transcripts: amplification using a single gene-specific oligonucleotide primer. Proc Natl Acad Sci USA. 1988 December; 85(23):8998-9002. PMCID: PMC282649) and were cloned into an expression vector with the amino acid sequence shown in SEQ ID NO: 11 (the nucleotide sequence encoding SEQ ID NO: 11 is shown in SEQ ID NO: 12). The sequences of the variable domains of the anti-IL-6Rα (tocilizumab) and anti-IL-8RB (10H2) antibodies were cloned into two human IgG1-based bispecific binding agent formats (FIGS. 2, 3) (SEQ ID NOs: 9, 11, 14, and 15, respectively).

Figure 2:
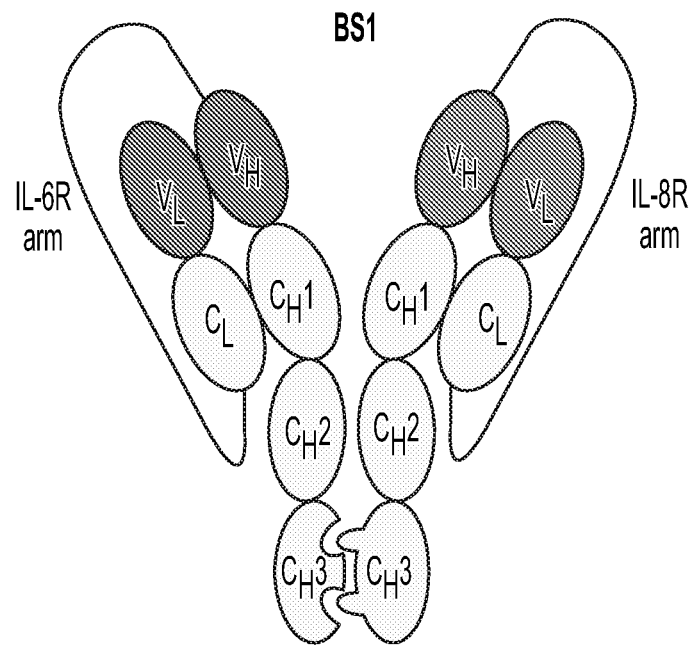
FIG. 2. Exemplary bispecific binding agent format combining a knobs-in-holes assembly strategy and a single-chain Fab expression approach with tocilizumab (anti-IL-6R) and 10H2 (anti-IL-8R) antibody variable heavy and light chains, "BS1."

The fully constructed bispecific binding agent comprising the tocilizumab and 10H2 antibody heavy and light chains is shown in FIG. 2, and is denoted as "BS1" in various places herein. The BS1 format combines a knobs-in-holes strategy with a single-chain Fab expression (FIG. 2). As described herein, the full BS1 antibody construction was facilitated by the knobs-in-holes dimerization strategy. Amino acid substitutions were introduced into the tocilizumab $C_H3$ domain at positions 645, 647, and 686 of SEQ ID NO: 9 creating cavities (holes) in the polypeptide interface. The tocilizumab $C_H3$ domain amino acid substitutions included serine, alanine, and valine substitutions at positions 645, 647 and 686 (T645S, L647A, and Y686V) (SEQ ID NO: 9). Further, amino acid substitutions were introduced into the 10H2 $C_H3$ domain at position 642 of SEQ ID NO: 11 creating a protuberance (knob) in the peptide interface. The 10H2 CH3 domain amino acid substitution included a tryptophan substitution at position 642, (T642W) (SEQ ID NO: 11). A knobs-in-holes strategy enforces proper heterodimerization and single-chain Fab expression ensures appropriate pairing of the heavy and light chains from each antibody. Complementary sets of mutations were introduced into the third constant domains of the tocilizumab and 10H2 antibody heavy chains to favor heterodimerization over homodimerization, and a long flexible linker connecting the C-terminus of the constant light chain to the N-terminus of the variable heavy chain was used (FIG. 2).

Figure 3:
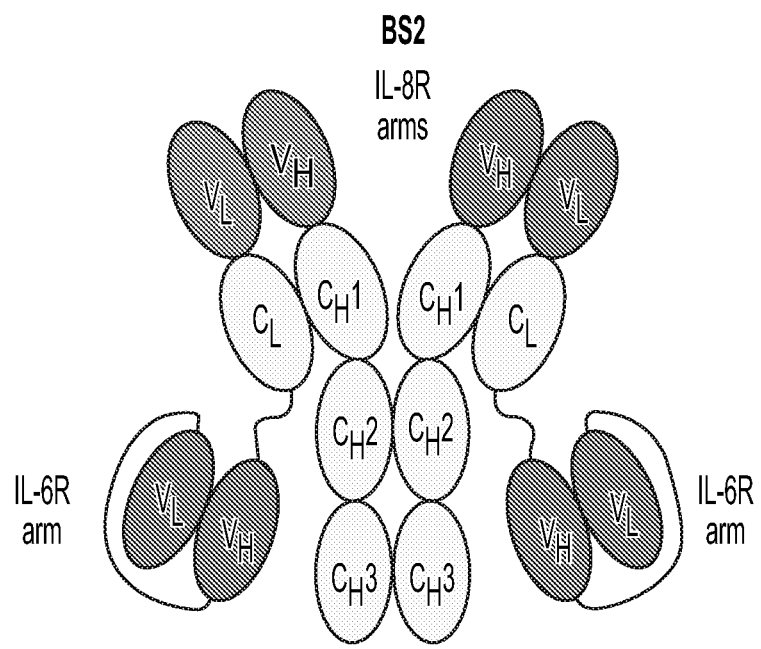
FIG. 3. Exemplary bispecific antibody format with tocilizumab (anti-IL-6R) scFvs linked to light chains of 10H2 (anti-IL-8R) IgG antibody, denoted "BS2."

For control and comparison purposes, a previously validated bispecific binding agent was also generated with tocilizumab and 10H2 antibodies (FIG. 3). This bispecific binding agent format is a validated scFv-IgG fusion that tethers a scFv specific for IL-6Rα (based on tocilizumab) to a full IgG antibody specific for IL-8RB (based on the variable regions of 10H2), and is denoted "BS2" (FIG. 3). The scFv included the tocilizumab VH and VL domains connected by a flexible (G4S)$_3$ linker. The heavy and light chain DNA constructs (SEQ ID NOs: 14 and 15, respectively) were constructed as previously described (Orcutt K D, Ackerman M E, Cieslewicz M, Quiroz E, Slusarczyk A L, Frangioni J V, Wittrup K D. A modular IgG-scFv bispecific antibody topology. Protein Eng Des Sel. 2010 Apr. 1; 23(4):221-228). The heavy and light chain DNA construct were co-transfected to produce the BS2 bispecific antibody. Again, small scale co-transfections were used to optimize the DNA plasmid ratio for large-scale expression. Additionally, the full tocilizumab and 10H2 monoclonal hIgG1 antibodies were also expressed via co-transfection of their respective heavy and light chains as controls according to the methods provided herein.

Protein Expression and Purification

HEK 293F cells were cultivated in Freestyle 293 Expression Medium (Thermo Fisher Scientific) supplemented with 2 U/mL penicillin-streptomycin (Gibco). Mammalian expression plasmids (gWiz backbone) encoding the tocilizumab and 10H2 antibody domain fusions (BS1), which contained complementary heavy chain constant domain 3 ($C_H3$) mutations, were co-transfected into HEK 293F cells for soluble expression. Similarly, BS2 was co-transfected for soluble expression to produce the bispecific antibody. Polyethylenimene was used as a transfection reagent (Spangler J B, Manzari M T, Rosalia E K, Chen T F, Wittrup K D. Triepitopic Antibody Fusions Inhibit Cetuximab-Resistant BRAF and KRAS Mutant Tumors via EGFR Signal Repression. J Mol Biol. 2012 Sep. 28; 422(4):532-544). The tocilizumab and 10H2 fusion DNA plasmids were titrated using a small-scale expression assay to determine the optimal ratio for large-scale transfections.

Both bispecific binding agent formats, BS1 and BS2, were expressed with anti-IL-6Rα (tocilizumab) and anti-IL-8RB (10H2) variable domains. BS1 and BS2 were purified from transfected HEK 293F cell supernatants via protein G chromatography followed by size exclusion chromatography using a Superdex 200 column on a fast protein liquid chromatography (FPLC) system (GE Healthcare).

The human IL-6Rα extracellular domain (ECD), residues 89-303 of the mature protein, was cloned into the gWiz mammalian expression plasmid with a C-terminal biotin acceptor peptide (BAP)-LNDIFEAQKIEWHE and a C-terminalhexahistidine sequence. Transient expression in HEK 293F cells was achieved using polyethylenimene as a transfection reagent (Spangler J B, Manzari M T, Rosalia E K, Chen T F, Wittrup K D. Triepitopic Antibody Fusions Inhibit Cetuximab-Resistant BRAF and KRAS Mutant Tumors via EGFR Signal Repression. J Mol Biol. 2012 Sep. 28; 422 (4):532-544). IL-6Rα was extracted from transfected HEK 293 cell supernatants via nickel-nitrilotriacetic acid (Ni-NTA) chromatography and biotinylated using the soluble BirA ligase enzyme in 0.5 mM Bicine pH 8.3, 100 mM ATP, 100 mM magnesium acetate, and 500 mM biotin (Sigma). Biotinylated IL-6Rα ECD was further purified by size exclusion chromatography using a Superdex 200 column on an FPLC instrument (GE Healthcare). Purity (>99%) was confirmed via SDS-PAGE analysis. All proteins were stored in HEPES-buffered saline (HBS, 150 mM NaCl in 10 mM HEPES pH 7.3)

Bio-Layer Interferometry Binding Studies

To demonstrate functionality of the BS1 and BS2 bispecific binding agent formats, binding of these agents to human IL-6Rα ECD was quantified via bio-layer interferometry (BLI). Biotinylated human IL-6Rα ECD was immobilized to streptavidin-coated tips for analysis on an Octet® Red96 BLI instrument (ForteBio). Less than 5 signal units (nm) of receptor was immobilized to minimize mass transfer effects. Tips were exposed to serial dilutions of the anti-IL-6R antibody tocilizumab, the anti-IL-8R antibody 10H2, BS1, or BS2 in a 96-well plate for 300 s and dissociation was measured for 600 s. Surface regeneration for all interactions was conducted using 15 s exposure to 0.1 M glycine pH 3.0. Experiments were carried out in PBSA (phosphate-buffered saline [PBS] pH 7.3 plus 0.1% bovine serum albumin [BSA, Thermo]) at 25° C. Data was visualized and processed using the Octet® Data Analysis software version 7.1 (ForteBio). Equilibrium titration curve fitting and equilibrium dissociation constant ($K_D$) value determination was implemented in GraphPad Prism software using a first-order logistic model. Experiments were reproduced two times with similar results.

Yeast Cell Surface Affinity Titrations

Human IL-6 (residues 3-185) was cloned into the pCT302 vector and presented on the surface of yeast, as described previously. (See Boder E T, Wittrup K D. Yeast surface display for screening combinatorial polypeptide libraries. Nat Biotechnol. 1997 June; 15(6):553-557. PMID: 9181578). Yeast displaying human IL-6 were incubated in PBSA containing serial dilutions of recombinant IL-6Rα ECD for 2 hours at room temperature. Cells were then washed and stained with a 1:200 dilution of Alexa647-conjugated streptavidin (Thermo) in PBSA for 15 min at 4° C. After a final wash, cells were analyzed for antibody binding using a CytoFLEX flow cytometer (Beckman Coulter). Background-subtracted and normalized binding curves were fitted to a first-order logistic model and $K_D$ values were determined using GraphPad Prism.

Yeast Cell Surface Competition Studies

Approximately $1\times10^5$ human IL-6-displaying yeast per well were plated in a 96-well plate and washed with PBSA. Yeast cells were incubated with saturating concentrations of biotinylated human IL-6Rα (300 nM) and serial dilutions of unlabeled competitor antibody (either the anti-IL-6R antibody tocilizumab, the anti-IL-8R antibody 10H2, BS1, or BS2) in PBSA for 2 hours at room temperature. Cells were then washed and stained with a 1:200 dilution of Alexa647-conjugated streptavidin (Thermo) in PBSA for 15 min at 4° C. Cells were washed again and assessed for human IL-6Rα binding on a CytoFLEX flow cytometer (Beckman Coulter). Background-subtracted fluorescent signal as a fraction of receptor subunit binding in the absence of competitor antibody was plotted. Curves were fitted to a first order logistic model and half maximal inhibitory concentrations ($IC_{50S}$) were computed using GraphPad Prism. Assays were performed in triplicate and repeated two times with consistent results.

Generation of IL-6R- and IL-8R-expressing cell lines

The IL-6Rα and IL-8RB genes were cloned into a lentiviral expression plasmid, and viruses were prepared following manufacturer instructions (pPACKH1 HIV Lentivector Packaging Kit, cat #LV500A-1, System Bioscience). Briefly, $3\times10^6$ HEK 293T cells were plated on 10 cm dishes and cultured in Iscove's Modified Dulbecco's Media (IMDM, Thermo Fisher) supplemented with 10% FBS (Hyclone), 2 mM L-glutamine and 100 U/mL penicillin-streptomycin (Gibco) overnight. 2 μg of lentivirus-transducing plasmids (pCDH backbone) encoding the IL-6Rα or IL-8R was used to transfect HEK 293T cells with pPACK packaging plasmid mix. GeneJuice (Sigma Aldrich) was used as the transfection reagent. IL-6R and IL-8R lentivirus were collected from media after two days and were filtered through 0.45 μm filters. Approximately $0.1 \times 10^6$ HEK 293T cells cultured in a 24-well plate were transduced with IL-6R or IL-8R or the combination of the IL-6R and IL-8R lentiviruses with 8 μg/mL of polybrene (Sigma Aldrich) in 500 μl of IMDM. Immediately after transduction, HEK 293T cells were centrifuged at 800×g for 30 min at 32° C. and incubated overnight at 37° C. in a humidified 5% CO2 incubator. The culture media was replaced with fresh complete IMDM culture media on the day after transduction and transduced cells were harvested for testing IL-6R and IL-8R expression via flow cytometry 10 days after transduction.

IL-6R and IL-8R Cell Surface Binding Assays

HEK 293T cells were cultured in Dulbecco's modified Eagle's medium (DMEM, Mediatech) supplemented with 10% (Hyclone), 2 mM L-glutamine and 100 U/mL penicillin-streptomycin (Gibco). For surface binding assays, IL-6Rα$^+$/IL-8R$^-$, IL-6Rα$^-$/IL-8R$^+$, IL-6Rα$^+$/IL-8R$^+$, and IL-6Rα$^-$/IL-8R$^+$ HEK 293T cells were trypsinized for detachment, resuspended in PBSA, and then aliquoted into 96-well plates ($1 \times 10^5$ cells per well). Cells were incubated with titrations of various monoclonal or bispecific antibodies for 2 hr at 4° C. with rotation. Cells were then washed and incubated with a 1:50 dilution of fluorescein isothiocyanate (FITC)-conjugated anti-human IgG1 antibody (Sigma-Aldrich, Clone 8c/6-39) in PBSA for 15 min at 4° C. After a final wash, cells were resuspended in PBSA and analyzed on a CytoFLEX flow cytometer (Beckman Coulter). Binding isotherms were fitted to a first-order logistic model and $K_D$ values were calculated using GraphPad Prism data analysis software. Mean fluorescence intensity (MFI) of unstimulated cells was subtracted. Experiments were conducted in triplicate and performed twice with similar results.

IL-6 and IL-8 Cell Surface Binding Inhibition Assays

IL-6Rα$^+$/IL-8R$^-$ and IL-6Rα$^-$/IL-8R$^+$ HEK 293T cells were cultured as previously described, and were trypsinized, resuspended in PBSA, and aliquoted into 96-well plates ($2 \times 10^5$ cells per well). IL-6Rα$^+$/IL-8R$^-$ 293T cells were incubated with titrations of various monoclonal or bispecific antibodies in the presence of saturating concentration of biotinlyated IL-6 (100 nM) (Acro Biosystem, cat #: IL6-H8218-25UG) for 2 hr at 4° C. with rotation. Cells were then washed and incubated with 1:200 dilution of Alexa Fluor 647-conjugated streptavidin (Fisher Scientific, cat #: S21374) in PBSA for 15 min at 4° C. After a final wash, cells were resuspended in PBSA and analyzed on a CytoFLEX flow cytometer (Beckman Coulter). Curves were fitted to a first-order logistic model and $IC_{50}$ values were calculated using GraphPad Prism data analysis software. Mean fluorescence intensity (MFI) of unstimulated cells was subtracted. Similarly, IL-6Rα$^-$/IL-8R$^+$ 293T cells were incubated with titrations of various monoclonal or bispecific antibodies with saturating concentration of His-tagged IL-8 (400 nM) (Sino Biological, cat #: 10098-H08Y-100) for 2 hr at 4° C. with rotation. The cells were then washed and incubated with a 1:50 dilution of Alexa Fluor 647-conjugated anti-penta His antibody (Qiagen, cat #: 35370) in PBSA for 15 min at 4° C. After a final wash, cells were resuspended in PBSA and analyzed on a CytoFLEX flow cytometer (Beckman Coulter). Curves were fitted to a first-order logistic model and $IC_{50}$ values were calculated using GraphPad Prism data analysis software. Experiments were conducted in triplicate and performed twice with similar results.

Example 2: Expression and Biophysical Validation of Bispecific Binding Agents

Figure 4:
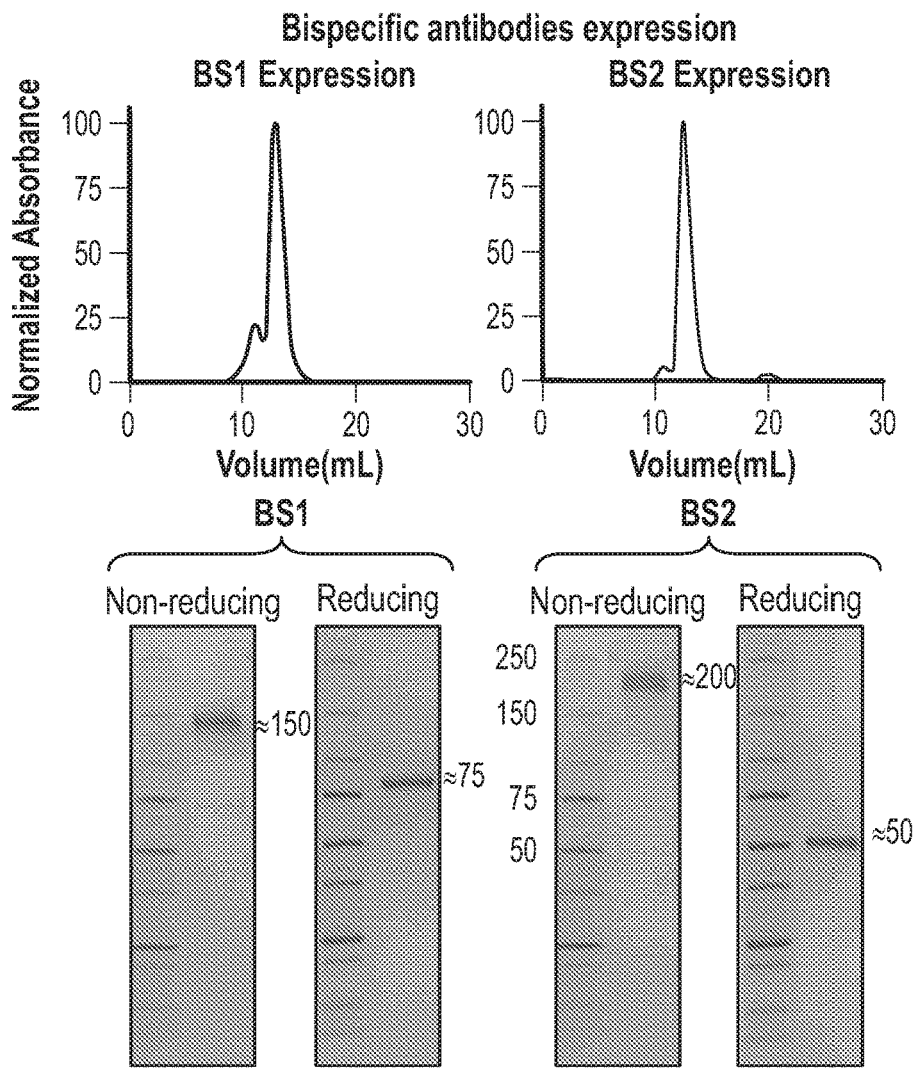
FIG. 4. Expression of recombinant bispecific antibodies, BS1 and BS2. Size exclusion chromatography traces from FPLC purification of bispecific binding agents secreted in a mammalian cell expression system. Non-reducing and reducing SDS-PAGE analyses demonstrated that the proteins were purified to homogeneity and migrate at the expected molecular weights.

Bispecific Binding Agents were Successfully Expressed and Purified from Mammalian Cells BS1 and BS2 were expressed and purified to >99% homogeneity from HEK 293F cells via transient transfection. Representative FPLC traces and SDS-PAGE analyses are shown in FIG. 4. Both bispecific binding agents appeared as distinct, monodisperse peaks by FPLC analysis with minimal aggregation, and migrated at the expected molecular weights in non-reducing and reducing SDS-PAGE analyses.

Bispecific Binding Agents Bind to IL-6Rα

Figure 5:
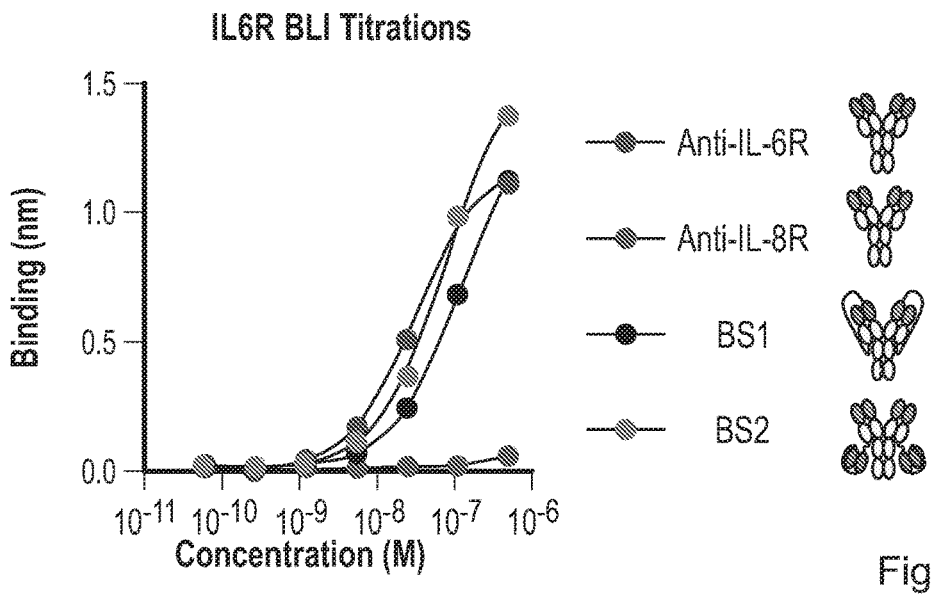
FIG. 5. Bispecific antibodies BS1 and BS2, which contain the variable heavy and light chains of the anti-IL-6Rα antibody tocilizumab, bind to the IL-6Rα extracellular domain (ECD). Equilibrium bio-layer interferometry (BLI) titrations are shown of immobilized human IL-6Rα ECD with tocilizumab (anti-IL-6R), 10H2 (anti-IL-8R), and bispecific antibodies BS1 and BS2.

To confirm functionality of our bispecific agents, antibodies were titrated against recombinant IL-6Rα via BLI. The anti-IL-6Rα antibody tocilizumab bound its target receptor with an apparent bivalent affinity of 28 nM, whereas the anti-IL-8RB antibody 10H2 did not engage IL-6Rα. Moreover, both tocilizumab-containing engineered bispecific binding agents also bound IL-6Rα (FIG. 5). As expected, BS1 had a weaker binding affinity ($K_D$=120 nM) compared with tocilizumab due to its monovalent interaction with IL-6Rα. In addition, BS2 had an intermediate binding affinity, since it engages IL-8R bivalently, but the engagement topology differs from that of a conventional monoclonal IgG, as the two scFv moieties are fused to the C-terminus of the light chain constant domain (FIGS. 2 and 3).

Bispecific Binding Agents Block IL-6Rα Binding to the IL-6 Cytokine

Figure 6A:
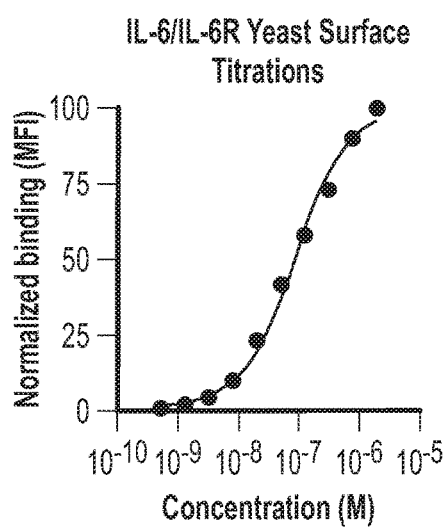
FIG. 6. Bispecific antibodies BS1 and BS2 competitively inhibit IL-6/IL-6Rα binding. (A) Titration of recombinant IL-6Rα ECD on IL-6-expressing yeast, as measured by flow cytometry. (B) Competitive inhibition of the IL-6/IL-6Rα interaction by tocilizumab (anti-IL-6R), 10H2 (anti-IL-8R), and bispecific antibodies BS1 and BS2. The anti-IL-8RB antibody 10H2 does not compete with the cytokine/receptor binding, whereas the anti-IL-6Rα antibody tocilizumab and the engineered tocilizumab-containing Bispecific antibodies block binding in accordance with their affinities. Data represent mean±s.d.
Figure 6B:
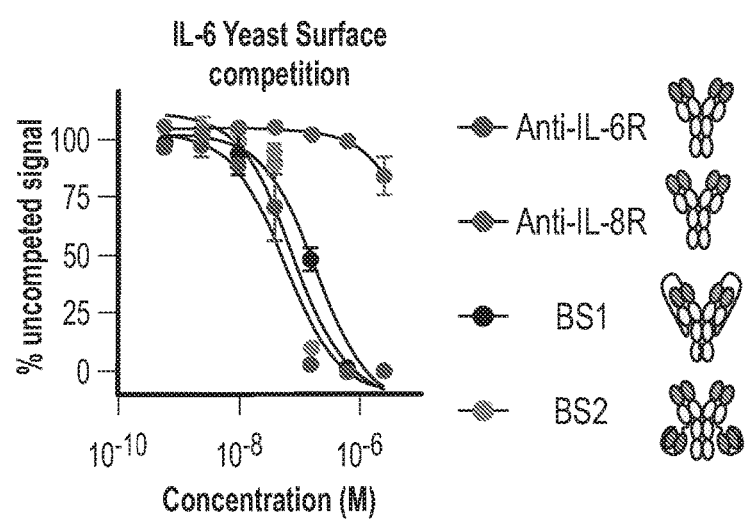

Tocilizumab is known to compete with IL-6 for IL-6Rα engagement. Thus, bispecific binding agents containing the tocilizumab variable regions (BS1 and BS2) were also expected to obstruct cytokine binding. Human IL-6 was displayed on the surface of yeast (See Boder E T, Wittrup K D. Yeast surface display for screening combinatorial polypeptide libraries. Nat Biotechnol. 1997 June; 15(6):553-557. PMID: 9181578) and the $K_D$ of soluble IL-6Rα ECD was determined to be 88 nM (FIG. 6A). To demonstrate IL-6 inhibition, IL-6-displaying yeast were incubated with a fixed saturating concentration of biotinylated IL-6Rα ECD (300 nM), and titrations of antibody competitor, (either the anti-IL-6R antibody tocilizumab, the anti-IL-8R antibody 10H2, BS1, or BS2) were added to assess disruption of the IL-6/IL-6Rα interaction (FIG. 6B). 10H2 did not compete with the IL-6/IL-6Rα interaction. However, tocilizumab ($IC_{50}$=59 nM), BS1 ($IC_{50}$=190 nM), and BS2 ($IC_{50}$=78 nM) all inhibited IL-6/IL-6Rα binding. Notably, BS1 was found to be less competitive than tocilizumab due to its monovalent engagement of IL-6Rα, and BS2 was found to be less efficient at blocking the IL-6/IL-6Rα interaction than tocilizumab, but more efficient than BS1, since it binds bivalently to IL-6Rα, but in a different topology compared to a conventional monoclonal antibody (FIG. 3).

Bispecific Antibodies Specifically Bind to IL-6Rα and IL-8R on 293T Cells

Figure 7A:
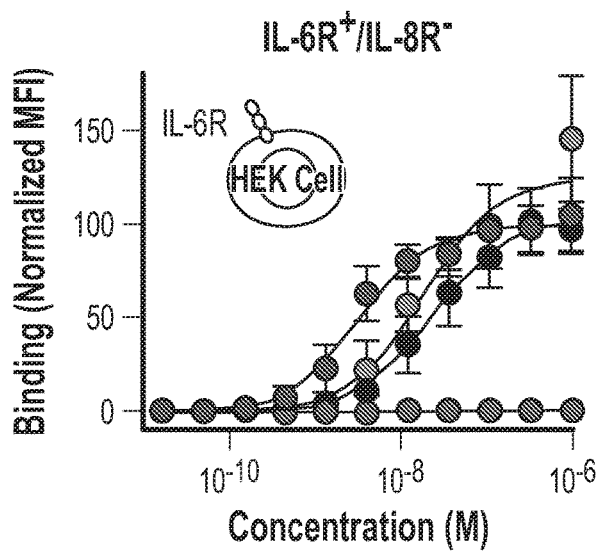
FIG. 7. Bispecific antibodies BS1 and BS2 specifically bind IL-6Rα- and IL-8R-expressing human embryonic kidney (HEK 293T) cell lines. Binding titrations of tocilizumab (anti-IL-6R), 10H2 (anti-IL-8R), and bispecific antibodies BS1 and BS2 on (A) IL-6Rα$^+$/IL-8R$^-$, (B) IL-6Rα$^-$/IL-8R$^+$, (C) IL-6Rα$^+$/IL-8R$^+$, and (D) IL-6Rα$^-$/IL-8R$^-$ HEK 293T cells. Both bispecific antibodies bind functional IL-6Rα and IL-8R on cells, whereas their constituent monoclonal antibodies bind only to either IL-6Rα or IL-8R. Antibody binding to cells was detected via flow cytometry. Data represent mean±s.d.
Figure 7B:
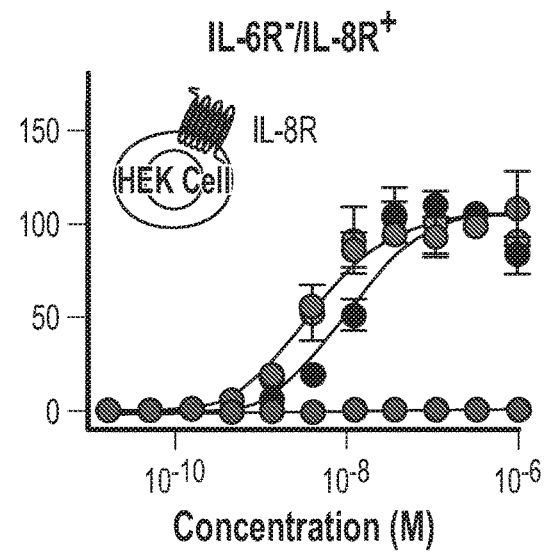
Figure 7C:
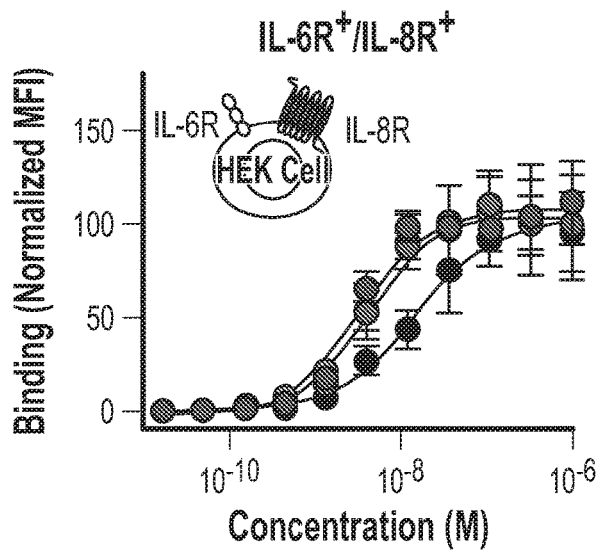
Figure 7D:
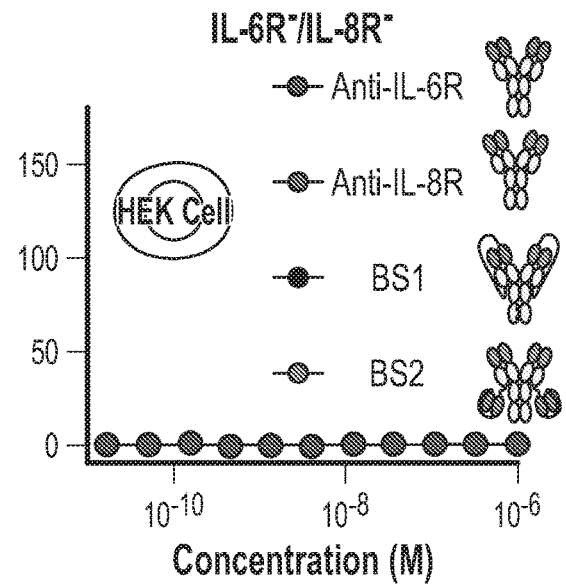

To determine whether engineered bispecific binding agents BS1 and BS2 specifically engage target antigens in a physiologically relevant context, antibody binding to IL-6Rα$^+$/IL-8R$^-$, IL-6Rα$^-$/IL-8R$^+$, IL-6Rα$^+$/IL-8R$^+$, and IL-6Rα$^-$/IL-8R$^-$ lentivirally transduced HEK 293T cells was measured via flow cytometry. BS1 and BS2 bound to both IL-6Rα (FIG. 7A, $K_D$=24 and 19 nM, respectively) and IL-8R (FIG. 7B, $K_D$=10 and 3.5 nM, respectively). In contrast, the constituent anti-IL-6R monoclonal antibody tocilizumab only recognized IL-6Rα⁺ cells and the constituent anti-IL-8R monoclonal antibody 10H2 only recognized IL-8R⁺ cells. None of the antibodies bound to IL-6Rα⁻/IL-8R⁻ 293T cells, demonstrating target specificity. BS2 bound to IL-6Rα⁺/IL-8R⁺ 293T cells with similar affinity ($K_D$=3.4 nM) compared to tocilizumab ($K_D$=3.1 nM) and 10H2 ($K_D$=4.1 nM), whereas BS1 bound to IL-6Rα⁺/IL-8R⁺ 293T cells with weaker affinity than BS2 ($K_D$=14 nM) due to its monovalent engagement of each target (FIG. 7C).

Bispecific Binding Agents Block IL-6IL-6Rα and IL-8 IL-8R Interactions

Figure 8A:
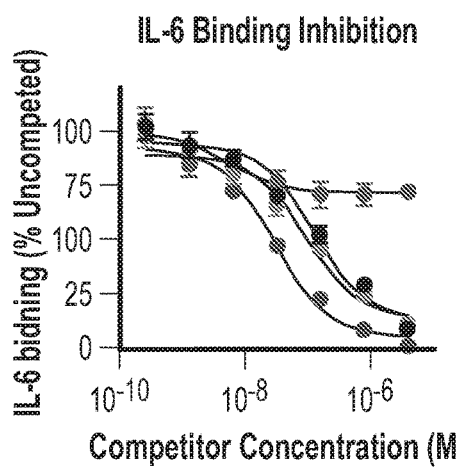
FIG. 8. Bispecific antibodies BS1 and BS2 competitively inhibit both IL-6/IL-6Rα and IL-8/IL-8R interactions. (A) Cell surface competition assays between soluble IL-6 cytokine and tocilizumab (anti-IL-6R), 10H2 (anti-IL-8R), and bispecific antibodies BS1 and BS2 on IL-6Rα$^+$/IL-8R$^-$ HEK 293T cells. Tocilizumab, BS1, and BS2 compete with IL-6 engagement of IL-6Rα. (B) Cell surface competition assays between soluble IL-8 cytokine and either tocilizumab, 10H2, BS1, or BS2 on IL-6Rα$^-$/IL-8R$^+$ HEK 293T cells. 10H2, BS1, and BS2 compete with IL-8 engagement of IL-8R. Binding of IL-6 was measured via flow cytometry. Data represent mean±s.d.
Figure 8B:
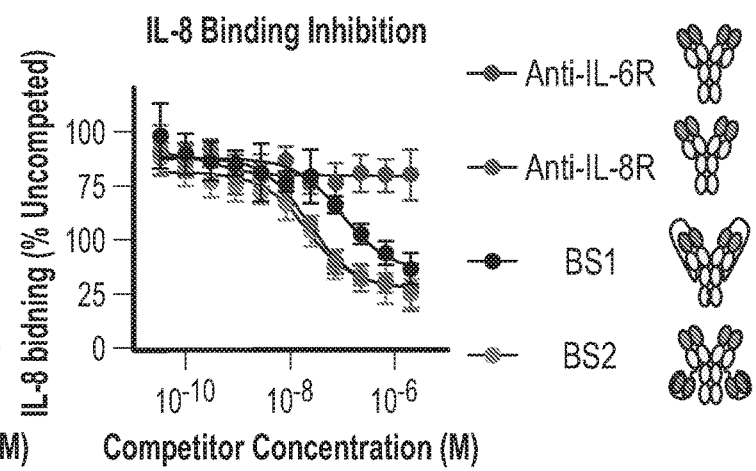

After confirmed the dual targeting of both bispecific binding agents (BS1 and BS2), the competitive binding properties of these antibodies were also characterized on IL-6Rα- or IL-8R-expressing HEK 293T cells. Both BS1 and BS2 competed with IL-6 binding to IL-6Rα on IL-6Rα⁺/IL-8R⁻ 293T cells ($IC_{50}$=120 nM and 96 nM, respectively) (FIG. 8A). The constituent anti-IL-6R monoclonal antibody tocilizumab also inhibited IL-6 binding ($IC_{50}$=30 nM), whereas 10H2 had no inhibitory effects. Aligning with trends observed in the binding assay, tocilizumab was a more potent competitor compared to bispecific antibodies due to its conventional bivalent format. BS2 was slightly more potent than BS1 due to its bivalency, albeit in an alternate topology compared to standard antibody construction. Similarly, both BS1 and BS2 competed with IL-8 binding to IL-8R on IL-6Rα⁻/IL-8⁺ HEK 293T cells ($IC_{50}$=99 nM and 22 nM, respectively) (FIG. 8B). The constituent anti-IL-8R monoclonal antibody 10H2 also inhibited IL-8 binding ($IC_{50}$=22 nM), whereas tocilizumab did not exert any inhibitory effects. BS2 and 10H2 inhibited with equal potency since they both comprise the full IL-8R-targeting hIgG antibody. BS1 exhibited weaker potency of inhibition compared to BS2 and 10H2 due to its monovalency.

```
Exemplary Linker
                                                              SEQ ID NO: 1
GGGS Exemplary Linker
                                                              SEQ ID NO: 2
GGGGS Exemplary Linker
                                                              SEQ ID NO: 3
GGSG Exemplary Linker
                                                              SEQ ID NO: 4
GSAAAGGSGGSGGS Exemplary Linker
                                                              SEQ ID NO: 5
GGGSGGGS Human IgG1 CH₁, CH₂, and CH₃ Domains, Wild-Type
                                                              SEQ ID NO: 6
ASTKGPSVFPLAPSSKSTSGGTAALGCLVKDYFPEPVTVSWNSGALTSGVHTFPAVLQSS

GLYSLSSVVTVPSSSLGTQTYICNVNHKPSNTKVDKKVEPKSCDKTHTCPPCPAPELLGG

PSVFLFPPKPKDTLMISRTPEVTCVVVDVSHEDPEVKFNWYVDGVEVHNAKTKPREEQY

NSTYRVVSVLTVLHQDWLNGKEYKCKVSNKALPAPIEKTISKAKGQPREPQVYTLPPSR

EEMTKNQVSLTCLVKGFYPSDIAVEWESNGQPENNYKTTPPVLDSDGSFFLYSKLTVDK

SRWQQGNVFSCSVMHEGLHNHYTQKSLSLSPGK

Human IgG1 CH₁, CH₂, and CH₃ Domains with "Holes" Substitutions (Exemplary holes
substitutions at positions 249, 251, and 290 are bolded and underlined)
                                                              SEQ ID NO: 7
ASTKGPSVFPLAPSSKSTSGGTAALGCLVKDYFPEPVTVSWNSGALTSGVHTFPAVLQSS

GLYSLSSVVTVPSSSLGTQTYICNVNHKPSNTKVDKKVEPKSCDKTHTCPPCPAPELLGG

PSVFLFPPKPKDTLMISRTPEVTCVVVDVSHEDPEVKFNWYVDGVEVHNAKTKPREEQY

NSTYRVVSVLTVLHQDWLNGKEYKCKVSNKALPAPIEKTISKAKGQPREPQVYTLPPSR

EEMTKNQVSLSCAVKGFYPSDIAVEWESNGQPENNYKTTPPVLDSDGSFFLVSKLTVDK

SRWQQGNVFSCSVMHEGLHNHYTQKSLSLSPGK

Human IgG1 CH₁, CH₂, and CH₃ Domains with "Knobs" Substitution (Exemplary knob
substitution at position 249 is bolded and underlined)
                                                              SEQ ID NO: 8
ASTKGPSVFPLAPSSKSTSGGTAALGCLVKDYFPEPVTVSWNSGALTSGVHTFPAVLQSS

GLYSLSSVVTVPSSSLGTQTYICNVNHKPSNTKVDKKVEPKSCDKTHTCPPCPAPELLGG
```

PSVFLFPPKPKDTLMISRTPEVTCVVVDVSHEDPEVKFNWYVDGVEVHNAKTKPREEQY

NSTYRVVSVLTVLHQDWLNGKEYKCKVSNKALPAPIEKTISKAKGQPREPQVYTLPPSR

EEMTKNQVSLWCLVKGFYPSDIAVEWESNGQPENNYKTTPPVLDSDGSFFLYSKLTVD

KSRWQQGNVFSCSVMHEGLHNHYTQKSLSLSPGK

BS1 Antibody Chain 1 with Tociliuzmab Light and Heavy Chains and Human IgG1 CH₁,
CH₂, and CH₃ Domains with "Holes" Substitutions
Relevant domains are shown below (described in an N- to C-terminal direction)
Signal Sequence is shown in boxed outline
Tocilizumab light chain variable region is underlined
Tocilizumab light chain constant region is italicized
The linker region is shown in italicized boxed outline
Tocilizumab heavy chain variable region is in bold text
Exemplary holes substitutions at positions 645, 647, and 686 are in bold and underlined
text

SEQ ID NO: 9

[MRVPAQLLGLLLLWLPGARCAGS]DIQMTQSPSSLSASVGDRVTITCRASQDISSYLNWY

QQKPGKAPKLLIYYTSRLHSGVPSRFSGSGSGTDFTFTISSLQPEDIATYYCQQGNTLPYTF

GQGTKVEIKR*TVAAPSVFIFPPSDEQLKSGTASVVCLLNNFYPREAKVQWKVDNALQSGNSQE*

*SVTEQDSKDSTYSLSSTLTLSKADYEKHKVYACEVTHQGLSSPVTKSFNRGEC*[*GGSGGSSGSGS*

*GSTGTSSSGTGTSAGTTGTSASTSGSGSG*]EVQLQESGPGLVRPSQTLSLTCTVSGYSITSD

HAWSWVRQPPGRGLEWIGYISYSGITTYNPSLKSRVTMLRDTSKNQFSLRLSSVTAA

DTAVYYCARSLARTTAMDYWGQGSLVTVSSASTKGPSVFPLAPSSKSTSGGTAALGCL

VKDYFPEPVTVSWNSGALTSGVHTFPAVLQSSGLYSLSSVVTVPSSSLGTQTYICNVNHK

PSNTKVDKKVEPKSCDKTHTCPPCPAPELLGGPSVFLFPPKPKDTLMISRTPEVTCVVVD

VSHEDPEVKFNWYVDGVEVHNAKTKPREEQYNSTYRVVSVLTVLHQDWLNGKEYKCK

VSNKALPAPIEKTISKAKGQPREPQVYTLPPSREEMTKNQVSLSCAVKGFYPSDIAVEWE

SNGQPENNYKTTPPVLDSDGSFFLVSKLTVDKSRWQQGNVFSCSVMHEGLHNHYTQKS

LSLSPGK

Nucleic Acid Sequence Encoding BS1 Antibody Chain 1 with Tocilizumab Light and Heavy
Chains and Human IgG1 CH1, CH2, and CH3 Domains with "Holes" Substitutions

SEQ ID NO: 10 atgagggtccccgctcagctcctggggctcctgctgctctggctcccaggtgcacgatgtgccggatccgacatccagatgacccagagc cccagcagcctgagcgccagcgtgggcgaccgcgtgaccatcacctgccgcgccagccaggacatcagcagctacctgaactggtacc agcagaagcccggcaaggcccccaagctgctgatctactacaccagccgcctgcacagcggcgtgcccagccgcttcagcggcagcgg cagcggcaccgacttcaccttcaccatcagcagcctgcagcccgaggacatcgccacctactactgccagcagggcaacaccctgcccta caccttcggccagggcaccaaggtggagatcaagcgtacggtggctgcaccatctgtcttcatcttcccgccatctgatgagcagttgaaatc tggaactgcctctgttgtgtgcctgctgaataacttctatcccagagaggccaaagtacagtggaaggtggataacgccctccaat cgggtaactcccaggagagtgtcacagagcaggacagcaaggacagcacctacagcctcagcagcaccctgacgctgagcaaagcag actacgagaaacacaaagtctacgcctgcgaagtcacccatcagggcctgagctcgcccgtcacaaagagcttcaacaggggtgagtgc ggtggttctggggggatctagcggatcggggtctgggtcgactggtacctcgtcaagcgggacgggtactagtgctggtactacgggcactt cagctagcacctctggctcggggtccggcgaggtgcagctgcaggagagcggccccggcctggtgcgcccagccagaccctgagcc tgacctgcaccgtgagcggctacagcatcaccagcgaccacgcctggagctgggtgcgccagccaccggtcgcggactggagtggat cggctacatcagctacagcggcatcaccacctacaaccccagcctgaagagccgcgtgaccatgctgcgcgacaccagcaagaaccagt tcagcctgcgcctgagcagcgtgaccgccgccgacaccgccgtgtactactgcgcccgcagcctggcccgcaccaccgccatggacta ctggggccagggcagcctggtgaccgtgagcagcgctagcaccaaggcccatcggtatccctggcaccctcctccaagagcact ctggggcacagcggccctgggctgcctggtcaaggactacttccccgaaccggtgacggtgtcgtggaactcaggcgccctgaccagc -continued ggcgtgcacaccttcccggctgtcctacagtcctcaggactctactccctcagcagcgtggtgaccgtgccctccagcagcttgggcaccc agacctacatctgcaacgtgaatcacaagcccagcaacaccaaggtggacaagaaagttgagcccaaatcttgtgacaaaactcacacat gcccaccgtgcccagcacctgaactcctggggggaccgtcagtatcctcttccccccaaaacccaaggacaccctcatgatctcccggac ccctgaggtcacatgcgtggtggtggacgtgagccacgaagaccctgaggtcaagttcaactggtacgtggacggcgtggaggtgcataa tgccaagacaaagccgcgggaggagcagtacaacagcacgtaccgtgtggtcagcgtcctcaccgtcctgcaccaggactggctgaatg gcaaggagtacaagtgcaaggtctccaacaaagcccccagcccccatcgagaaaccatctccaaagccaaagggcagccccgaga accacaggtgtacaccctgcccccatcccgggaggagatgaccaagaaccaggtcagcctgtcctgcgctgtcaaaggcttctatcccag cgacatcgccgtggagtgggagagcaatgggcagccggagaacaactacaagaccacgcctcccgtgctggactccgacggctccttct tcctcgtgagcaagctcaccgtggacaagagcaggtggcagcaggggaacgtcttctcatgctccgtgatgcatgagggtctgcacaacc actacacgcagaagagcctctccctgtctccgggtaaa BS1 Antibody Chain 2 with 10H2 Light and Heavy Chains and Human IgG1 CH$_1$, CH$_2$,
and CH$_3$ Domains with "Knobs" Substitutions
Relevant domains are shown below (described in an N- to C-terminal direction)
Signal Sequence is shows in boxed outline
10H2 light chain variable region is underlined
10H2 light chain constant region is italicized
The linker region is shown in italicized boxed outline
10H2 heavy chain variable region is in bold text
Exemplary knobs substitution at positions 642 is in bold and underlined text

SEQ ID NO: 11

MRVPAQLLGLLLLWLPGARCAGSQAVVTQESALTTSPGETVTLTCRSSTGAVTTSNYAN

WVQEKPDHLFTGLIGGTNNRPPGVPARFSGSLIGDKAALTITGAQIEDEAIYFCALWYSN

HLVFGGGTKLTVL*RTVAAPSVFIFPPSDEQLKSGTASVVCLLNNFYPREAKVQWKVDNALQS*

*GNSQESVTEQDSKDSTYSLSSTLTLSKADYEKHKVYACEVTHQGLSSPVTKSFNRGEC*GGSGGS

SGSGSGSTGTSSSGTGTSAGTTGTSASTSGSGSGEVQLVETGGRLVQPKGSLKLSCAVSGI

TFKTNAMNWVRQAPGKGLEWVARIRTKSYNYATYYADSVKDRFTISRDDSQSILYL

QMNNLKTEDTAMYHCVREGRWGQGTLVTVSAASTKGPSVFPLAPSSKSTSGGTAAL

GCLVKDYFPEPVTVSWNSGALTSGVHTFPAVLQSSGLYSLSSVVTVPSSSLGTQTYICNV

NHKPSNTKVDKKVEPKSCDKTHTCPPCPAPELLGGPSVFLEPPKPKDTLMISRTPEVTCV

VVDVSHEDPEVKFNWYVDGVEVHNAKTKPREEQYNSTYRVVSVLTVLHQDWLNGKEY

KCKVSNKALPAPIEKTISKAKGQPREPQVYTLPPSREEMTKNQVSLWCLVKGFYPSDIAV

EWESNGQPENNYKTTPPVLDSDGSFFLYSKLTVDKSRWQQGNVFSCSVMHEGLHNHYT

QKSLSLSPGK

Nucleic Acid Sequence Encoding BS1 Antibody Chain 2 with 10H2 Light and Heavy
Chains and Human IgG1 CH1, CH2, and CH3 Domains with "Knobs" Substitution

SEQ ID NO: 12 atgagggtccccgctcagctcctggggctcctgctgctctggctcccaggtgcacgatgtgccggatcccaggctgttgtgactcaggaatct gcactcaccacatcacctggtgaaacagtcacactcacttgtcgctcaagtactgggctgttacaactagtaactatgccaactgggtccaag aaaaaccagatcatttattcactggtctaataggtggtaccaacaaccgacctccaggtgttcctgccagattctcaggctccctgattggagac aaggctgccctcaccatcacaggggcacagattgaggatgaggcaatatatttctgtgctctatggtacagcaaccatttggtgttcggtggag gaaccaaactgactgtcctacgtacggtggctgcaccatctgtatcatcttcccgccatctgatgagcagttgaaatctggaactgcctctgttg tgtgcctgctgaataacttctatcccagagaggccaaagtacagtggaaggtggataacgccctccaatcgggtaactcccaggagagtgtc acagagcaggacagcaaggacagcacctacagcctcagcagcaccctgacgctgagcaaagcagactacgagaaacacaaagtctacg cctgcgaagtcacccatcagggcctgagctcgcccgtcacaaagagatcaacaggggtgagtgcggtggttctggggatctagcgatc ggggtctgggtcgactggtacctcgtcaagcgggacgggtactagtgctggtactacgggcacttcagctagcacctctggctcggggtcc

```
ggcgaggtgcagcttgttgaaactggtggaagattggtgcagcctaaagggtcattgaaactctcatgtgcagtctctggaatcaccttcaaga ccaatgccatgaactgggtccgccaggctccaggaaagggtttggaatgggttgctcgcataagaactaaaagttataattatgcaacatatta tgccgattcagtgaaagacaggttcaccatctccagagatgattcacaaagcattctctatctgcaaatgaacaatttgaaaactgaggacaca gccatgtatcactgtgtgagagagggccgctggggccaagggactctggtcactgtctctgcagctagcaccaagggcccatcggtatccc cctggcaccctcctccaagagcacctctgggggcacagcggccctgggctgcctggtcaaggactacttccccgaaccggtgacggtgtc gtggaactcaggcgccctgaccagcggcgtgcacaccttcccggctgtcctacagtcctcaggactctactccctcagcagcgtggtgacc gtgccctccagcagcttgggcacccagacctacatctgcaacgtgaatcacaagcccagcaacaccaaggtggacaagaaagttgagccc aaatcttgtgacaaaactcacacatgcccaccgtgcccagcacctgaactcctggggggaccgtcagtcttcctcttccccccaaaacccaag gacaccctcatgatctcccggacccctgaggtcacatgcgtggtggtggacgtgagccacgaagaccctgaggtcaagttcaactggtacgt ggacggcgtggaggtgcataatgccaagacaaagccgcgggaggagcagtacaacagcacgtaccgtgtggtcagcgtcctcaccgtcc tgcaccaggactggctgaatggcaaggagtacaagtgcaaggtctccaacaaagcccccagccccatcgagaaaaccatctccaaag ccaaagggcagccccgagaaccacaggtgtacaccctgcccccatcccgggaggagatgaccaagaaccaggtcagcctgtggtgcctg gtcaaaggcttctatcccagcgacatcgccgtggagtgggagagcaatgggcagccggagaacaactacaagaccacgcctcccgtgctg gactccgacggctccttcttcctctacagcaagctcaccgtggacaagagcaggtggcagcaggggaacgtcttacatgaccgtgatgcat gagggtctgcacaaccactacacgcagaagagcctctccctgtctccgggtaaa
```

Exemplary Linker

SEQ ID NO: 13

GGSGGSSGSGSGSTGTSSSGTGTSAGTTGTSASTSGSGSG

BS2 10H2 Heavy Chain
Relevant domains are shown below (described in an N- to C-terminal direction)
Signal Sequence is show in boxed outline
10H2 variable heavy chain region is italicized

SEQ ID NO: 14

[MRVPAQLLGLLLLWLPGARCAGS]*EVQLVETGGRLVQPKGSLKLSCAVSGITFKTNAMNWV*

*RQAPGKGLEWVARIRTKSYNYATYYADSVKDRFTISRDDSQSILYLQMNNLKTEDTAMYHCVRE*

*GRWGQGTLVTVSA*ASTKGPSVFPLAPSSKSTSGGTAALGCLVKDYFPEPVTVSWNSGALT

SGVHTFPAVLQSSGLYSLSSVVTVPSSSLGTQTYICNVNHKPSNTKVDKKVEPKSCDKTH

TCPPCPAPELLGGPSVFLFPPKPKDTLMISRTPEVTCVVVDVSHEDPEVKFNWYVDGVEV

HNAKTKPREEQYNSTYRVVSVLTVLHQDWLNGKEYKCKVSNKALPAPIEKTISKAKGQP

REPQVYTLPPSREEMTKNQVSLTCLVKGFYPSDIAVEWESNGQPENNYKTTPPVLDSDGS

FFLYSKLTVDKSRWQQGNVFSCSVMHEGLHNHYTQKSLSLSPGK

BS2 10H2 + Tocilizumab scFv Light Chain
Relevant domains are shown below (described in an N- to C-terminal direction)
Signal Sequence is shown in ~~dark shading~~ boxed outline
10H2 variable light chain region is underlined
Kappa constant light chain region is italicized
The linker region is shown in ~~light shading~~ italicized boxed outline
Tocilizumab variable heavy chain region is in bold text
scFv linker region is shown in ~~light shading with underlined~~ unformatted text
Tocilizumab variable light chain region is in bold and underlined text

SEQ ID NO: 15

[MRVPAQLLGLLLLWLPGARCAGS]<u>QAVVTQESALTTSPGETVTLTCRSSTGAVTTSNYAN</u>

<u>WVQEKPDHLFTGLIGGTNNRPPGVPARFSGSLIGDKAALTITGAQIEDEAIYFCALWYSN</u>

<u>HLVFGGGTKLTVLR</u>*TVAAPSVFIFPPSDEQLKSGTASVVCLLNNFYPREAKVQWKVDNALQS*

*GNSQESVTEQDSKDSTYSLSSTLTLSKADYEKHKVYACEVTHQGLSSPVTKSFNRGEC*[*GGGGS*

*GGGGS*]EVQLQESGPGLVRPSQTLSLTCTVSGYSITSDHAWSWVRQPPGRGLEWIGYI

SYSGITTYNPSLKSRVTMLRDTSKNQFSLRLSSVTAADTAVYYCARSLARTTAMDY

```
WGQGSLVTVSSGGGGSGGGGSGGGGSDIQMTQSPSSLSASVGDRVTITCRASQDISSY

LNWYQQKPGKAPKLLIYYTSRLHSGVPSRFSGSGSGTDFTFTISSLQPEDIATYYCQQ

GNTLPYTFGQGTKVEIK
```

| | |
|---|---|
| Tocilizumab Heavy Chain Variable Region CDR1<br><br>SDHAWS | SEQ ID NO: 16 |
| Tocilizumab Heavy Chain Variable Region CDR2<br><br>YISYSGITTYNPSLKS | SEQ ID NO: 17 |
| Tocilizumab Heavy Chain Variable Region CDR3<br><br>SLARTTAMDY | SEQ ID NO: 18 |
| Tocilizumab Light Chain Variable Region CDR1<br><br>RASQDISSYLN | SEQ ID NO: 19 |
| Tocilizumab Light Chain Variable Region CDR2<br><br>YTSRLHS | SEQ ID NO: 20 |
| Tocilizumab Light Chain Variable Region CDR3<br><br>QQGNTLPYT | SEQ ID NO: 21 |
| 10H2 Heavy Chain Variable Region CDR1<br><br>GITFKTNA | SEQ ID NO: 22 |
| 10H2 Heavy Chain Variable Region CDR2<br><br>IRTKSYNYAT | SEQ ID NO: 23 |
| 10H2 Heavy Chain Variable Region CDR3<br><br>VREGR | SEQ ID NO: 24 |
| 10H2 Light Chain Variable Region CDR1<br><br>TGAVTTSNY | SEQ ID NO: 25 |
| 10H2 Light Chain Variable Region CDR2<br><br>GTN | SEQ ID NO: 26 |
| 10H2 Light Chain Variable Region CDR3<br><br>ALWYSNHLV | SEQ ID NO: 27 |

REFERENCES

1. Weiner G J. Building better monoclonal antibody-based therapeutics. Nat Rev Cancer. 2015 May 22; 15(6):361-370.
2. Yang F, Wen W, Qin W. Bispecific Antibodies as a Development Platform for New Concepts and Treatment Strategies. Int J Mol Sci. 2016 Dec. 28; 18 (1). PMCID: PMC5297683
3. Garber K. Bispecific antibodies rise again. Nat Rev Drug Discov. 2014 November; 13(11):799-801.
4. Cochran J R. Engineered proteins pull double duty. Sci Transl Med. 2010 Feb. 3; 2(17):17ps5. PMID: 20371477
5. Fan G, Wang Z, Hao M, Li J. Bispecific antibodies and their applications. J Hematol Oncol J Hematol Oncol. 2015 Dec. 21; 8:130. PMCID: PMC4687327
6. Kontermann R E. Recombinant bispecific antibodies for cancer therapy. Acta Pharmacol Sin. 2005 January; 26(1):1-9. PMID: 15659107
7. Finkelman F D, Madden K B, Morris S C, Holmes J M, Boiani N, Katona I M, Maliszewski C R. Anticytokine antibodies as carrier proteins. Prolongation of in vivo effects of exogenous cytokines by injection of cytokine-anti-cytokine antibody complexes. J Immunol. 1993 Aug. 1; 151(3):1235-1244. PMID: 8393043
8. Ridgway J B, Presta L G, Carter P. "Knobs-into-holes" engineering of antibody CH3 domains for heavy chain heterodimerization. Protein Eng. 1996 July; 9(7):617-621. PMID: 8844834
9. Merchant A M, Zhu Z, Yuan J Q, Goddard A, Adams C W, Presta L G, Carter P. An efficient route to human bispecific IgG. Nat Biotechnol. 1998 July; 16(7):677.
10. Koerber J T, Hornsby M J, Wells J A. An improved single-chain Fab platform for efficient display and recombinant expression. J Mol Biol. 2015 Jan. 30; 427(2):576-586. PMCID: PMC4297586
11. Orcutt K D, Ackerman M E, Cieslewicz M, Quiroz E, Slusarczyk A L, Frangioni J V, Wittrup K D. A modular IgG-scFv bispecific antibody topology. Protein Eng Des Sel. 2010 Apr. 1; 23(4):221-228.
12. Weinberg R A. The biology of cancer. Second edition. New York: Garland Science, Taylor & Francis Group; 2014.
13. Steeg P S. Targeting metastasis. Nat Rev Cancer. 2016 April; 16(4):201-218. PMID: 27009393
14. Karagiannis G S, Pastoriza J M, Wang Y, Harney A S, Entenberg D, Pignatelli J, Sharma V P, Xue E A, Cheng E, D'Alfonso™, Jones J G, Anampa J, Rohan T E, Sparano J A, Condeelis J S, Oktay M H. Neoadjuvant chemotherapy induces breast cancer metastasis through a TMEM-mediated mechanism. Sci Transl Med. 2017 05; 9 (397). PMCID: PMC5592784
15. Obenauf A C, Zou Y, Ji A L, Vanharanta S, Shu W, Shi H, Kong X, Bosenberg M C, Wiesner T, Rosen N, Lo R S, Massague J. Therapy-induced tumour secretomes promote resistance and tumour progression. Nature. 2015 Apr. 16; 520(7547):368-372. PMCID: PMC4507807
16. Martin O A, Anderson R L, Narayan K, MacManus M P. Does the mobilization of circulating tumour cells during cancer therapy cause metastasis? Nat Rev Clin Oncol. 2017 January; 14(1):32-44. PMID: 27550857
17. Jayatilaka H, Tyle P, Chen J J, Kwak M, Ju J, Kim H J, Lee J S H, Wu P-H, Gilkes D M, Fan R, Wirtz D. Synergistic IL-6 and IL-8 paracrine signalling pathway infers a strategy to inhibit tumour cell migration. Nat Commun. 2017 26; 8:15584. PMCID: PMC5458548
18. Nakashima Y, Kondo M, Fukuda T, Harada H, Horiuchi T, Ishinishi T, Jojima H, Kuroda K, Miyahara H, Maekawa M, Nishizaka H, Nagamine R, Nakashima H, Otsuka T, Shono E, Suematsu E, Shimauchi T, Tsuru T, Wada K, Yoshizawa S, Yoshizawa S, Iwamoto Y. Remission in patients with active rheumatoid arthritis by tocilizumab treatment in routine clinical practice: results from 3 years of prospectively registered data. Mod Rheumatol. 2014 March; 24(2):258-264. PMID: 24593201
19. Goldstein L J, Perez R P, Yardley D A, Han L K, Reuben J M, McCanna S, Butler B, Ruffini P A, Chang J C. Abstract CT057: A single-arm, preoperative, pilot study to evaluate the safety and biological effects of orally administered reparixin in early breast cancer patients who are candidates for surgery. Cancer Res. 2016 Jul. 15; 76 (14 Supplement): CT057-CT057.
20. Schott A F, Goldstein L J, Cristofanilli M, Ruffini P A, McCanna S, Reuben J M, Perez R P, Kato G, Wicha M. Phase Ib Pilot Study to Evaluate Reparixin in Combination with Weekly Paclitaxel in Patients with HER-2-Negative Metastatic Breast Cancer. Clin Cancer Res Off J Am Assoc Cancer Res. 2017 Sep. 15; 23(18):5358-5365. PMCID: PMC5600824
21. Anders C K, Carey L A. Biology, metastatic patterns, and treatment of patients with triple-negative breast cancer. Clin Breast Cancer. 2009 June; 9 Suppl 2:S73-81. PMCID: PMC2919761
22. Liedtke C, Mazouni C, Hess K R, André F, Tordai A, Mejia J A, Symmans W F, Gonzalez-Angulo A M, Hennessy B, Green M, Cristofanilli M, Hortobagyi G N, Pusztai K. Response to neoadjuvant therapy and long-term survival in patients with triple-negative breast cancer. J Clin Oncol Off J Am Soc Clin Oncol. 2008 Mar. 10; 26(8):1275-1281. PMID: 18250347
23. De Laurentiis M, Cianniello D, Caputo R, Stanzione B, Arpino G, Cinieri S, Lorusso V, De Placido S. Treatment of triple negative breast cancer (TNBC): current options and future perspectives. Cancer Treat Rev. 2010 November; 36 Suppl 3:S80-86. PMID: 21129616
24. Costello E, Greenhalf W, Neoptolemos J P. New biomarkers and targets in pancreatic cancer and their application to treatment. Nat Rev Gastroenterol Hepatol. 2012 August; 9(8):435-444. PMID: 22733351
25. Yachida S, Jones S, Bozic I, Antal T, Leary R, Fu B, Kamiyama M, Hruban R H, Eshleman J R, Nowak M A, Velculescu V E, Kinzler K W, Vogelstein B, Iacobuzio-Donahue C A. Distant metastasis occurs late during the genetic evolution of pancreatic cancer. Nature. 2010 Oct. 28; 467(7319):1114-1117. PMCID: PMC3148940
26. Stathis A, Moore M J. Advanced pancreatic carcinoma: current treatment and future challenges. Nat Rev Clin Oncol. 2010 March; 7(3):163-172. PMID: 20101258
27. Igawa T. Antibody molecules that bind to IL-6 receptor. U.S. Pat. No. 8,562,991B2, 2013.
28. Chuntharapai A, Lee J, Hébert C A, Kim K J. Monoclonal antibodies detect different distribution patterns of IL-8 receptor A and IL-8 receptor B on human peripheral blood leukocytes. J Immunol. 1994 Dec. 15; 153(12): 5682-5688. PMID: 7527448
29. Frohman M A, Dush M K, Martin G R. Rapid production of full-length cDNAs from rare transcripts: amplification using a single gene-specific oligonucleotide primer. Proc Natl Acad Sci USA. 1988 December; 85(23):8998-9002. PMCID: PMC282649
30. Spangler J B, Manzari M T, Rosalia E K, Chen T F, Wittrup K D. Triepitopic Antibody Fusions Inhibit Cetuximab-Resistant BRAF and KRAS Mutant Tumors via EGFR Signal Repression. J Mol Biol. 2012 Sep. 28; 422(4):532-544.
31. Boder E T, Wittrup K D. Yeast surface display for screening combinatorial polypeptide libraries. Nat Biotechnol. 1997 June; 15(6):553-557. PMID: 9181578
32. Fraley S I, Feng Y, Krishnamurthy R, Kim D-H, Celedon A, Longmore G D, Wirtz D. A distinctive role for focal adhesion proteins in three-dimensional cell motility. Nat Cell Biol. 2010 June; 12(6):598-604. PMCID: PMC3116660.
33. Giri A, Bajpai S, Trenton N, Jayatilaka H, Longmore G D, Wirtz D. The Arp2/3 complex mediates multigeneration dendritic protrusions for efficient 3-dimensional cancer cell migration. FASEB J Off Publ Fed Am Soc Exp Biol. 2013 October; 27(10):4089-4099. PMCID: PMC4046187
34. Carter P. Bispecific human IgG by design. J Immunol Methods 2001; 248:7-15; PMID: 11223065
35. Atwell S, Ridgway J B, Wells J A, Carter P. Stable heterodimers from remodeling the domain interface of a homodimer using a phage display library. J Mol Biol 1997; 270:26-35; PMID: 9231898
36. Ridgway J B, Presta L G, Carter P. "Knobs-into-holes" engineering of antibody CH3 domains for heavy chain heterodimerization. Protein Eng 1996; 9:617-21; PMID: 8844834

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A bispecific binding agent comprising:
a first polypeptide comprising a first antibody heavy chain or portion thereof, a first polypeptide linker, and a first antibody light chain or portion thereof, wherein the first polypeptide linker connects the first antibody heavy chain or portion thereof and the first antibody light chain or portion thereof,
a second polypeptide comprising a second polypeptide antibody heavy chain or portion thereof, a second polypeptide linker, and a second polypeptide antibody light chain or portion thereof, wherein the second polypeptide linker connects the second antibody heavy chain or portion thereof and the second antibody light chain or portion thereof,
wherein the first antibody heavy chain or portion thereof comprises one or more amino acid substitutions, the second antibody heavy chain or portion thereof comprises one or more amino acid substitutions, or both, such that the first polypeptide antibody heavy chain or portion thereof and the second polypeptide antibody heavy chain or portion thereof preferentially associate with each other to form the bispecific binding agent;
wherein the first linker comprises a polypeptide comprising SEQ ID NO: 13, and
wherein the second linker comprises a polypeptide comprising SEQ ID NO: 13.

2. The bispecific binding agent of claim 1, wherein the first antibody heavy chain or portion thereof comprises a $C_H1$ domain or portion thereof, a $C_H2$ domain or portion thereof, a $C_H3$ domain or portion thereof, and a $V_H$ domain or portion thereof.

3. The bispecific binding agent of claim 1, wherein the second antibody heavy chain or portion thereof, comprises a $C_H1$ domain or portion thereof, a $C_H2$ domain or portion thereof, a $C_H3$ domain or portion thereof, and a $V_H$ domain or portion thereof.

4. The bispecific binding agent of claim 1, wherein the first antibody light chain comprises a $C_L$ domain or portion thereof and a $V_L$ domain or portion thereof.

5. The bispecific binding agent of claim 1, wherein the second antibody light chain comprises a $C_L$ domain or portion thereof and a $V_L$ domain or portion thereof.

6. The bispecific binding agent of claim 1, wherein the first polypeptide linker connects a $C_L$ domain of the first antibody light chain to a $V_H$ domain of the first antibody heavy chain.

7. The bispecific binding agent of claim 1, wherein the second polypeptide linker connects a $C_L$ domain of the second antibody light chain to a $V_H$ domain of the second antibody heavy chain.

8. The bispecific binding agent of claim 1, wherein a $V_H$ domain of the first polypeptide antibody heavy chain and a $V_L$ domain of the first polypeptide antibody light chain form a first binding site.

9. The bispecific binding agent of claim 1, wherein a $V_H$ domain of the second polypeptide antibody heavy chain and a $V_L$ domain of the second polypeptide antibody light chain form a second binding site.

10. The bispecific binding agent of claim 1, wherein the bispecific binding agent binds a first target and a second target.

11. The bispecific binding agent of claim 10, wherein the first target and the second target are different.

12. The bispecific binding agent of claim 1, wherein the first target and the second target are different epitopes on the same protein.

13. The bispecific binding agent of claim 1, wherein the one or more amino acid substitutions in the first antibody heavy chain or portion thereof comprises an amino acid substitution in a $CH_3$ domain of the first antibody heavy chain or portion thereof corresponding to at least one or more of positions 249, 251, and 290 of SEQ ID NO: 6.

14. The bispecific binding agent of claim 1, wherein the one or more amino acid substitutions in the second antibody heavy chain or portion thereof comprises an amino acid substitution in a $CH_3$ domain of the second antibody heavy chain or portion thereof corresponding to position 642 of SEQ ID NO: 11.

* * * * *

UNITED STATES PATENT AND TRADEMARK OFFICE
CERTIFICATE OF CORRECTION

| | | |
|---|---|---|
| PATENT NO. | : 12,492,258 B2 | Page 1 of 1 |
| APPLICATION NO. | : 17/614864 | |
| DATED | : December 9, 2025 | |
| INVENTOR(S) | : Jamie Spangler et al. | |

It is certified that error appears in the above-identified patent and that said Letters Patent is hereby corrected as shown below:

On the Title Page

Under Item (56) References Cited, Line 5, please delete "Bachner et al." and insert -- Baehner et al. --, therefor.

In the Claims

Claim 3: In Column 73, Line 30, please delete "chain or portion thereof," and insert -- chain or portion thereof; --, therefor.

Signed and Sealed this
Thirteenth Day of January, 2026

John A. Squires
*Director of the United States Patent and Trademark Office*